United States Patent [19]
Stern et al.

[11] Patent Number: 5,838,239
[45] Date of Patent: Nov. 17, 1998

[54] SYSTEM FOR DETECTING ICE OR SNOW ON SURFACE WHICH SPECULARLY REFLECTS LIGHT

[75] Inventors: Howard Stern, Greenlawn; John Schaefer, Coram; Fereydoun Maali, New York, all of N.Y.

[73] Assignee: Robotic Vision Systems, Inc., Hauppauge, N.Y.

[21] Appl. No.: 712,059

[22] Filed: Sep. 10, 1996

Related U.S. Application Data

[63] Continuation-in-part of Ser. No. 357,875, Dec. 16, 1994, Pat. No. 5,589,822, which is a continuation-in-part of Ser. No. 963,840, Oct. 20, 1992, Pat. No. 5,475,370.

[51] Int. Cl.[6] .................................................. G08B 19/02
[52] U.S. Cl. ........................................... 340/583; 356/369
[58] Field of Search .................................... 340/583, 962, 340/511, 601, 602; 356/381, 382, 369; 73/170.26; 244/134 F; 348/128, 143

[56] References Cited

U.S. PATENT DOCUMENTS

| | | | |
|---|---|---|---|
| 3,994,586 | 11/1976 | Sharkins et al. | 356/382 X |
| 4,164,373 | 8/1979 | Schuss et al. | 356/316 |
| 4,701,052 | 10/1987 | Schoen, Jr. | 356/369 |
| 5,243,185 | 9/1993 | Blackwood | 340/583 X |
| 5,500,530 | 3/1996 | Gregoris | 250/339.11 |
| 5,557,261 | 9/1996 | Barbour | 340/580 |
| 5,589,822 | 12/1996 | Stern | 340/583 |

Primary Examiner—Thomas J. Mullen, Jr.
Attorney, Agent, or Firm—Morrison Law Firm

[57] ABSTRACT

A presence of a polarization altering substance on a specular surface is detected by transmitting light from a single strobed light source to the surface over a transmitting path and receiving the transmitted light from the surface. An intensity of the light is measured in both an optical non-isolator state and an isolator state by a same detector by delaying the non-isolated return light for a definite period of time before measuring it with the detector. The measured isolated and non-isolated intensities are converted to logarithmic form, range corrected, and compared to reference data established for the specific specular surface being investigated to detect the presence or absence of the polarization altering substance. Attenuation and backscattering effects of scattering and/or absorbing interference in the transmitted light are compensated so that the reference table is entered at the correct point. Using different intensities of transmitted light increases the dynamic range of the system.

74 Claims, 32 Drawing Sheets

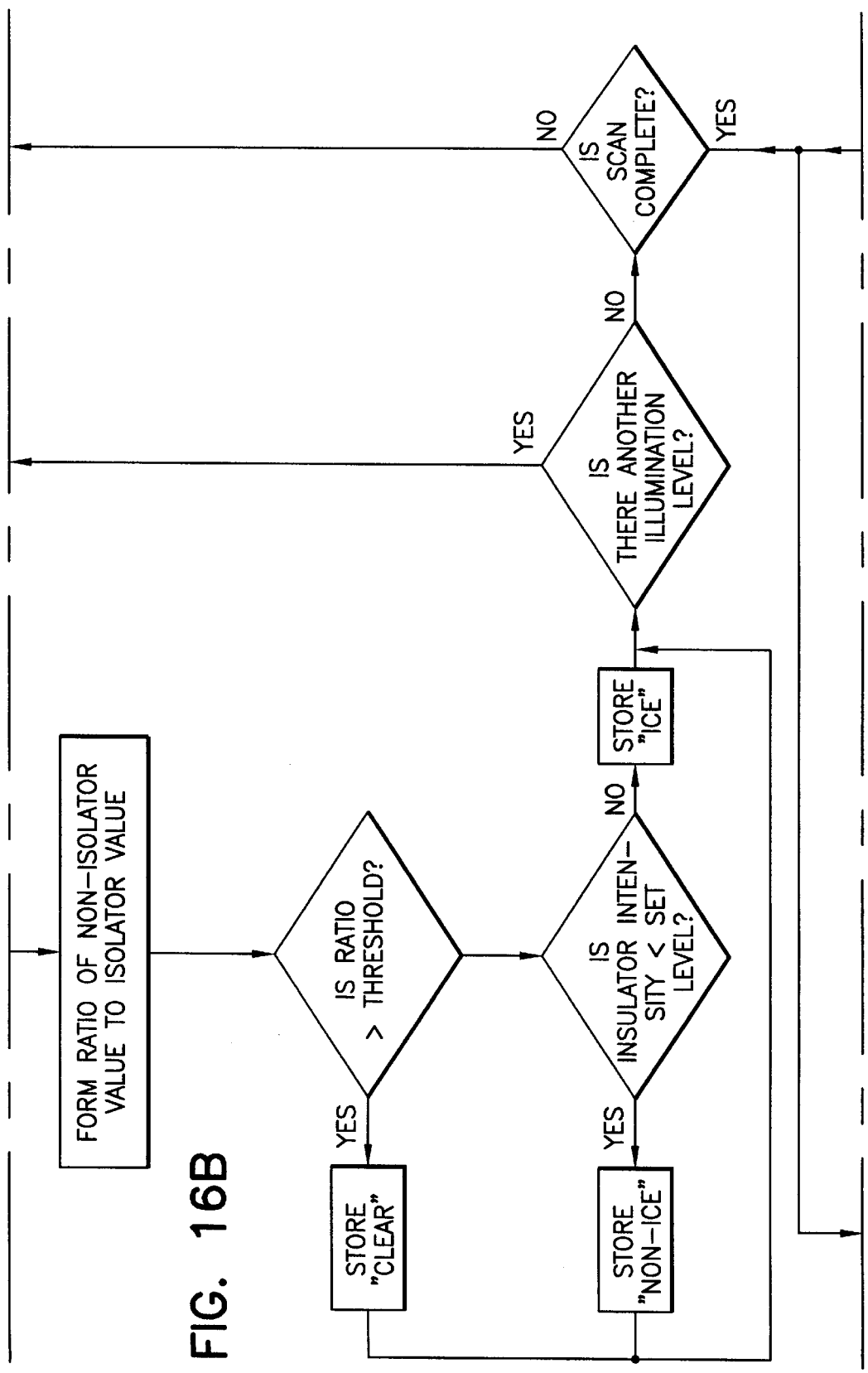

RANGE CORRECTION OUTPUT = INPUT + K x LOG(RANGE/REF RANGE) K~2
THRESHOLD CALC BASED ON TABLE INTERPOLATION
OR FUNCTION GENERATING FIG.18 VALUES

RANGE CORRECTION OUTPUT = INPUT + K x LOG(RANGE/REF RANGE) K~2
THRESHOLD CALC BASED ON TABLE INTERPOLATION
OR FUNCTION GENERATING FIG.20 VALUES

EVAL FUNC=(NON-BLOCKING−BLOCKING)/(NON-BLOCKING+BLOCKING)
BOTH RANGE CORRECTED OR BOTH BEFORE RANGE CORRECTION

CALC THRESH MUST USE RANGE CORRECTED NON−BLOCKING

SYSTEM FOR DETECTING ICE OR SNOW ON SURFACE WHICH SPECULARLY REFLECTS LIGHT

The present application is a continuation in part of U.S. patent application Ser. No. 08/357,875, filed Dec. 16, 1994, now issued as U.S. Pat. No. 5,589,822, which is a continuation in part of U.S. patent application Ser. No. 07/963,840, filed Oct. 20, 1992, now issued as U.S. Pat. No. 5,475,370.

BACKGROUND OF THE INVENTION

This invention relates to a system for detecting the presence or absence of a polarization altering substance on a specular surface. In particular, this invention relates to a system for detecting ice or snow on an airplane wing.

Current airport aviation practices depend on the use of de-icing fluid to remove ice and prevent its future build-up for time periods of 5–10 minutes. Verification that wing and other aerodynamic or control surfaces are ice free is done visually, often under difficult viewing conditions. Occasionally significant ice build-ups are not noticed, with tragic results. Responsibility for detecting such ice rests with the aircraft crew who rely on visual cues, perhaps supplemented with an ordinary flashlight. Obviously, a need exists for a system which is capable of accurately and easily determining the presence of ice on an aircraft wing.

Metallic surfaces and dielectric surfaces behave differently when illuminated with light, particularly with respect to their polarization properties. One of the strongest differences and most easily observable is the property of metals to reverse the rotational direction of circularly polarized light. For example, the specular reflection of right handed (clockwise looking towards the source) circularly polarized light from a metal surface changes it to left handed (counterclockwise) polarization and vice versa. This effect is used in the construction of optical isolators which permit light to initially pass through the isolator but prevent specularly reflected light from returning through the isolator back to the source. The optical isolator is a circular polarizer that is usually implemented from a linear polarizer and a quarter wave retarder plate that has its fast and slow axes located 45° from the polarization axis of the polarizer. The polarizer must precede the retarder in the light path.

When a metallic surface (or surface painted with a metallic paint), such as the wing of an aircraft, is illuminated with circularly polarized light (which may be generated by passing unpolarized light through a circular polarizer) and the reflected energy is viewed through the same circular polarizer, the resulting image is extremely dim since the circular polarizer is performing as an isolator with respect to the specular reflection from the metal surface. Other types of surfaces (birefringent, certain dielectric, matte, etc.) viewed through the same circular polarizer maintain their normal brightness because upon reflection they destroy the circular polarization. If the circular polarizer is flipped (reversed) so that the retarder precedes the polarizer, it no longer acts as an isolator for the illuminating beam and the metallic surface's image will now be viewed at normal (bright) intensity.

Most non-metallic and painted or matte surfaces illuminated with circularly polarized light and viewed through the same circular polarizer will maintain their normal intensity. Such surfaces, as well as a coat of ice on the metal, whether matte white due to a snow covering or crystal clear due to even freezing, destroy the circular polarization of the reflected light and therefore take on the depolarizing property of a matte painted surface with respect to the optical isolator. A transparent dielectric over metal depolarizes circularly polarized light passing through it if it has numerous internal point scatterers or is birefringent. Ice has this characteristic. Thus, circularly polarized light reflected from a painted surface, snow, ice, or even transparent ice over metal is depolarized and is not affected by the isolator.

Therefore, the image of a clear metal surface that is ice-free alternates between dark and bright when alternately viewed through an isolator and non-isolator structure, respectively. Apparatus other than the combination of optical isolators and non-isolators can produce the same effect. Any ice or snow covering the metal surface causes the image to maintain the same brightness regardless of whether it is viewed through an isolator or non-isolator structure or equivalent structures.

OBJECTS AND SUMMARY OF THE INVENTION

It is therefore an object of the present invention to provide an apparatus for detecting the presence of a depolarizing dielectric material, such as ice or snow, on a metal specular reflecting surface.

A further object is to provide a system for detecting ice or snow on the metal (or metallic painted) wing of an aircraft.

An additional object is to provide a system for detecting ice or snow on a metal (or metallic painted) surface which is specularly reflective to light using circularly or linearly polarized light.

Yet another object is to provide a system for detecting ice or snow on a metal or metallic painted surface in which optical means are used to produce an on-off light blinking response for a metal surface and a steady light response for any part of the surface covered with ice or snow.

A further object is to provide a process and apparatus to overcome system limitations brought about by ambient light, the large dynamic range of light intensities, and the poor response of metal surfaces viewed away from a direction normal to the surface.

Still a further object is to provide a method and apparatus in which the surface condition is determined by comparing the amplitude values of the received blocking and non-blocking signals to reference data.

Still a further object is to provide a method and apparatus for compensating the received blocking and non-blocking signals for the effects of fog or other interfering medium.

Still a further object is to provide an apparatus for increasing the dynamic range of the system.

Still a further object is to provide an apparatus for determining visibility conditions during the presence of fog or other interfering medium.

Briefly stated, a presence of a polarization altering substance on a specular surface is detected by transmitting light from a single strobed light source to the surface over a transmitting path and receiving the transmitted light from the surface. An intensity of the light is measured in both an optical non-isolator state and an isolator state by a same detector by delaying the non-isolated return light for a definite period of time before measuring it with the detector. The measured isolated and non-isolated intensities are converted to logarithmic form, range corrected, and compared to reference data established for the specific specular surface being investigated to detect the presence or absence of the polarization altering substance. Attenuation and backscattering effects of scattering and/or absorbing interference in the transmitted light are compensated so that the reference table is entered at the correct point. Using different intensities of transmitted light increases the dynamic range of the system.

According to an embodiment of the invention, an apparatus for detecting, on a surface which specularly reflects light, the presence of a polarization altering substance on the surface includes means for transmitting a pulse of light over a transmitting path to the surface, means for receiving transmitted light, a receiving path for the transmitted light from the surface and from the substance to the means for receiving, means for splitting the transmitted light into a non-isolated portion and an isolated portion, means for delaying one of the non-isolated portion and the isolated portion relative to another thereof to produce a first-to-arrive signal and a second-to-arrive signal, the first-to-arrive signal being completed at an output before the second-to-arrive signal arrives at the output, means for measuring a first intensity of the first-to-arrive signal and outputting a first signal, means for measuring a second intensity of light of the second-to-arrive signal and outputting a second signal, means for comparing the first and second intensities of light to reference data to detect the presence of the substance on the surface.

According to an embodiment of the invention, an apparatus for detecting, on a surface which specularly reflects light, the presence of a polarization altering substance on the surface includes means for transmitting a pulse of polarized light onto a surface, means for receiving the pulse reflected from the surface, means for directing the reflected pulse onto a non-blocking optical path to a detector, means for directing the reflected pulse onto a blocking optical path to the detector, and one of the blocking and non-blocking optical paths having a delay exceeding a pulse length of the pulse, whereby responses of the detector to the reflected pulse directed onto the blocking and non-blocking optical paths are separated.

According to an embodiment of the invention, an apparatus for detecting, on a surface which specularly reflects light, the presence of a polarization altering substance on the surface includes means for transmitting light over a transmitting path to the surface, means for receiving transmitted light, a receiving path for the transmitted light from the surface and from the substance to the means for receiving, optical means in at least one of the transmitting path and the receiving path, means for alternating the optical means between an optical non-isolator state and an optical isolator state, the means for receiving including means for measuring a first intensity of light received at the means for receiving when the optical means is in the optical non-isolator state, and means for measuring a second intensity of light received at the means for receiving when the optical means is in the optical isolator state, means for compensating the measured first intensity of light for effects of scattering and/or absorbing interference of the transmitted light, and means for comparing the compensated first intensity and the second intensity of light to a plurality of reference data to detect the presence of the substance on the surface.

According to an embodiment of the invention, an apparatus for detecting, on a surface which specularly reflects light, the presence of a polarization altering substance on the surface includes means for transmitting light over a transmitting path to the surface, means for receiving transmitted light, a receiving path for the transmitted light from the surface and from the substance to the means for receiving, optical means in at least one of the transmitting path and the receiving path, means for alternating the optical means between an optical non-isolator state and an optical isolator state, means for measuring a first intensity of light received at the means for receiving when the optical means is in the optical non-isolator state and outputting a first signal, means for compensating the first signal for effects of scattering and/or absorbing interference of the transmitted light and outputting a compensated first signal, means for measuring a second intensity of light received at the means for receiving when the optical means is in the optical isolator state and outputting a second signal, means, responsive to a length of the receiving path, for range-correcting the first compensated signal and the second signal, means for comparing the range-corrected second signal to the range-corrected compensated first signal and outputting a ratio signal, means for calculating a threshold signal, and means for comparing the ratio signal to the threshold signal.

According to an embodiment of the invention, an apparatus for detecting, on a surface which specularly reflects light, the presence of a polarization altering substance on the surface includes means for transmitting a pulse of light over a transmitting path to the surface, means for receiving transmitted light, a receiving path for the transmitted light from the surface and from the substance to the means for receiving, means for splitting the transmitted light into a non-isolated portion and an isolated portion, means for delaying one of the non-isolated portion and the isolated portion relative to another thereof to produce a first-to-arrive signal and a second-to-arrive signal, the first-to-arrive signal being completed at an output of the means for delaying before the second-to-arrive signal arrives at the output, means for measuring a first intensity of the first-to-arrive signal and outputting a first signal, means for measuring a second intensity of light of the second-to-arrive signal and outputting a second signal, means for compensating the first signal for effects of scattering and/or absorbing interference of the transmitted light and outputting a compensated first signal, and means for comparing the compensated first signal and the second signal to reference data to detect the presence of the substance on the surface.

According to an embodiment of the invention, an apparatus for detecting, on a surface which specularly reflects light, the presence of a polarization altering substance on the surface includes means for transmitting a pulse of polarized light onto a surface, means for receiving the pulse reflected from the surface, means for directing the reflected pulse onto a non-blocking optical path to a detector, means for directing the reflected pulse onto a blocking optical path to the detector, one of the blocking and non-blocking optical paths having a delay exceeding a pulse length of the pulse, whereby responses of the detector to the reflected pulse directed onto the blocking and non-blocking optical paths are separated, and means for compensating the reflected pulse for effects of fog.

According to an embodiment of the invention, an apparatus for detecting, on a surface which specularly reflects light, the presence of a polarization altering substance on the surface includes means for transmitting a pulse of polarized light onto a surface, means for receiving the pulse reflected from the surface, means for directing the reflected pulse onto a non-blocking optical path to a detector, means for directing the reflected pulse onto a blocking optical path to the detector, the detector including means for measuring a first intensity of the reflected pulse directed onto one of the blocking and non-blocking optical paths not having the delay and outputting a first signal, and means for measuring a second intensity of the reflected pulse directed onto another one of the blocking and non-blocking optical paths having the delay and outputting a second signal, one of the blocking and non-blocking optical paths having a delay exceeding a pulse length of the pulse, whereby responses of the detector to the reflected pulse directed onto the blocking and non-blocking optical paths are separated, means for establishing thresholds for the first and second signals, and means, responsive to the means for establishing thresholds, for controlling an intensity of the transmitted pulse.

According to an embodiment of the invention, an apparatus for measuring horizontal visibility includes means for transmitting a pulse of polarized light onto a reference surface, means for receiving said pulse reflected from said reference surface, means for directing said reflected pulse on a non-blocking optical path to a detector to isolate a non-blocking component of said reflected pulse, means for directing said reflected pulse on a blocking optical path to said detector to isolate a blocking component of said reflected pulse, means for measuring an amplitude of said non-blocking component and/or said blocking component, means for determining an attenuation coefficient by comparing said measured amplitude to a reference amplitude, and means for calculating the horizontal visibility based on the attenuation coefficient.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 16A, 16B, and 16C together comprise a flow diagram of the process for categorizing the measured values as clear, ice, and non-ice.

DETAILED DESCRIPTION OF THE PREFERRED EMBODIMENT

Figure 1A:
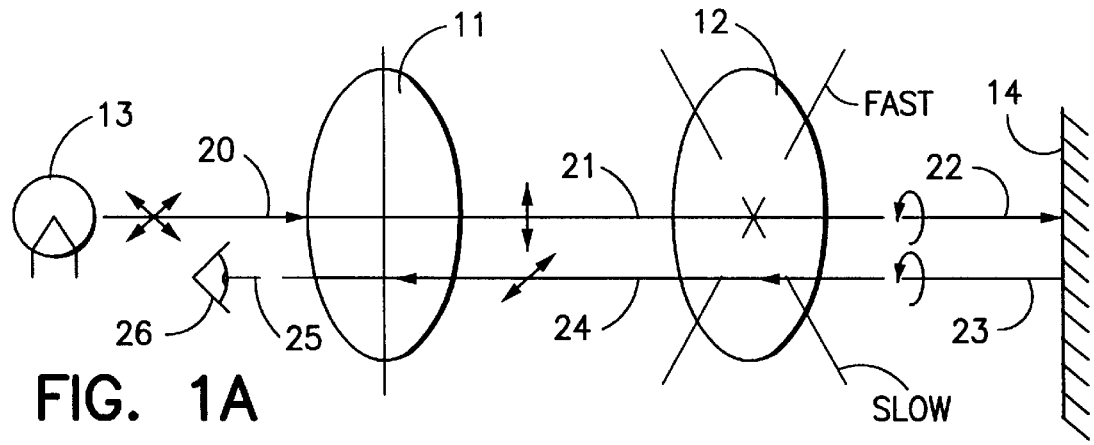
FIG. 1A is an optical schematic of a circular polarizer with the linear polarizer facing the illumination source so that the polarizer acts as an optical isolator.

Referring to FIG. 1A, the operation of a circular polarizer used as an isolator is illustrated. Light is emitted from an unpolarized light source 13, which preferably is as close to mono-chromatic as possible. The light is shown as unpolarized by the arrows in two orthogonal directions along ray path 20, the path the light is following. The unpolarized light passes through a linear polarizer 11 which has a vertical polarization axis. The light passing through linear polarizer 11 takes ray path 21, along the path illustrated as vertical polarization by the double arrow.

The vertically polarized light at ray path 21 passes through a quarter wave retarder plate 12. The retarder plate 12 is a plate made from birefringent material, such as mica or crystal quartz. Its purpose is to change linearly polarized light from polarizer 11 into circularly polarized light. Any ray incident normal to the retarder plate 12 can be thought of as two rays; one polarized parallel to the parent crystal's optic axis (e-ray) and the other perpendicular (o-ray). The e-ray and o-ray travel through the retarder plate 12 at different speeds due to the different refractive indices. The retarder plate 12 is said to have a "fast" and a "slow" axis.

The quarter wave retarder plate 12 has its slow and fast axes both at 45° relative to the vertical axis of the linear polarizer 11 so that the emerging circularly polarized light from retarder plate 12 along ray path 22 is rotating in a CCW direction as viewed facing the light source from a reflecting surface 14. A metallic surface, which is a specular reflector, and a dielectric surface, i.e., ice or snow, behave differently when illuminated with light, particularly with respect to their polarization properties. A strong and easily observable difference is the ability of a metal to reverse the rotational direction of incident circularly polarized light. The specular reflection of right-handed (CW) circularly polarized light from a metal surface changes it into left-handed (CCW) polarization and vice versa.

This effect is used in the construction of optical isolators which permit light to initially pass through the isolator but prevent such light, when specularly reflected, from returning through the isolator back to the light source. When the optical isolator is a circular polarizer it is usually implemented from a linear polarizer and a quarter wave retarder plate that has its fast and slow axes located 45° from the polarization axis of the polarizer.

In FIG. 1A, surface 14, which is a specular surface, reflects the incident circularly polarized light back along ray path 23. The reflected light continues to rotate as viewed from the surface 14 in the CCW direction but has now changed "hand", in terms of right hand and left hand, because it is rotating in the same direction with its direction of travel changed.

The reflected light of ray path 23 passes through the quarter wave retarder plate 12 and emerges no longer circularly polarized but linearly polarized in the horizontal direction, which is shown along ray path 24. Because the light on ray path 24 is horizontally polarized it is not passed by the (vertical) linear polarizer 11. Therefore, nones of the specularly reflected light gets through to ray path 25 to enter an eye 26, which is shown near the location of the light source 13. Thus, the quarter wave retarder plate 12 acts as an optical isolator. That is, light from the light source 13 is passed through the circular polarizer and reflected by the specular surface 14 but cannot pass through the circular polarizer back in the other direction and so is blocked before it reaches the eye 26.

Figure 1B:
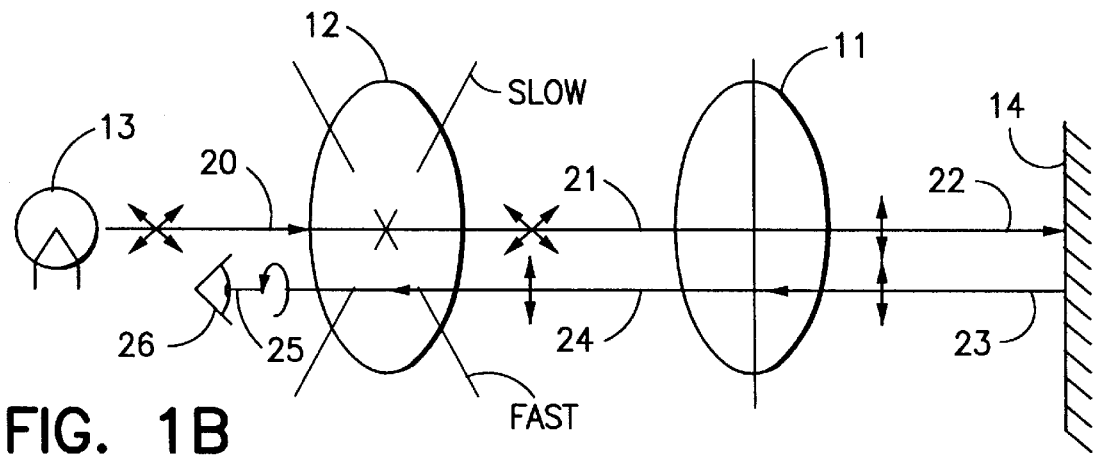
FIG. 1B is an optical schematic of a circular polarizer with the quarter wave plate facing the illumination source so that it passes specularly reflected light, i.e., it is a non-isolator.

Referring to FIG. 1B, the same quarter wave plate and linear polarizer combination used in FIG. 1A is shown, but with the sequence of the elements reversed. The quarter wave retarder plate 12 is facing the light source 13 and the linear polarizer 11 is facing the output side towards the reflecting surface 14. The light rays now emerge from light source 13 in an unpolarized form along ray path 20 and pass through the quarter wave retarder plate 12. However, because the light is not polarized, the quarter wave retarder plate 12 does not change any polarization properties. The light then passes through the linear polarizer 11 and becomes vertically polarized along ray path 22.

Surface 14 specularly reflects the vertically polarized light which travels along ray path 23 back towards the linear polarizer 11 with the same polarization. The light now enters the quarter wave retarder plate 12. Because the light entering retarder plate 12 is polarized in the vertical direction, it emerges from the quarter wave plate circularly polarized. However, this is of no consequence to the eye 26, so the eye sees the light that has been reflected from the surface 14. Thus, in this case with the light first entering the quarter wave retarder plate 12 and then passing through the linear polarizer 11, and being specularly reflected back to the eye through the linear polarizer and the quarter wave plate, there is little loss in the light intensity.

As can be seen in the comparison of FIGS. 1A and 1B, light from the same light source 13 reflected from the specular reflection surface 14 is viewed by the eye 26 either dim or bright depending upon the location of the quarter wave retarder plate 12 relative to the linear polarizer 11. That is, FIG. 1A effectively is an optical isolator while FIG. 1B is a nonisolator.

Figure 2:
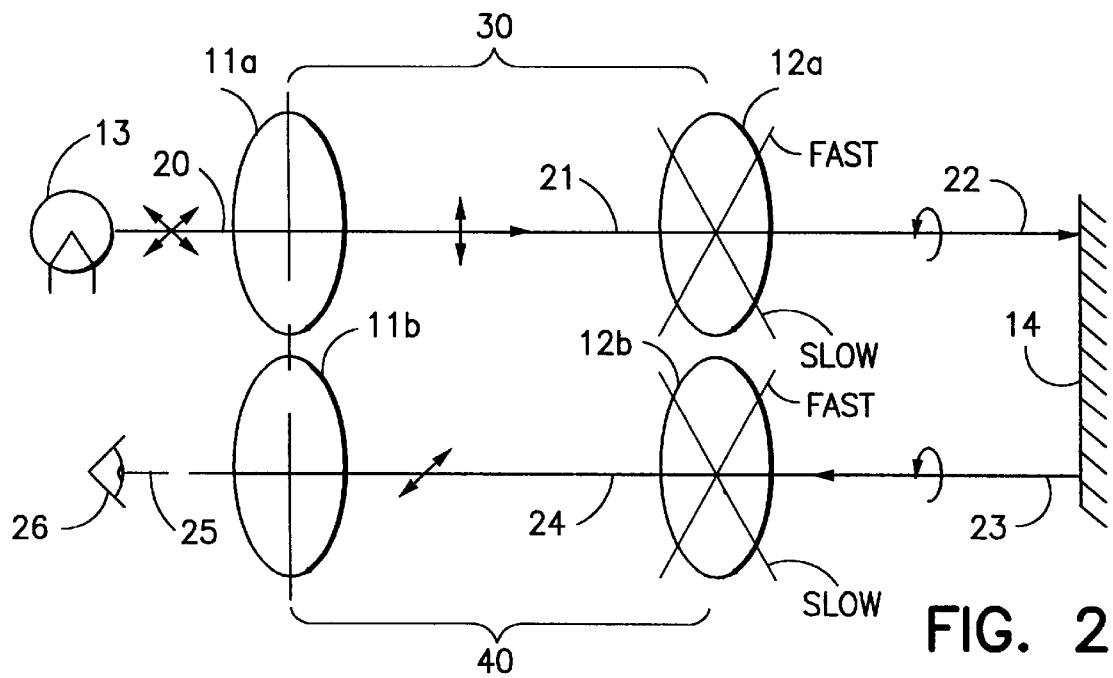
FIG. 2 is an optical schematic of two circular polarizers, one in the transmit path and one in the detection path, that together form an optical isolator.

Referring to FIG. 2, the same implementation of a circular polarizer as in FIG. 1A is shown, with the receive path and the transmit path each having their own circular polarizers. Both circular polarizers are in the same order. That is, both linear polarizers 11a and 11b are on the left, one adjacent to the light source 13 and the other the eye 26, and both quarter wave retarder plates 12a, 12b are on the right adjacent to the reflective surface. Thus, as shown, the light from light source 13 enters the linear polarizer 11a, exits vertically polarized, passes through the quarter wave retarder plate 12a and emerges rotating CCW as viewed from the specular reflecting surface 14. The light reflects off the surface 14 still polarized rotating CCW as viewed from surface 14 and passes through the circular polarizer 40 in the return direction path to enter quarter wave retarder plate 12b, from which the light exits horizontally polarized to the vertical linear polarizer 11b which blocks the light. Linear polarizer 11b in the reception leg is distinct and separate from the linear (vertical) polarizer 11a used in the transmit leg. Because the polarization of the light ray along ray path 24 is horizontal, the light does not pass through the linear polarizer 11b and cannot enter the eye 26.

When a metallic surface, such as the wing of an aircraft, is illuminated with circularly polarized light produced by the device of FIG. 1A and the reflected energy viewed through the same circular polarizer the resulting image is extremely dim since the circular polarizer is performing as an isolator with respect to the specular reflection of the circularly polarized light (of opposite hand) from the metallic surface.

A painted portion (non-specular) of the surface illuminated with circularly polarized light does not reflect light in a polarized form. Instead, it destroys the circular polarization and makes the reflected light unpolarized. Thus, the unpolarized light reflected from a painted surface portion when viewed through the same circular polarizer of FIG. 1A, maintains its normal intensity. The same holds true for circularly polarized light reflected from a wing covered by ice or snow. However, other common harmless substances such as water or de-icing fluid that may be on the wing do not destroy the circular polarization of the reflected light.

As explained with respect to FIG. 1B, the components of the circular polarizer of FIG. 1A are flipped (rotated) such that the retarder plate 12 precedes the linear polarizer 11 with respect to light source 13, so it no longer acts as a circular polarizer to an illuminating beam. Accordingly, the reflection of circularly polarized light from the metal surface passes back to the eye and is of normal (bright) intensity. The image intensity of such light reflected from a painted or dielectric (non-specular) surface also is unchanged as in the previous case.

When a metallic surface is alternately illuminated and viewed by the isolator and non-isolator devices of FIGS. 1A and 1B, the return images at the eye 26 alternate between dark and bright. A painted or dielectric non-specular surface remains uniformly bright to the alternation since the light reflected from the painted or dielectric surface is not polarized and is not isolated.

Assuming that a metallic surface has a patch of ice thereon or is coated with ice, the ice, being either matte white due to snow covering or crystal clear due to even freezing, destroys the circular polarization of the reflected light and therefore takes on the property of a matte painted surface with respect to the optical isolator. That is, referring to FIG. 1A, if there is ice on any portion of the specular surface 14, then the circularly polarized light along ray path 22 impinging upon such portion of the surface will not have its polarization reversed. Instead, it will have the effect of a painted surface so that the returned light will be non-polarized and will pass to the eye, i.e., the returned image will be bright.

Accordingly, upon alternately illuminating and viewing an ice-free metallic surface 14 with the circular polarizer-isolator of FIG. 1A and the non-isolator of FIG. 1B, the return viewed by the eye 26 alternates between dark and bright. Any ice or snow covering a portion of the metal surface 14 causes that portion of the image to maintain the same brightness regardless of whether it is viewed through an isolator or non-isolator structure upon such alternate illumination and viewing.

Switching between an isolator structure, e.g., FIG. 1A, and a non-isolator structure, e.g., FIG. 1B, may be implemented by switching the light illuminating the metallic surface between circularly polarized and non-circularly polarized light while observing through a circular polarizing filter of the same hand, i.e., CW or CCW, as required, to complete the isolator. As an alternative, the light illuminating the metallic surface may be kept circularly polarized but viewed alternately through a circular polarizer of the same hand and a non-circular polarizing element having the same optical attenuation. This is most easily accomplished by viewing through the same type of circular polarizer flipped over (reflected light enters the polarizer element first) to keep it from acting as the circular to linear polarizing element of an isolator while simultaneously maintaining the slight light attenuation of its elements.

Another arrangement is to maintain the illumination in a circularly polarized state. Thereafter, the surface is alternately viewed through right-handed and left-handed circular polarizers which alternately change between the isolating and non-isolating states.

A non-isolating state also may be achieved by rotating either the receiver or transmitter quarter wave retarder plate 12 by 45°. This aligns the slow or fast axis of the retarder with its polarizer. The net effect is that, if done at the transmitter, linearly polarized light passing through the quarter wave retarder plate remains linearly polarized. If done at the receiver, circularly polarized light (which passes through the retarder plate first) emerges linearly polarized at 45° to the original direction. It can then pass through the linear polarizer to be viewed with just slight attenuation.

Rotating either the transmitter or receiver quarter wave retarder by 90° from the position in which it serves to operate as an isolator also changes the state to non-isolating because the specularly reflected circularly polarized wave is then exactly aligned with the receiver polarizer as it emerges in linearly polarized form from the receiver's quarter wave retarder.

The following table illustrates the implementation that may be used when alternating either the illumination (transmitter) or receiver (detector) polarizing elements or vice versa to change the overall path from an isolator to a non-isolator structure:

| Between Transmitter and Surface (or Surface and Receiver) | Between Surface and Receiver (or Transmitter and Surface) |
|---|---|
| CW only | [CW, LP][CW, UP][CW, CCW] |
| CW, LP | CW |
| CW, UP | CW |
| CW, CCW | CW or CCW |
| LP | LP+, LP− |
| LP, UP | LP |

In the table above the following abbreviations are used:
CW Clockwise polarization—(Right handed)
CCW Counter Clockwise polarization—(Left handed)
LP Linear polarization
LP+Linear polarizer aligned with LP
LP−Linear polarizer at blocking angle (e.g. 90) to LP
UP Unpolarized
    Alternating states are separated by commas. Equivalent sets of alternating states are isolated by square brackets. In any row CW and CCW may be interchanged. In any row CW may be replaced by RH (right hand)

and CCW by LH (left hand). The columns can be interchanged; i.e., the action can be either on the transmitter or receiver leg.

The table shows that when using linear polarization, the isolating state refers to the receiving polarizer being orthogonal to the polarization of the transmitted energy beam and the non-isolating state refers to any of the following conditions: (a) non-polarized transmission, (b) no polarizer in receiver path, or (c) polarizer in receiving path is approximately aligned with the polarization of the transmitted beam.

Figure 3A:
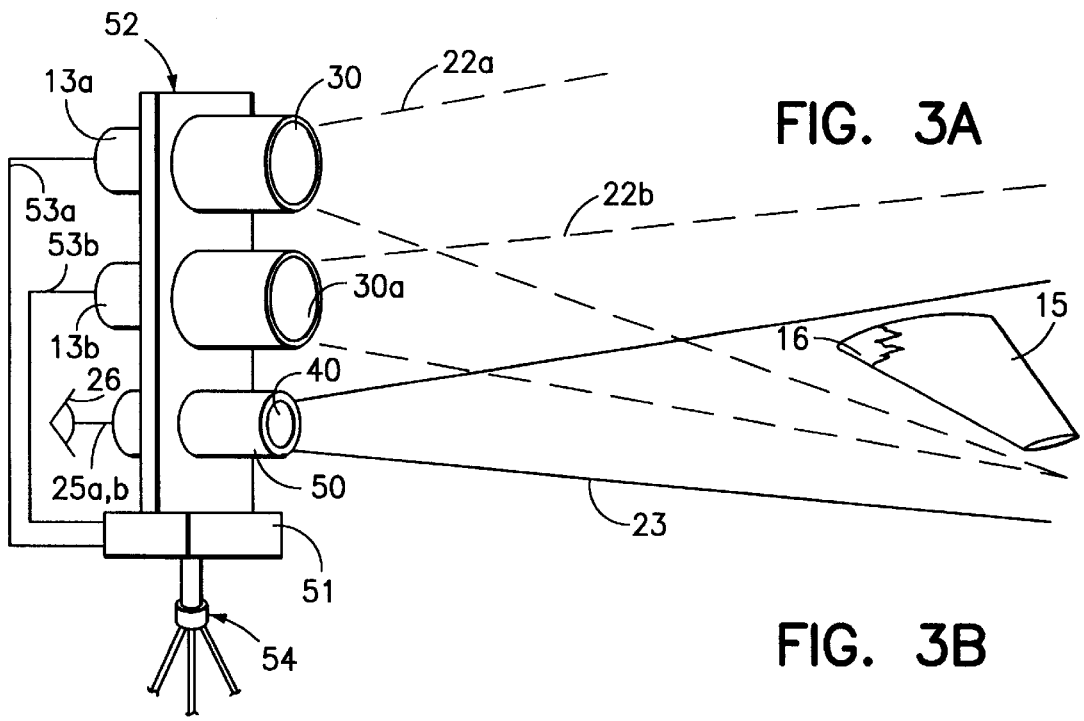
FIG. 3A is a schematic view of an ice detection apparatus based on direct visual observation using two spotlight illuminators, one polarized and one not.

Referring to FIG. 3A, a schematic view of a monocular version of an ice detection system suitable for night use based on direct visual observation is shown. The direct visual observation receiver uses a non-inverting telescope 50 with a circular polarizer 40, like the circular polarizer of FIG. 1A, at its entrance. Two spotlights 13a, 13b are used for the source of illumination, i.e., the transmitter. One spotlight 13a has a circular polarizer 30 isolator, like FIG. 1A, mounted to it. The other spotlight 13b has a neutral density filter 30a or a "same hand" circularly polarized filter mounted backwards so that the light coming through is linearly and not circularly polarized, i.e., like the non-isolator of FIG. 1B.

The two spotlights 13a, 13b illuminate a common overlapping area of a surface shown as the entire area or a portion of an aircraft wing 15 having a patch 16 of ice thereon. The clear (no ice) portions of the wing 15 form a specular reflecting surface such as the surface 14 of FIGS. 1A and 1B. The wing 15 is observed by the field of view 23 of the non-inverting telescope 50. Both spotlights 13a, 13b and the non-inverting telescope 50 are mounted on a support structure 52, which in turn is mounted to a tripod or boom 54. A power supply and sequencer 51 for the spotlights 13a, 13b is also located on the tripod boom structure. Two outputs from the sequencer 51 are taken along wires 53a and 53b to connect with and alternately energize the spotlights 13a and 13b, respectively.

The eye 26 is shown looking through the telescope 50. The field of view of the upper spotlight 13a is shown as fan of rays 22a and that of the lower spotlight 13b as fan of rays 22b. The region observed by the non-inverting telescope 50 is formed from the fan of rays reflected back from wing 15 into the telescope 50 within field of view 23.

In operation, the sequencer 51 alternates between sending a voltage to alternately energize spotlights 13a and 13b during corresponding time periods "a" and "b". When the voltage is applied to spotlight 13a, the outgoing light is circularly polarized by polarizer 30 and the light emerges in fan of rays 22a which illuminates the aircraft wing surface 15. The light from fan of rays 22a reflected from the aircraft wing 15 passes back through field of view 23 into the circular polarizer 40 of non-inverting telescope 50 where it may be viewed by the eye 26 during the interval "a". During the period "a", an optical isolator arrangement is in place because there are two circular polarizers 30 and 40 in the path shown in FIG. 2. That is, metal areas of the wing which produce a specular mirror like reflection reverse the "hand" of the incident circularly polarized light and prevent it from passing back through the isolator. Therefore, the eye 26 sees a very dark region covering the aircraft wing, except where there is ice, which is shown on patch 16 of the aircraft wing 15 which shows brighter to the eye through the telescope.

When spotlight 13a is turned off and spotlight 13b is turned on during period "b", the light emerging from spotlight 13b is not circularly polarized. The reflection returning to telescope 50 from both the areas with ice and a metal area without ice approximately maintain their normal brightness. Thus, as the sequencer 51 alternately energizes the spotlights 13a and 13b, the image at the eye 26 from any area that is metal, specular, and ice free will appear to blink on and off. This will be "on" (bright) when the optical isolator is not in operation and "off" (dark) when isolation exists. However, areas that have ice will not blink and will have essentially constant brightness, because the polarized light produced during period "a" is depolarized upon impinging and being reflected from the ice or the metal under the ice.

Figure 10A:
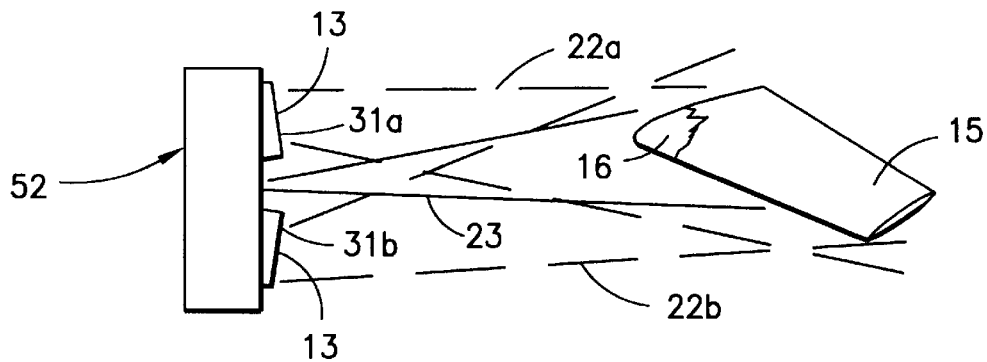
FIG. 10a is a side view of an ice detection system light projector/receiver viewing an aircraft wing.

Referring to FIGS. 10a–10f, a concentric arrangement of illuminating light sources 13 surrounding a camera 80 are shown. Light sources 13 are mounted in a support structure 52 to form an ice detection system suitable for daylight use. FIG. 10a shows a side view of structure 52 with light beams in fans of rays 22a and 22b aimed toward aircraft wing 15 with patch of ice 16. Reflected light from surfaces of wing 15 and patch 16 are collected within the field of view 23 of camera 80 mounted on structure 52. Light sources 13 contain sources of linearly polarized light that project light through quarter wave retarder windows 31a and 31b shown in side edge view in FIG. 10a to produce beams in fans of rays 22a, 22b.

Windows 31a and 31b are tilted away from the optic axes of beams in fans 22a and 22b respectively, in order to prevent light reflections from aircraft wing 15 (metal) and patch 16 (ice) from being redirected from windows 31a, 31b back towards surfaces 15 and 16.

The combination of linearly polarized light from sources 13 and quarter wave retarder windows 31a, 31b produce circularly polarized light beams in fans 22a and 22b. Reflected light from the non-ice covered surface of wing 15 is circularly polarized whereas light reflected from ice surface 16 is substantially unpolarized.

Figure 10B:
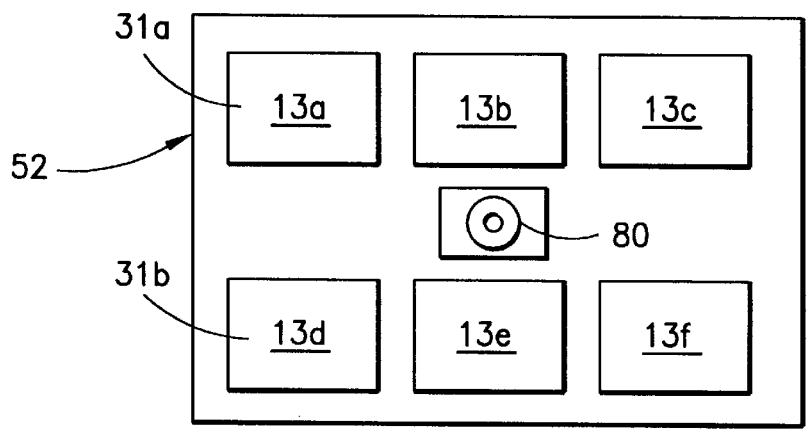
FIG. 10b is a front view of the light projector/receiver.
Figure 10C:
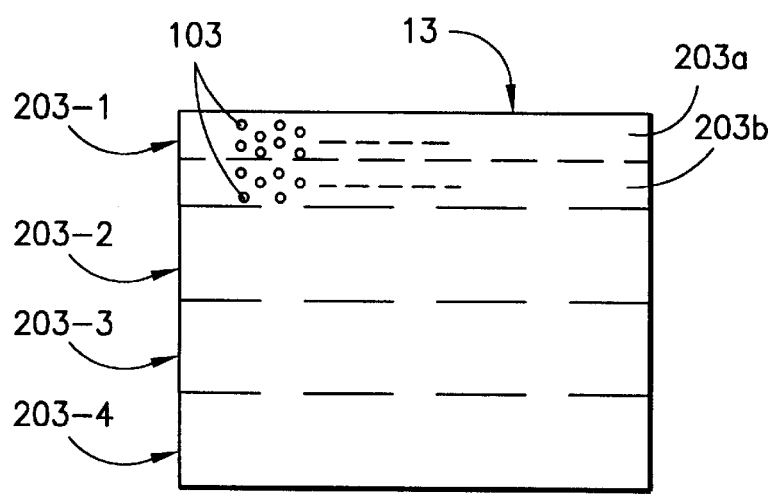
FIG. 10c is a front detail view of one light source.

FIG. 10b shows a front view of structure 52 with six light sources 13a–13f surrounding camera 80. Each light source 13 is similar in construction and has an array of linearly polarized light sources behind quarter wave retarder window 31a. As shown in FIG. 10c, each light source 13 has four similar segments 203-1 through 203-4. Each segment 203 has two assemblies 203a and 203b that have a plurality of linearly polarized light sources 103. Each light source 103 is, for example, an LED (such as AND180CRP which produces an 8° beam) mounted behind a linear polarization filter. The polarization axis of the filter is preferably oriented at 45° to the vertical to minimize preferential reflection of the light from the surface 15 to be illuminated. The polarization axes of the filters on assemblies 203a and 203b are mounted orthogonal to each other to provide the basis for distinguishing areas containing ice such as patch 16 on wing surface 15.

Assemblies 203a and 203b are placed in close proximity to assure that the light projected from each impinge on wing surface 15 at nearly equal angles of incidence to minimize differences in reflected energy and to provide the largest possible depth over which the beams of light from each assembly 203a and 203b coincide. Assemblies 203a and 203b are preferably independently adjustable in two directions to enable alignment of the light beams from these assemblies. They can each be tilted vertically and rotated horizontally by incremental amounts to provide overlap of the beams from light sources 13a through 13f.

Figure 10D:
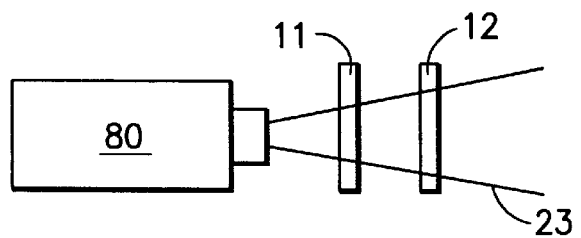
FIG. 10d is a schematic view of the receiver portion of the ice detection system.

FIG. 10d shows camera 80 with associated quarter wave retarder plate 12 for converting circularly polarized light received within camera field of view 23 to linearly polarized light that can be blocked by linear polarizer 11 (when the polarization is orthogonal to the polarization axis).

During operation of the system of FIGS. 10a–10d, all assemblies 203a of light sources 13 are strobed to produce light circularly polarized of one hand. Then when camera 80 is ready to record the next image, all assemblies 203b of light sources 13 are strobed to produce light circularly polarized of the other hand. Specularly reflected light from the metal part of wing surface 15 is rejected in one image and not in the other, creating a blinking effect. Light reflected from ice patch 16, however, is substantially non-polarized and recorded in all images formed within camera 80 without a blinking effect.

The images are then directly displayed on a TV monitor for an observer to determine if any ice is present. The images also can be processed and presented to an observer as enhanced images clearly defining areas where ice patch 16 is present on wing surface 15.

An alternate arrangement to that shown in FIGS. 10a–10d is to omit quarter wave retarding plate windows 31a and 31b from the light sources 13, and quarter wave retarding plate 12 from camera 80. Linear polarizer 11 rejects light reflected from clear portions of surface 15 when the projected polarization is orthogonal to its polarized axis and passes light from the same surface when the projected polarization is aligned to its polarization axis.

Figure 10E:
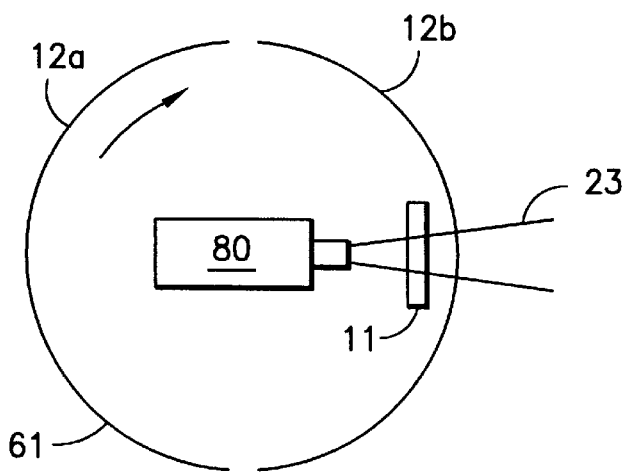
FIG. 10e is an alternate version of the receiver portion of the ice detection system using alternating quarter wave retarder plates.

A further alternative arrangement is to use a single linear polarization filter (or separate filters with their polarization axes aligned) in front of light sources 103 on assemblies 203a and 203b. FIG. 10e shows a camera 80 surrounded by rectangular quarter waveplate segments 12a and 12b bent into half-cylinders to form a barrel 261 that is rotated to alternate the two half-cylinder segments 12a and 12b in front of camera 80 when light source 13 is strobed. One quarter waveplate segment 12a is arranged to accept circularly polarized light of one hand received in camera view angle 23 and convert it to linear polarization aligned to linear polarizer 11, thus allowing the light to pass to camera 80. The other quarter waveplate segment 12b is arranged to accept the same light and convert it to linear polarization orthogonal to the polarization axis of linear polarizer 11, thus preventing the light from reaching camera 80.

Using the camera of FIG. 10e, all assemblies 203a and 203b of the light sources 13 are strobed simultaneously when camera 80 is ready to record an image. Barrel 261 is rotated to synchronize the positions of segments 12a and 12b to be present alternately for sequential images. Light sources 13 project circularly polarized light of one hand on a surface 15. Light reflected from specular portions of wing surface 15 will be circularly polarized and produce a blinking image in camera 80 as segments 12a and 12b alternately cause the reflected light to be passed or blocked respectively. Unpolarized reflected light from ice patches 16 will pass to camera 80 when either segment 12a or 12b is present and the images will not blink. Further, since the closely spaced light source assemblies 203a and 203b are strobed for both images, there is no angular shift in the light source that could alter the reflected light intensity. This arrangement reduces light intensity variation from specular surfaces that could tend to reduce the blinking effect.

Figure 10F:
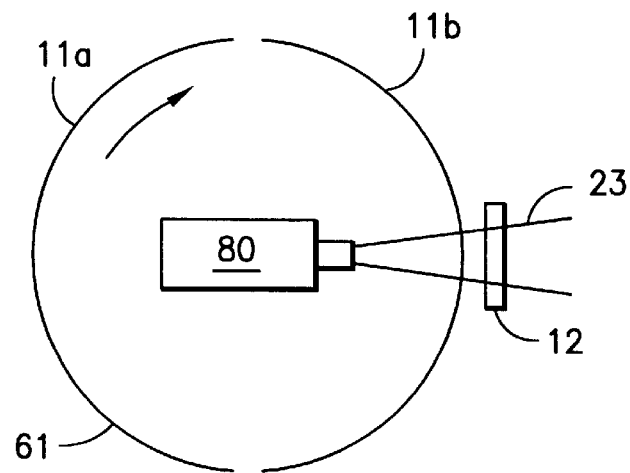
FIG. 10f is an alternate version of the receiver portion of the ice detection system using alternating linear polarizer plates.

A further alternate arrangement omits the quarter wave retarding plate windows 31a and 31b from light sources 13. FIG. 10f shows video camera 80 surrounded by rectangular linear polarizer segments 11a and 11b bent into half-cylinders to form barrel 261 that is rotated to alternate the two segments, as previously described. Segment 11a is arranged to have its polarization axis aligned to the polarization of light received in camera view angle 23, reflected from wing surface 15. Segment 11b is arranged to have its polarization axis orthogonal to the same light.

Using the camera of FIG. 10f, all assemblies 203a and 203b of the light sources 13 are strobed simultaneously and produce linearly polarized light of one polarization when camera 80 is ready to record an image. Barrel 261 is rotated to synchronize the positions of segments 11a and 11b to be present alternately for sequential images. Light reflected from specular portions of wing surface 15 is linearly polarized and produces a blinking image in camera 80 as segments 11a and 11b alternately cause the reflected light to be passed or blocked respectively. Unpolarized reflected light from ice patches 16 partially passes to camera 80 when either segment 11a or 11b is present and the images do not blink.

A further alternate arrangement retains the quarter wave retarding plate windows 31a and 31b of the light sources, and adds quarter wave retarder plate 12 as shown in FIG. 10f. This arrangement produces circularly polarized light of one hand from light sources 13 for projection upon wing surface 15. Plate 12 then converts the circularly polarized light from specular portions of wing surface 15 to linearly polarized light aligned to the polarization axis of segment 11a and orthogonal to the polarization axis of segment 11b. Thus a blinking image will be produced for specular portions of wing surface 15, but not for iced patches 16 that reflect light that is substantially unpolarized.

Figure 11:
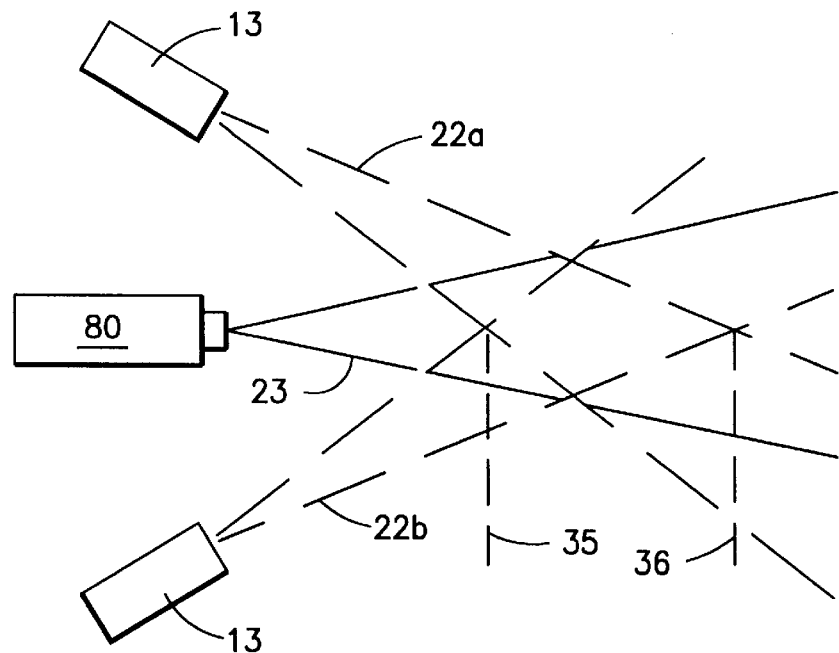
FIG. 11 schematically depicts the view coverage of the system.

Referring to FIG. 11, the coverage of the ice detection system of FIGS. 10c–10f is shown. Light beams in fans 22a and 22b from light sources 13 are aimed to illuminate surfaces at distances between points 35 and 36 from camera 80 and within camera view angle 23. This is done in both the vertical and horizontal planes.

Figure 12:
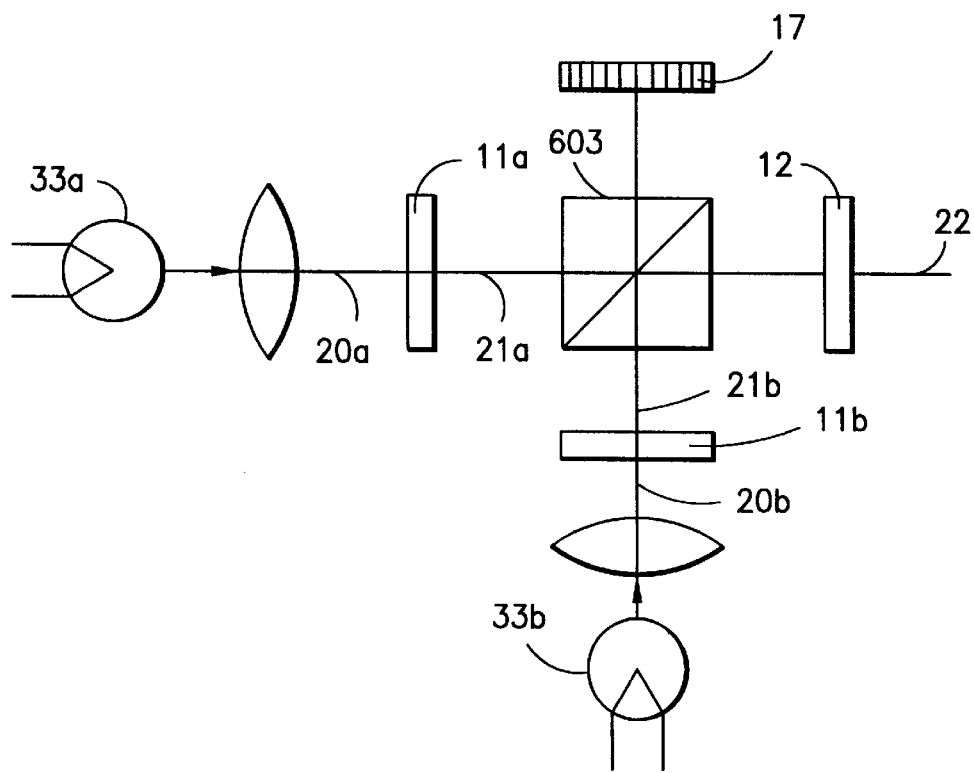
FIG. 12 is a schematic of an alternative light source producing coaxial beams for isolator and non-isolator states.

Referring to FIG. 12, another form of light source 13 of FIGS. 10a–10f is shown. A lamp 33a, such as a flash lamp, has its light shaped into a beam 20a by optics. Beam 20a is linearly polarized by polarizer 11a forming linearly polarized beam 21a whose polarization is aligned to the polarization axis of polarizing beam combiner 603. Polarizing beam combiner 603 is a polarizing beam splitter such as Melles Griot 03PBS049 which is used in reverse to form a beam combiner. Beam 21a passes through beam combiner 603 and quarter wave retarder plate 12 to form circularly polarized beam 20c. Likewise lamp 33b forms beam 20b, which passes through linear polarizer 11b forming linearly polarized beam 21b whose polarization is orthogonal to the polarization axis of beam combiner 603. Beam 21b is turned 90°, passes through retarder plate 12, and is aligned to coincide with beam 21a in beam 20c. Since the two beams 21a, 21b coincide in beam 20c, any angular offset effects of the light source are avoided as the lamps 33a and 33b are alternately strobed for reception by a camera 80 as shown in FIG. 10d. The principles of operation are as previously described, with lamp 33a of FIG. 12 replacing assembly 203a of FIG. 10c and lamp 33b replacing assembly 203b. Alternately, quarter wave retarder plates 12 in FIG. 12 and FIG. 10d may be discarded to produce a system relying on linearly polarized light rather than circularly polarized light as previously described.

The linear polarizers 11a and 11b in FIG. 12 are not required if an absorber 17 is placed as shown to absorb the orthogonal polarized light of beam 21a, which is reflected by beam combiner 603, and the aligned polarized light of beam 21b, which passes through beam combiner 603.

The intensity of light reflected from a specular surface can vary by many orders of magnitude depending on the viewing angle. If camera 80 has an insufficient dynamic range, specular reflections of high intensity can cause saturation in portions of the image that can spread to adjacent areas providing a distorted image and may obscure the blinking effect, preventing the proper system operation.

One solution to the dynamic range problem is first to form the blocking/non-blocking image pairs with a normal level of light intensity and then with a lower level projected light intensity. The overall dynamic range of the system is thus increased by the amount (say 10:1) of the light reduction. If a greater dynamic range is required, a third image pair can be made at a further reduction. The overall dynamic range of the system is thus increased by the product of the reductions (say 10×10=100:1).

The reduction of the amount of light projected by light source 13 does not improve on the interference introduced by background light energy that is within the field of view and adds to the image. A preferred method of increasing dynamic range, while at the same time reducing background interference, is to take several blocking/non-blocking image pairs where each pair is taken at a reduced camera sensitivity by reducing the aperture size or aperture time of camera 80 while keeping the projected light intensity constant from light source 13. Background interference is further reduced by filtering the light received by camera 80 with a filter transparent to the wavelengths of light projected by light source 13 and blocking background light of other wavelengths. Because a sensor's response to light is sometimes non-linear and the ratios desired are not necessarily constant, it is not possible to merely subtract the observed value of background light. Rather, the background light and the non-isolator light are used as an index (or indices) into a look-up table of predetermined values to serve as a threshold for determining if the isolator light level is an indication of the presence of ice. The method for automated processing is described later.

Figure 3B:
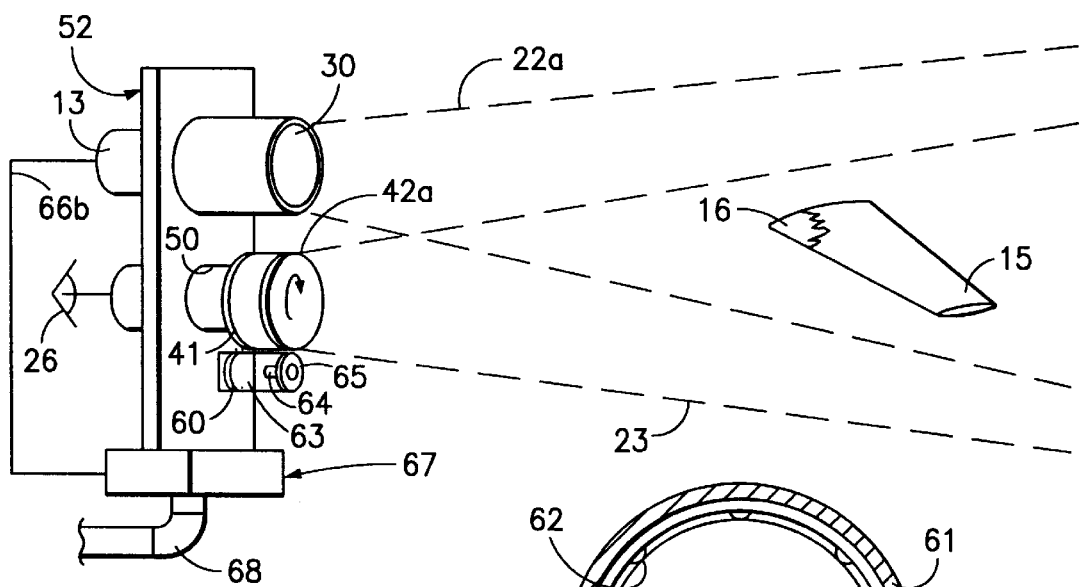
FIG. 3B is a schematic view of an ice detection apparatus based on direct visual observation which uses one circularly polarized light source.

Referring to FIG. 3B, another ice detection apparatus especially suitable for night use is shown. The apparatus of FIG. 3B is based on direct visual observation and uses only one light source 13 with a circular polarizer 30, such as shown in FIG. 1A. The receiver telescope 50 has apparatus at its input for changing a circular polarizer between the isolating (FIG. 1A) and non-isolating (FIG. 1B) states. The light source 13 and the telescope 50 are mounted on a support structure 52 of a boom mount or tripod 68. A power supply 67 for light source 13 also is mounted on the boom.

Power supply 67 supplies the power to light source 13 along a cable 66b. Light source 13 incorporates a circular polarizer 30, such as that of FIG. 1A. The field illuminated by light source 13 is shown as fan of rays 22a and encompasses an aircraft wing area 15 which has a patch of ice 16. Telescope 50 has a field of view encompassing the aircraft wing, or portion of the wing, and is shown as the rays in field of view 23 entering the telescope 50. Telescope 50 alternates between optical isolation and non-isolation with respect to the reflected light using a circular polarizer made of a fixed linear polarizer 41 and a quarter wave retarder plate 42a.

Figure 3C:
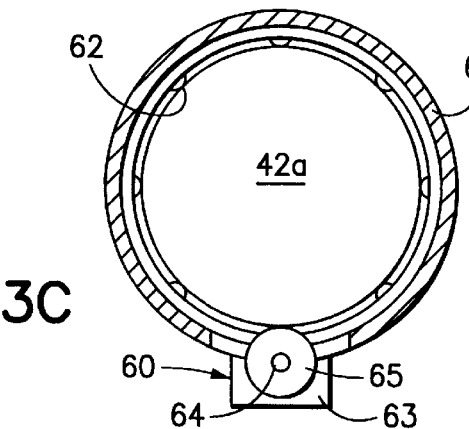
FIG. 3C is a detail of the FIG. 3B apparatus for switching the polarizer between isolating and non-isolating states in the detection path.

Referring to FIG. 3C, the quarter wave retarder plate 42a is rotated about its optical axis by a drive 65. The quarter wave retarder plate is rim driven by friction drive 65 attached to a motor shaft 64 driven by a motor 63 which itself is attached to telescope housing 61. Bearings 62 between the quarter wave retarder plate 42a and the housing 61 relieve friction so that the quarter wave retarder plate 42a may freely rotate about its optical axis. When the quarter wave retarder plate has rotated to such a position that its slow and fast axes are at 45° to the vertical, as shown in FIG. 2, the unit acts as an optical isolator and any circularly polarized light that is specularly reflected from the aircraft wing 15 cannot pass through the combination of the quarter wave retarder and the linear polarizer to the eye 26.

A similar end may be achieved by rotating the linear polarizer 41 via rim drive 60 and keeping the quarter wave retarder plate 42a fixed or by keeping both linear polarizer 41 and quarter wave retarder plate 42a fixed and rotating a half wave plate (not shown) mounted between them with rim drive 60.

The position for optical isolation is achieved twice during two positions spaced 180° apart for each revolution of the quarter wave retarder plate 42a. At any other position of rotation of retarder plate 42a, there is no isolation and the circularly polarized light reflected from the various portions of the wing, both metal and ice, is free to pass through to the eye with only minimal attenuation. Therefore, the specularly reflective metal portion of the wing that is not covered with ice will reflect light from the light source 13, circularly polarized, back through the isolating mechanism, linear polarizer 41 and quarter wave retarder plate 42a. This specularly reflected light is interrupted twice per revolution and blink off completely. During the other positions of the circular polarizer retarder plate 42a rotation, the light passes through to the eye 26. Thus, the "on"-"off" blinking effect is produced twice for each rotation of plate 42a.

On the areas of the wing 15 when there is ice present, the incident circularly polarized light from lamp source 13 and polarizer 30 is depolarized due to the surface of the ice or by passing through the ice. This depolarized light passes through the isolator, linear polarizer 41 and quarter wave retarder plate 42a, at the telescope 50 regardless of the rotational position of the quarter wave retarder plate 42a. That is, even when the retarder plate 42a is in one of its two isolating positions relative to reflected polarized light, the non-polarized light reflected from the ice passes through to the telescope as well as when the retarder plate is in a non-isolating position.

The eye 26, which is looking through the telescope 50, is able to differentiate between the blinking effect produced by the ice free section of the wing 15 and the non blinking effect produced by patches 16 of the wing with ice. That is, the sections of the wing covered with ice 16 appear to have constant illumination and the ice free sections of the wing appear to blink at a rate of twice the speed of rotation of the quarter wave plate 42a.

In either of the embodiments of FIGS. 3A and 3B, the apparatus can be moved to scan all parts of the wing if the field of view is not large enough.

Figure 4A:
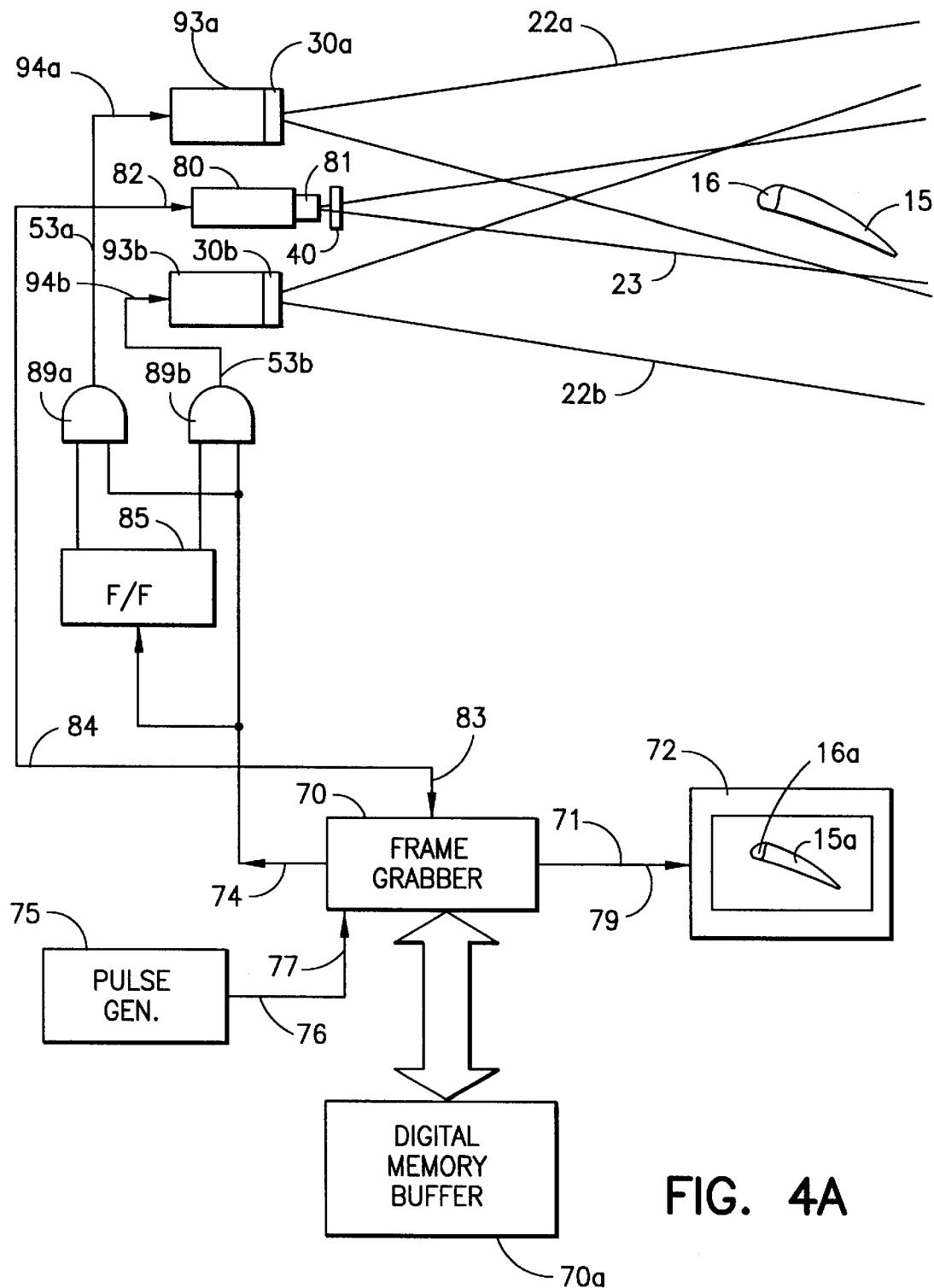
FIG. 4A is a schematic diagram of a video based ice detection system suitable for use with high background illumination levels which employs two strobed light sources.

Referring to FIG. 4A, an indirect viewing video-based ice detecting system that employs two strobe lamp spotlights is shown that is suitable for use with high background illumination levels.

The system of FIG. 4A is similar to that of FIG. 3A in that it employs two strobe lamps 93a, 93b. These lamps are of the type which produce a high intensity output, for example a xenon lamp, for a short time period. Here, both strobe lamps 93a and 93b have circular polarizers, such as shown in FIG. 1A, attached. One is a right handed circular polarizer 30a and the other a left handed circular polarizer 30b. The strobe lamps 93a and 93b are used in conjunction with a conventional video camera 80 with a lens 81 having a right handed circular polarizer 40 at its input.

The analog signals of the image produced by the video camera, which observes the scene illuminated by the strobe lamps 93a, 93b, are sent to a conventional frame grabber 70. The frame grabber 70 converts the analog video signal received from camera 80 into digital form and stores the data in a digital memory buffer 70a. Pulse generator 75 is used to initiate the strobing of the lights and the grabbing of a single isolated frame by the frame grabber from the video camera.

The system also preferably has a digital to analog converter (not shown) and sync generator (not shown) so that the image stored in the buffer 70a can be sent from the frame grabber video output to a video monitor and/or VCR 72 along cable 71. The video monitor and the video cassette recorder (VCR) are commercially available. As an alternative, the video monitor may have a disk recorder which is also commercially available. The frame grabber may be purchased with additional memory and a computer attached as part of one single image processor unit. Frame grabber 70 and its memory, plus the computer, may be bought commercially as the Cognex 4400.

A flip flop 85 alternates between states on every strobe pulse produced by pulse generator 75. This allows selectively gating a strobe pulse to either lamp 93a or 93b so that they illuminate alternately. When a pulse trigger input is received by the frame grabber 70 from pulse generator output 76, a camera synchronized strobe pulse is generated which is fed from the frame grabber output 74 to the flip flop 85. The strobe pulse toggles flip flop 85 and is gated through one of two AND gates 89a and 89b. When the flip flop 85 is in one state the strobe out of the frame grabber is gated through AND gate 89a to the input 94a of strobe lamp 93a along wire 53a. When flip flop 85 is in its other state, a pulse is sent along wire 53b to input 94b of strobe lamp 93b. Thus, lamps 93a and 93b are illuminated alternately.

The field of view from the strobe lamp 93a with right hand circular polarizer 30a is shown as fan 22a. The illumination area from strobe lamp 93b with left handed circular polarizer 30b is shown as fan 22b. The video camera 80 has a field of view 23 that covers the overlapping region between fans 22a and 22b. The wing 15 with ice patch 16 are in the video camera field of view 23. The images that correspond to wing 15 and ice patch 16 that are shown on the video monitor 72 are labeled correspondingly as wing image 15a and ice image 16a.

During operation, the pulse generator 75 is set to provide trigger signals at a constant rate, e.g., in a range between 1 and 10 Hz. When a trigger signal enters the frame grabber input 77, it is synchronized with the frame grabber internal cycle and at the proper time the frame grabber provides a strobe to flip flop 85 which is passed on to strobe lamps 93a or 93b. The strobe output is timed properly to be aligned with the frame synchronization signal sent along cable 84 as frame grabber output 82 into the video camera 80. Cable 84 provides a path from the frame grabber 70 to the video camera 80 for synchronization and a return path for video camera output 83 to the frame grabber for the video signal.

If the pulse received by the AND gate 89a is enabled because flip flop output 85 is high, the strobe passes through AND gate 89a, enters the strobe input 94a, and fires the strobe lamp 93a. The strobe lamp produces a very short light pulse of approximately 10 microseconds length. The light pulse from the strobe lamp 93a illuminates the wing area. The reflected light from any ice free specular area of the wing is left handed circularly polarized because of the right handed circular polarizer 30a at the output of strobe lamp 93a. Because the video camera 80 has a right handed circular polarizer 40 at its input, it acts as part of an isolator. That is, any reflection from a clean metal specular area of the wing reflects left handed polarized light which is not able to reach the right hand circular polarizer 40 of the camera 80. Thus, these areas as viewed by the camera are very dark. The image sent by the video camera to the frame grabber also appears very dark as well as the stored image that is sent from the frame grabber buffer memory into the video monitor input 79 via wire 71. Ice present on the wing spoils the circular polarization of the polarized incident light and the image scene of the reflective light picked up by camera 80 and viewed on monitor 72 is not dimmed.

When the strobe signal passes through AND gate 89a, it simultaneously resets flip flop 85 to the opposite state such that AND gate 89b is enabled. Therefore, the next pulse from the pulse generator 75 into the frame grabber 70 causes the corresponding strobe pulse to be generated which is gated through AND gate 89b to energize strobe lamp 93b whose light output is left handed polarized. Energy from strobe lamp 93b that strikes the wing 15 and returns from clean metal is sent into the right hand polarizer 40 of the video camera 80. However, in this case, because the polarizations are of opposite hand, the reflected light energy that enters from specular reflecting portions of the wing 15 will pass through right handed polarizer 40 and into video camera 80 via lens 81 with only minor attenuation. That is, light from the left handed circularly polarized source 93b, 30b is changed to right handed circular polarization upon specular reflection from wing 15. This light passes freely through the video camera's right hand circular polarizer 40.

The corresponding analog signal from the video camera that is sent to the frame grabber 70 is recorded in its frame memory buffer and is output along line 71 to the video monitor 72. This particular signal creates an image that has little difference in light intensity between a specular area or an ice covered area. Polarization in this case is not important since the specularly reflected left handed circularly polarized light will pass through the video camera's right handed polarized filter 40. Thus, specular reflected returns as well as the returns that come from paint or ice covered surfaces pass equally well. Accordingly, the blinking effect is produced for the area of a metallic surface which does not have ice on it.

Video camera 80 is preferably of the type with a built-in electronic shutter such as the Hitachi KP-M1. Because the camera shutter can be set for a very brief time interval that corresponds to the time interval of the strobe lamp illumination, the camera is especially sensitive to the bright light from the strobe lamps and very insensitive to background light which is not at a peak during the brief open shutter interval and ignores all background light outside of the interval that the shutter is open.

Figure 4B:
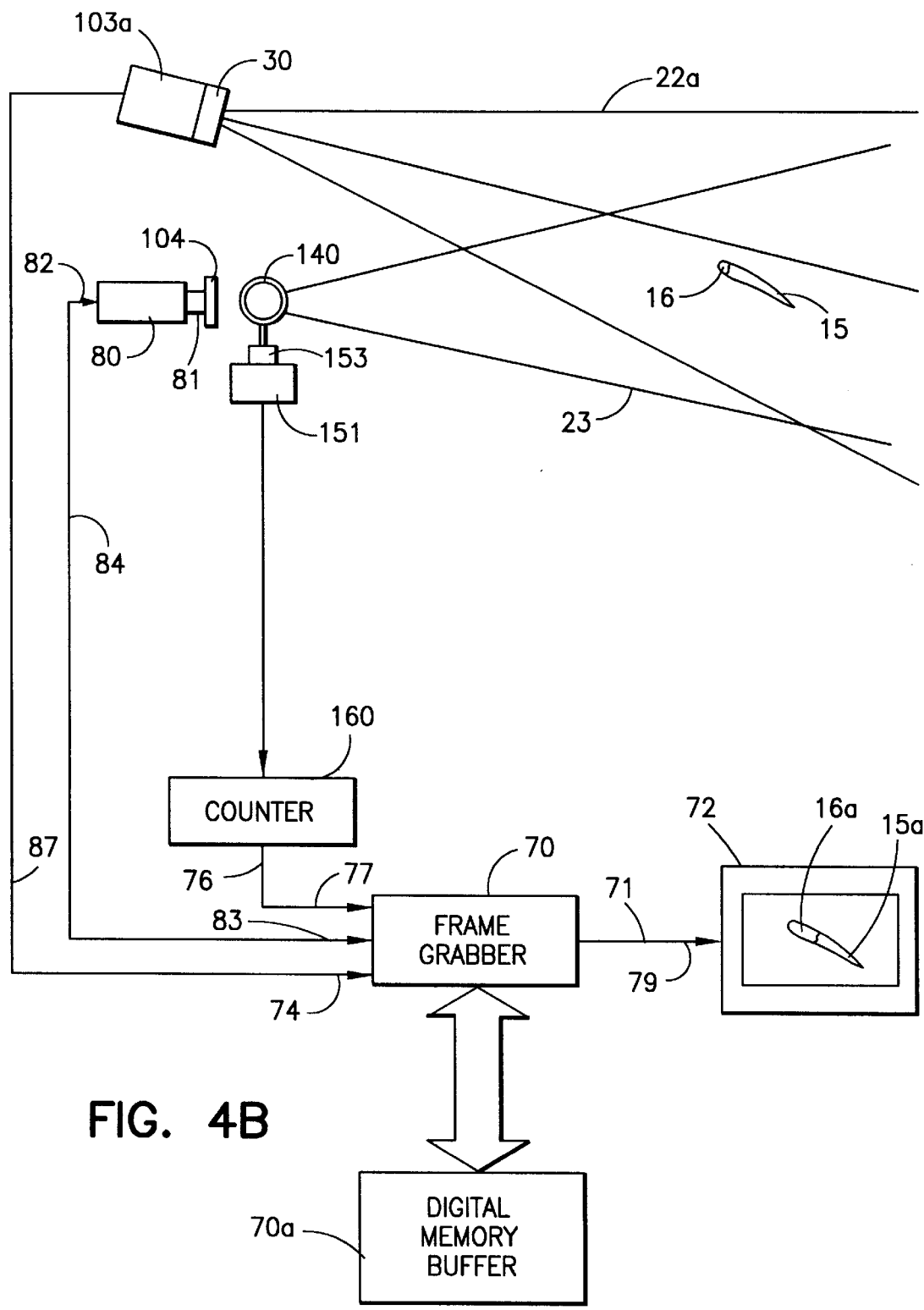
FIG. 4B is a schematic diagram of a video based ice detecting system employing one laser based strobed light source suitable for use with high background illumination levels.

Referring to FIG. 4B, an indirectly viewed video based ice detecting system employing one strobed laser spotlight is shown that makes it suitable for use with high background illumination levels. A strobe lamp 103a is a pulsed laser which typically has an output at a wavelength in the region of about 800 nanometers. Light from laser strobe lamp 103a is sent through a right hand circular polarizer 30 and covers the field of view in fan 22a. The light from a laser is often naturally linearly polarized without using a linear polarizer and in such a case it may be circularly polarized by just incorporating a properly oriented quarter wave retarder plate in right hand circular polarizer 30. The right hand polarizer 30, if it includes a linear polarizer, must be rotated to the proper position so that its self-contained linear polarizer is in line with the polarization of the laser lamp output in the event that the laser light is naturally linearly polarized.

Video camera 80 views the scene via a narrow band interference filter 104 which is centered about the strobe lamp 103a output wavelength. Generally, such a filter has a bandpass of approximately 10 nanometers and rejects all light outside of the bandpass wavelength.

Reflected polarized light from the specular reflecting part of wing 15 entering the video camera 80 also passes through a rotating right hand circular polarizer 140 placed in front of the video camera lens 81. The rotating right hand polarizer 140 is driven by a motor 151. A signal from an encoder 153 attached to the motor 151 is sent only when the rotating right hand circular polarizer 140 has its plane parallel to the lens 81 at the video camera input so that the optical axes of such lens 81 and of the polarizer 140 are in alignment.

The analog video signal from the video camera is sent to frame grabber input 83 via cable 84 and on the same cable that the frame grabber synchronizing outputs are sent to the video camera input 82. A monitor 72 plus an optional VCR (not shown) are connected to the frame grabber video output via a cable 71. The images of the wing 15a and ice area 16a on monitor 72 correspond to wing 15 and ice area 16 which are in the field of view of both the fan 22a from laser strobe lamp 103a and camera field of view 23.

In the operation of polarizer 140, synchronous motor 151 rotates the right hand circular polarizer 140 in front of the video camera 80 at a high rate of approximately 600 RPM. The plane of the right handed circular polarizer 40 lines up with the lens plane of the video camera lens 81 twice per revolution. Thus, there are 1200 times per minute that a picture may be taken. The output from encoder 153 on the rotating shaft of polarizer 140 is used to identify each time that the rotating polarizer passes through such an aligned position. The two positions per rotation are alternately isolating and nonisolating and correspond to the FIG. 1A and FIG. 1B illustrations of the isolating and non-isolating modes achieved by turning one of the circular polarizers.

The synchronizing pulses from the encoder 153 are sent to a programmable binary counter 160 which is set to divide by any desired number. The output pulses from the binary counter are sent to the trigger input 77 of the frame grabber 70 along wire 76. A typical counter divides by any integer between 1 and 16. Counter 160 allows the rate at which pictures are taken to be adjusted from a very rapid rate to a slow rate. For example, the rate at which pictures will be taken when the divider is set to 16 will be 1200 pictures per minute divided by 16, or 75 pictures per minute. To insure that alternating isolating and non-isolating states are obtained it is necessary to use only odd numbers as the divisor.

In both cases of FIGS. 4A and 4B, electronic circuits are preferably used to gate the video camera 80 to accept light only during the active interval of the strobe light. In addition, in both cases optical bandpass filters are preferably used in front of the camera to match the strobe lamp's peak wavelength while simultaneously blocking out most of the wavelengths associated with ambient lighting. The typical strobe light, a xenon flash tube, produces a 10 microsecond flash which is synchronized to the $1/10,000$ second shutter of a commercial CCD video camera. Since the unshuttered camera normally integrates ambient light for at least one field, or 16 milliseconds, there is an improvement factor of 160:1. That is, the effect of ambient sunlight is reduced by 160:1. This 160:1 factor is further improved by matching the strobe lamp (or pulse laser source) with a filter that cuts down the ambient wide band light by a much greater amount than the illumination source.

In both the systems of FIGS. 4A and 4B the video from the video camera is captured in a frame grabber and displayed on a video monitor. Thus, if the system alternates between the isolator and non-isolator state at a 2.22 Hz rate (using a divisor of 9, 1200÷9÷60=2.22), the picture on the monitor will be updated every 0.45 second and the human observer watching the monitor will see the ice free metallic surfaces blink between dark and bright at the 2.22 Hz rate.

The embodiment of FIGS. 4A and 4B effectively add an image processing computer which performs arithmetic operations on individual pixels in multiple frame stores with one frame store per captured picture. The ability to perform operations on pixels allows working with portions of the image that are of low intensity and also provides further means for eliminating the deleterious effects of undesirable background illumination such as sunlight.

Even if a curved aircraft surface region is illuminated by multiple illumination sources of circularly polarized light, it is found that due to the varied orientations of the surface normal with respect to the illumination sources and receiver, there are bright regions and dim regions in the image of the aircraft surface. The bright regions correspond to those areas where the surface normal has the proper orientation to directly reflect the light from at least one of the illumination sources into the camera lens. The dim regions correspond to those areas of the aircraft surface where the surface normal is such that the light from the illuminators is reflected predominantly away from the camera lens. As previously described, portions of the image that correspond to an ice free surface and are brightly lit tend to vary between white and black in successive pictures on the monitors of the FIG. 4A and 4B apparatus.

However, portions of the aircraft surface that are ice free but in a dim region vary between very dark gray and black in successive pictures and so are difficult to identify. This problem exists both because of the limited dynamic range of the monitor and camera and because the ratio of dark to light is intrinsically less for off-axis returns. Any remaining background light due to sunlight further reduces the apparent brightness ratio between ice free regions of successive images, particularly in the dim regions, by adding unwanted illumination to the images taken in both the isolating and non-isolating mode.

An optimum use of the equipment of FIG. 4A and 4B is first to capture an image in the frame store that corresponds to strobing the illuminator but blocking the light from specular reflection from ice free metal, i.e., capture a picture in the isolator mode. Next, the illuminator is strobed and a picture is captured in the non-isolating mode. Finally, a picture is captured with the illuminator strobe off, capturing a picture that consists purely of the undesirable background light. If the receiver (detector) optics is being varied between pictures to change between the isolating and non-isolating mode of operation, it is not important which mode it is in when the background image is captured because both modes are balanced for equal light attenuation of unpolarized light.

The digital value corresponding to the background illumination in each pixel of the frame grabber holding the background is now subtracted from each corresponding value in each of the pixels of the image in which specular returns were blocked, i.e., from each pixel of the image taken in the isolating mode. The process of subtracting the background is repeated for each pixel in the frame grabber holding the image taken in the non-isolating mode. At this point, assuming linearity of the pixel values, the effect of any remaining background light is removed from the two frame stores. If the recording or digitizing process is not completely linear, the non-linearity must be removed before performing the subtraction. This is normally performed at the time the image is first digitized and entered into the frame store via the use of a look up table in the image processor and is well known in the state of the art.

Once the effects of background illumination are removed from the images in the frame grabbers, the image processor finds the ratio of amplitudes between corresponding pixels in the two images. By forming a ratio of the value of the intensity of the pixels in the second (non-isolating) image divided by the value of the intensity of the corresponding pixels in the first (isolating) image, a ratio having values generally equal to one, or greater than one, are obtained. Ice free metallic surfaces that have surface normals reflecting the illumination towards the camera lens have the highest ratios. A normalizing value approximately equal to the Nth root of the reciprocal of the largest of the two pixel values that created the ratio (generally, the value of the pixel from the non-isolating picture) is preferably used as a multiplier to enhance the ratio from the ice free surfaces that are dim due to their being off-axis with respect to directing the reflected light towards the camera. N is typically an integer equal to or greater than 2. Of course, only values higher than some chosen threshold should be so normalized so that the system does not respond to noisy signals. If desired, the preceding arithmetic manipulation of pixel values may instead be performed on groups of pixels that correspond to segmented or filtered portions of the aircraft surface image. These filtering techniques, which include low pass spatial filtering and median filtering, may be used to operate on noisy images and are well known in the state of the art. Another suitable metric for comparing corresponding isolating and non-isolating pixel or region brightness amplitudes is the normalized difference. This is formed by subtracting corresponding pixel or region amplitudes and dividing the result by the sum of their amplitudes.

To highlight ice free regions in the most easily interpreted form, the ratios may be assigned to colors such as, for example, high ratio regions are assigned to the color green, low ratio regions to the color red, and intermediate ratio regions to the color yellow. These colors may be used to color the nonisolator image on the screen of the color video monitor. Optionally, the ratios may be encoded in black to white intensity levels that may be displayed in the same manner as the color encoded images. Such levels may be used to indicate ice thickness according to the amount of depolarization observed.

All of the preceding techniques of using isolator and non-isolator structures may be implemented by using linearly polarized light in the illuminator, rather than circularly polarized light, and equipping the receiver (detector) with a linear polarizer that is alternately aligned with and then at right angles to the polarizer in the illuminator. This mode of operation depends upon the fact that an ice-free metallic surface returns polarized light approximately unchanged whereas an ice covered metal surface or matte material depolarizes the light. Thus, once again, an ice covered metallic surface remains at approximately the same intensity. Of course, the transmitted linear polarization can be alternated between being aligned with and then being at right angles to the direction of a linear polarizer in the receiver to achieve the same end.

Figure 5A:
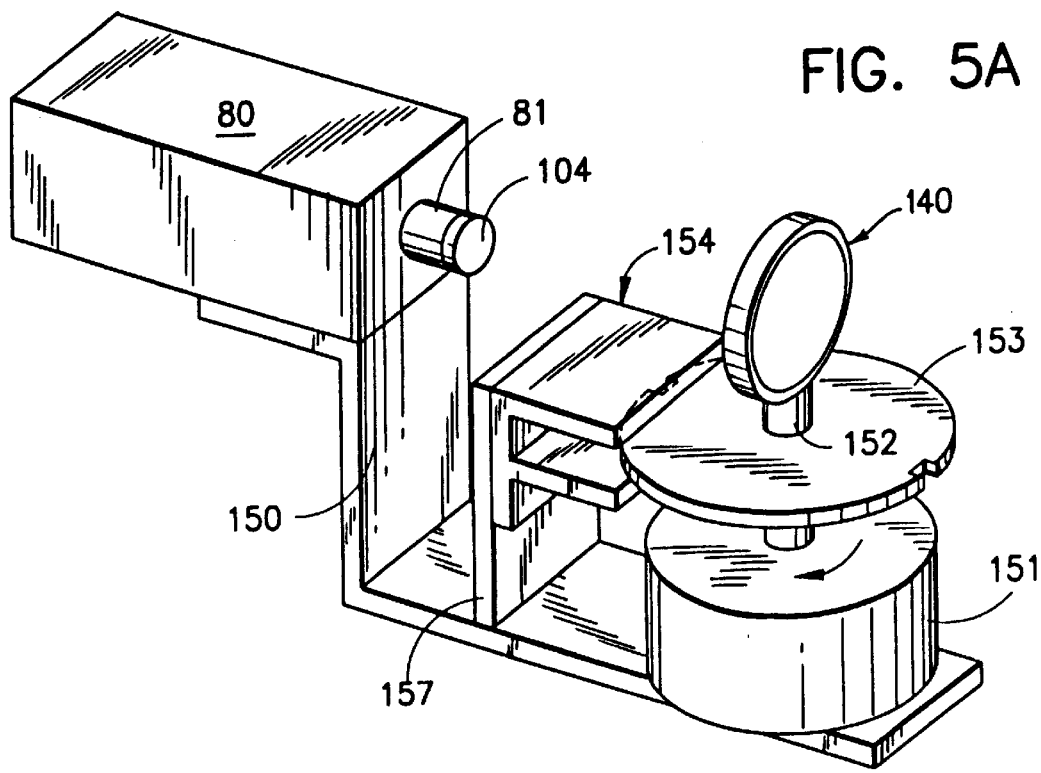
FIG. 5A is a schematic view of the device used in FIG. 4B to switch the polarizer from an isolating to a non-isolating state in the detection path.

FIG. 5A shows the details of the FIG. 4B rotating circular polarizer 140 and video camera 80 assembly. Video camera 80 is mounted to a bracket 150. A motor 151, also mounted to bracket 150, has a slotted output shaft 152 for allowing the circular polarizer 140 to rotate in synchronism with the shaft. An encoder disk 153 mounted on shaft 152 senses the position of the rotating polarizer 140. Encoder disk 153 has a photo optical interrupter 154 supported by a member 157 affixed to bracket 150. The encoder disk is solid everywhere except for two positions, 180° opposite each other, which are in line with photo interrupter 154 only when the optical plane of polarizer 140 is parallel to that of the lenses in video camera lens assembly 81.

Figure 5B:
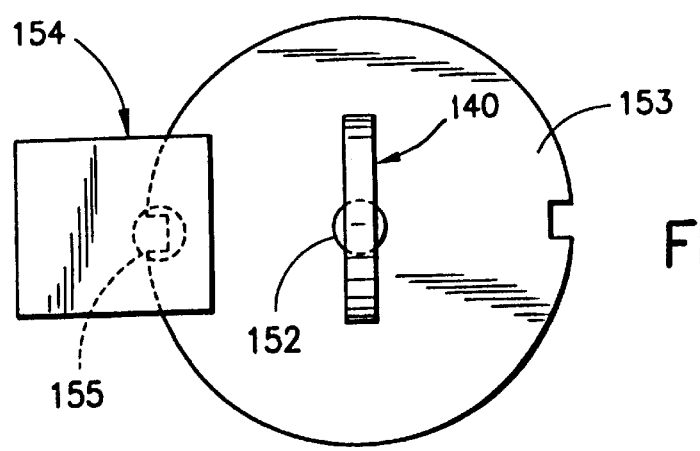
FIG. 5B is a plan view of the motor, polarizer, and encoder assembly used with the apparatus of FIG. 5A.
Figure 5C:
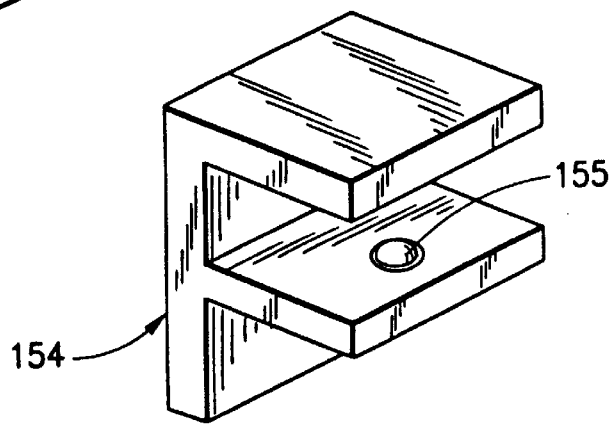
FIG. 5C is a schematic view of the photo interrupter device used in the encoder assembly of FIG. 5B.

A top view of this arrangement is shown in FIG. 5B and FIG. 5C which shows an encoder pickup 154 which incorporates an LED light source and a photo diode in one package 155 that is commercially available as Optek part number OPB12OA6.

Figure 6:
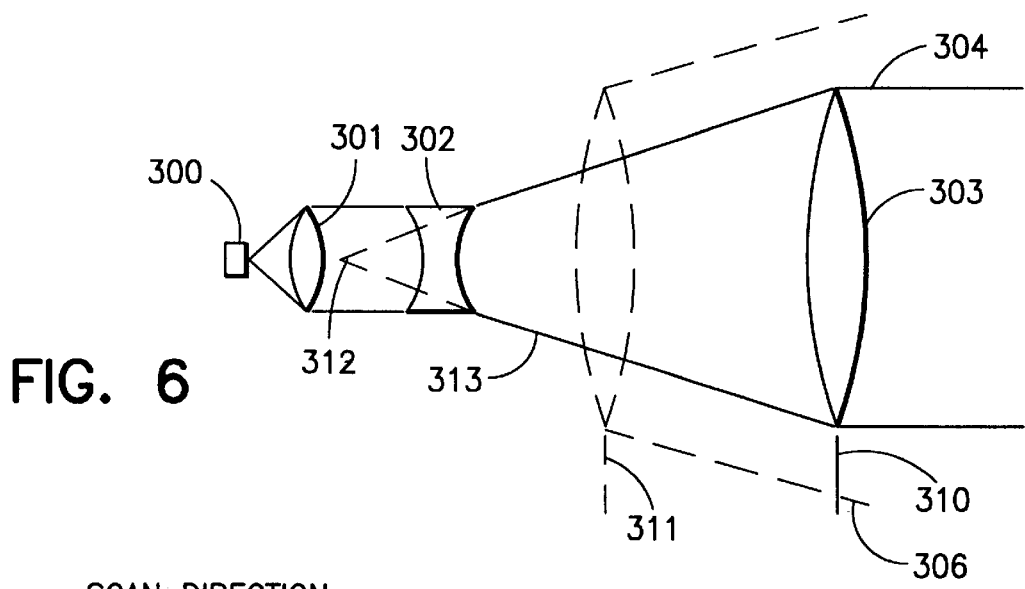
FIG. 6 is an optical schematic diagram of the laser light source of the system of FIG. 4B.

Referring to FIG. 6, an optical schematic of the laser diode spotlight assembly is shown. Light from laser diode 300 is collected by a collimating lens 301 and the collimated beam is sent into the telescope formed by a negative lens 302 and a positive lens 303. When the focal point of the positive lens is coincident with that of the negative lens, a collimated beam emerges from the positive lens 303. Positive lens 303 is shown in position 310 such that its focal point coincides at a point 312 with that of negative lens 302. A collimated beam 304 is the result of this configuration. When the positive lens 303 is moved closer to the negative lens, such as to position 311, the beam 306 that emerges is expanding and so covers a wider field of view. Thus, by adjusting lens 303 from position 310 to a point where it is close to negative lens 302, it is possible to obtain any output light cone between collimation and a cone slightly narrower in angle than that of beam 313 as it leaves negative lens 302. The arrangement of FIG. 6 is also applicable to all other illumination sources shown when the source (filament or flash lamp) is small.

Figure 7:
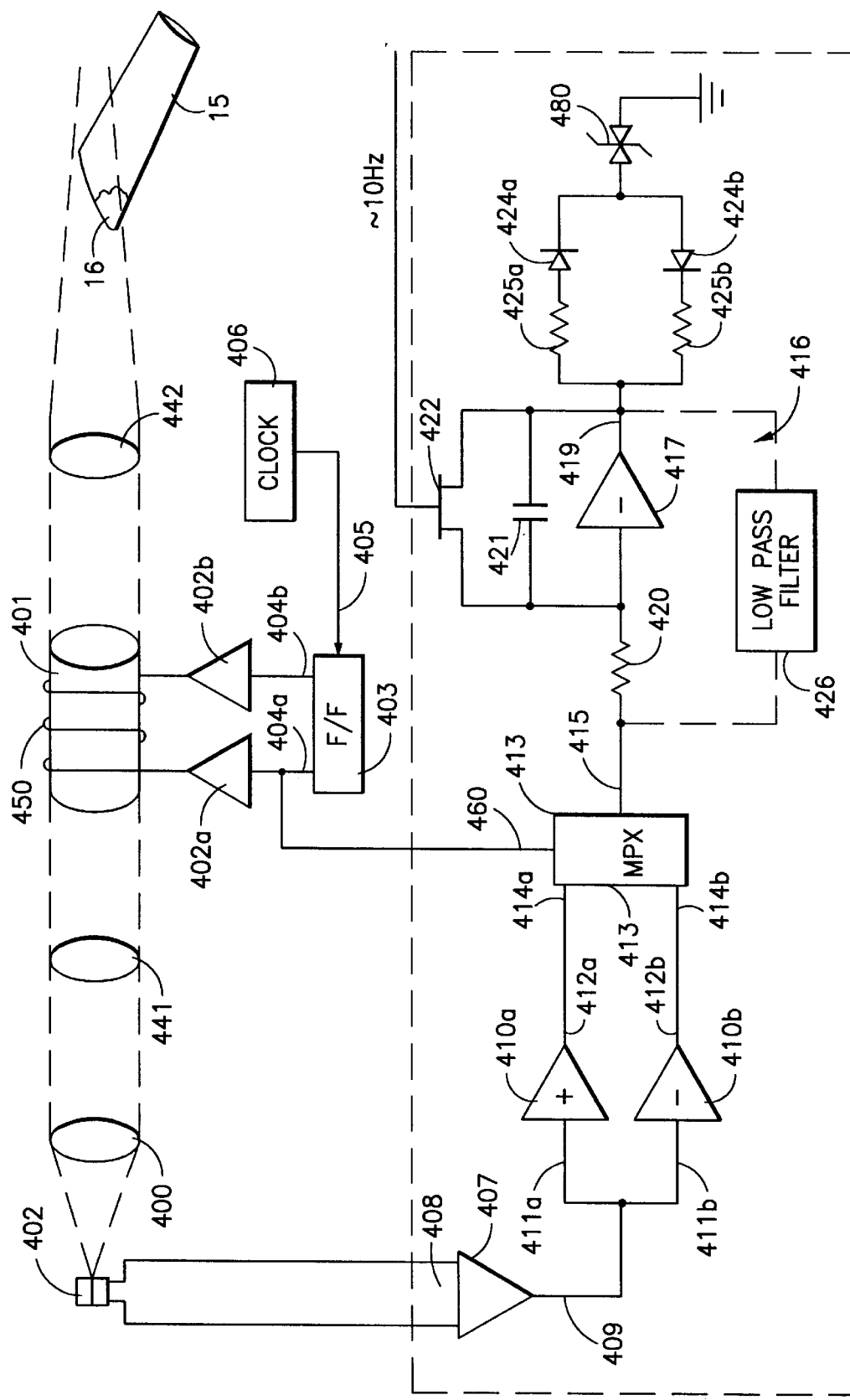
FIG. 7 is a schematic of another embodiment of the invention utilizing synchronous detection.

Referring to FIG. 7, an indirect viewing system for detecting ice on a specular surface is shown that uses a synchronous detection method that operates with one photosensor or an array of photosensors, according to the field of view and resolution required. The illumination source for the surface area 15 to be inspected is not shown but may be any bright source of either right handed or left handed circularly polarized light.

The area that is to be inspected is imaged via a camera lens 400 onto a photodiode 402, or onto an array of similar photodiodes. The circular polarizer required for isolation is formed by quarter wave retarder plate 442, linear polarizer 441, and Verdet rotator 401. The Verdet rotator 401 is typically of garnet and energized by a magnetic field created by a coil 450 via power buffer amplifiers 402a and 402b which alternately drive current through the solenoid, first in one direction and then in the other. The effect is to cause linearly polarized light from the quarter wave plate passing through the rotator to change the direction of its polarization by ±45° according to the direction of the solenoid current flow. Other devices based on the Hall effect or Pockel's effect which use high voltage fields could be used in a similar manner.

In the static condition with no current flow through the coil 450, both right handed and left handed reflected circularly polarized light from wing area 15 passes through polarizer 441 to the photo diode 402 with little attenuation because the slow axis of quarter wave plate 442 is in line with the polarization axis of linear polarizer 441. Therefore, light of either hand circular polarization (CW, CCW) is at 45° to the polarizer and so passes through polarizer 441 without large attenuation. However, when the coil is alternately energized with current flow in opposite directions, the addition and subtraction of 45° to the plane of polarization present at the output of the quarter wave plate 442 causes the plane of polarization to alternate between vertical and horizontal at linear polarizer 441. Thus, reflected circularly polarized input light alternately is allowed to pass and not pass to the photo diode detector.

Because the rotation of the plane of polarization is performed via current direction switching, it can be performed quite rapidly. A 10 KHz rate, which is adequate for the apparatus, is easily obtained. A clock source 406 provides pulses to a flip flop 403 at its toggle input 405. The flip flop 403 outputs 404a and 404b are amplified by buffers 402a and 402b to energize coil 450 in a direction that varies according to the state of the flip flop 402.

The optical energy received at the photo diode array 402 generates a corresponding electrical signal that is applied over an input line 408 to a differential amplifier 407. An output 409 of amplifier 407 feeds two buffer amplifiers 410a and 410b via their inputs 411a and 411b. Both amplifiers 410a and 410b have equal gain but are of opposite polarity.

A multiplexer 413 has its inputs 414a and 414b connected to the two amplifier outputs 412a and 412b. The multiplexer 413 directs its two inputs to its single output 415 according to the state of its select terminal 460 which is connected to output 404a of the flip flop 403. The output 415 of the multiplexer 413 is applied to an integrator 416 or optional low pass filter 426. The integrator 416 is formed by an input resistor 420, an operational amplifier 417, a capacitor 421, and a field effect transistor 422 which is used to periodically reset the integrator by discharging the capacitor. This arrangement is well known in the art. The integrator 416 (or filter 426) output 419, when greater than a threshold voltage positive or negative as set by a double end Zener diode 480 and current source resistors 425a and 425b, energizes one of the oppositely poled LED's 424a or 424b.

The detection circuit of FIG. 7 rejects the light reflected from diffuse or ice covered areas but passes that from ice-free specular surfaces. Diffuse or ice covered surfaces return unpolarized light to the detector. With these type surfaces, although the current direction in the Verdet rotator 401 is changing direction at a 10 KHz rate, the light received by the photo diode 402 remains at a constant level, i.e., the light amplitude is unchanged because the light is not polarized.

The electrical voltage at the output 409 of amplifier 407 responds to the input level and remains constant. The multiplexer 413 alternately selects equal, constant level, positive and negative voltages so that the integrator 416 (or low pass filter 426) output 419 stays close to zero and neither of the LED's 424a or 424b draw current since the output voltage does not overcome the Zener diode 480 threshold voltage.

When area 15 is ice free, the light returned to the apparatus is circularly polarized and the signal at photodiode 402 alternates between a large and small value at a 10 KHz rate. Since the two voltages selected at terminals 414a and 414b differ in amplitude, they do not average to zero at the output of the integrator 416 (or low pass filter 426) and one of the LED's will light, according to whether the larger of the two voltages at point 409 is received when the state of flip flop 403's output 404a is high or low. This, in turn, usually depends upon whether a right handed or left handed illuminator is being used. The output LED also changes if the wing area 15 being observed receives most of its circularly polarized illumination indirectly via specular reflection from another surface, since each such reflection changes the state (hand) of the circular polarization.

The apparatus of FIG. 7, when used with a single photodetector, is useful with a mechanical drive apparatus that scans the optical axis of the assembly in both elevation and azimuth to generate a raster scan which creates a full image of a scene on a point by point basis. The output 419 is sent to a video display being scanned via its deflection circuits in synchronism with the mechanical drive apparatus to paint the image on the screen. As an alternative, the optical axis may be scanned in a raster pattern using azimuth and elevation deflecting galvanometer arrangements such as are commercially available from General Scanning Corpora-tion. Of course, such synthetically generated images may also be digitized and processed using the image processing hardware and software techniques previously described.

Figure 8A:
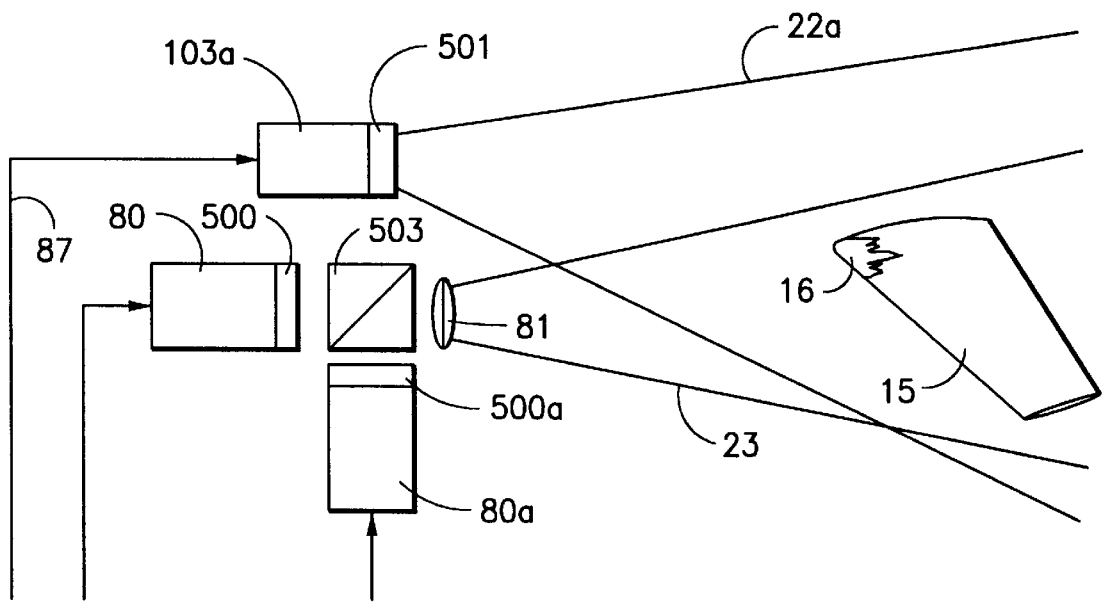
FIG. 8A is a schematic view of an embodiment using two video cameras and a beam splitter device.

FIG. 8A shows an embodiment of the invention useful when it is important to obtain ice detection information in an extremely rapid mode that is useful for scanning across an object in a short time without the smearing or the misregistration that occurs when the camera is panning and sequential pictures are taken for the isolating and non-isolating modes.

In FIG. 8A, a strobe lamp 103a is used with a linear polarizer 501 to illuminate the wing surface 15 via polarized light in fan 22a. The video camera 80 with lens 81 images the scene as contained in field of view 23 which overlaps fan 22a. A polarization preserving beam splitter 503 divides the energy received by lens 81 into two substantially equal amounts which are directed to video cameras 80 and 80a. Camera 80 is fitted with a linear polarizer 500 aligned with linear polarizer 501 so that reflected specular energy passes with little loss, thereby creating a non-isolating mode receiver. Camera 80a is fitted with a linear polarizer 500a, but its axis is aligned at 90° to that of linear polarizer 501 so that reflected specular energy is blocked, thereby creating an isolating mode receiver.

When the synchronizing pulse is received via a wire 87, the strobe lamp 103a flashes for a brief time; 10 microseconds is typical. During the brief flash interval the isolating and non-isolating images are captured on the silicon CCD devices (typical) in the two cameras, 80a and 80, respectively. The two images can be read out sequentially via a multiplexer and recorded in the digital frame buffers of the image processor. A multiplexer of the type required is built into the Cognex 4400 and is normally part of most commercial frame grabbers and image processors. The processing of the images is substantially the same as previously described with amplitude comparisons being made between corresponding pixels or corresponding regions.

Because the two cameras use a common lens 81, the images have top and bottom reversed (one is viewed through a mirror) but are otherwise substantially geometrically identical. Calibration may be obtained by recording any two points in the field of view and mechanically adjusting the CCD chips via translation and rotation to have a one to one correspondence of pixels. This can also be accomplished via software within the image processor and such conventional software as is normally furnished with the image processor. Because the lens 81 and cameras 80 and 80a are held in alignment, the calibration, whether via mechanical or software means, need only be performed once, preferably at the factory.

In this embodiment, the linear polarizers may be replaced with circular polarizers such that at least one of the circular polarizers in the receiver has the same "hand" as that of the transmitter to provide an isolating mode image, and the other has the opposite "hand" (or not be circularly polarizing) and have suitable attenuation to ensure that diffuse objects have the same intensity in both pictures. Additionally, if polarizing beamsplitters are used, one or more of the polarizers in the receivers may be omitted since polarizing beamsplitters divide energy according to polarization properties.

The isolating and non-isolating images may be obtained with two separate cameras as shown, but with two separate and substantially matched (in focal length and axis parallelism) lens means, one per camera, that create geometrically corresponding images. The correspondence need not be exact if corresponding image features, regions, or pixel groups are compared with respect to an average amplitude in the isolating and non-isolating mode.

Figure 8B:
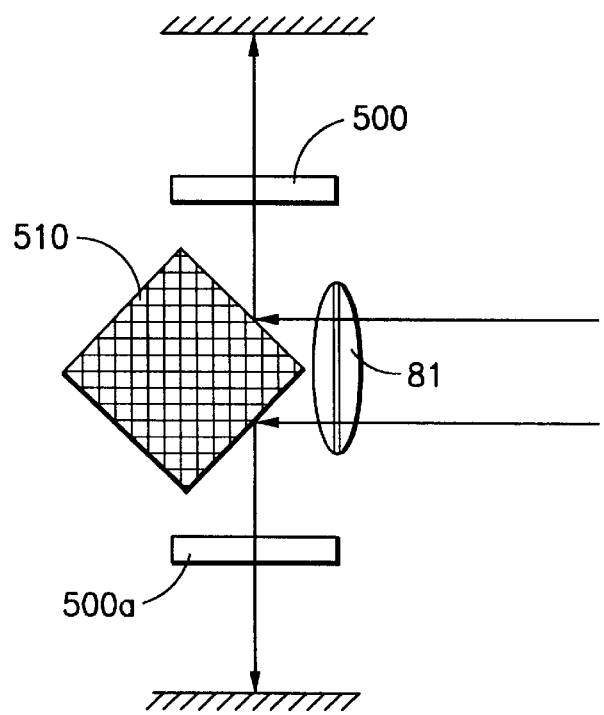
FIG. 8B is a schematic view of the optical path of FIG. 8A using two mirrors to replace the beam splitter device of FIG. 8A.

An alternative arrangement shown in FIG. 8B, section view, uses a mirror 510 in each path and so does not invert one image with respect to the other.

As can be appreciated, the camera in all embodiments may be replaced with a multiplicity of cameras at various positions and angles to the illuminated surface to gather more of the specularly reflected light and similarly, a multiplicity of illuminators may be used at various positions and angles to the illuminated surface to assist the cameras in gathering more of the specularly reflected light. It is only necessary that, when such arrangements are used, all control signals and polarizers be common to the group of cameras that replaces one camera or to the group of illuminators that replaces one illuminator.

The arrangements of FIG. 8A and FIG. 8B require multiple cameras and beamsplitters which are similar to first generation color cameras which employed three separate cameras to separately record three separate images, one for each of the primary colors. More modern color cameras employ a single camera with a patterned color filter that is organized in closely spaced columns; e.g., R,G,B,R,G,B,R, G,B . . . where R represents red, G represents green and B represents blue. This has the advantage of using only one camera plus simple electronics and requires a one time adjustment of the filter to the camera chip at the factory.

Figure 9A:
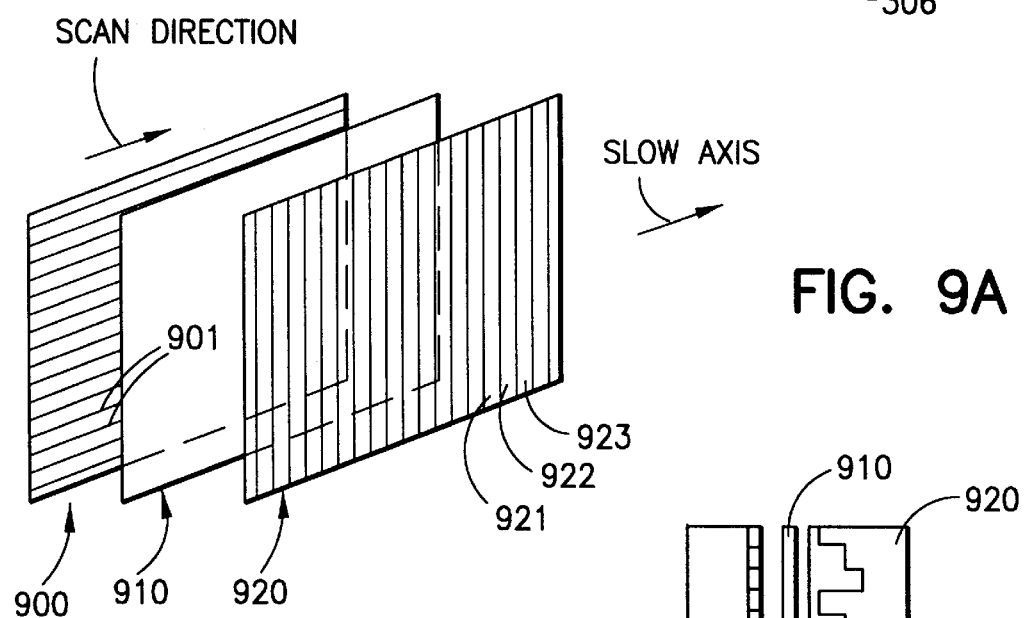
FIG. 9A is a schematic view of a polarization sensitive camera based upon a variation of color camera technology which is particularly suitable for use in the receive path.

Referring to FIG. 9A, the same identical color camera pickup chip and electronics circuits may be used to manufacture a polarization sensitive camera by replacing the tricolor filter used in the color camera with a two layer filter as follows. The camera pickup is represented by a CCD chip 900 with typical scan lines 901. A thin linear polarizer 910 with polarization axis at 45° to the "slow" axis defined for a patterned retarder plate 920 is located touching, or in close proximity to, the illuminated surface of the CCD chip 900. Retarder plate 920 is manufactured from a birefringent material and selectively etched so that adjacent columns differ by ¼ wave with respect to the retardation produced and a pattern of +,0,−,+,0,−,+,0,−, . . . is maintained where "+" represents +¼ wave (923), "0" represents equality of phase (922), and "−" represents −¼ wave (921). The patterned retarder plate must be in close proximity to the polarizing plate. The retarder plate selective etching may be done chemically or with ion beams and is well known in the semiconductor industry. The process is currently being used to create microlens arrays known as binary optics.

Figure 9B:
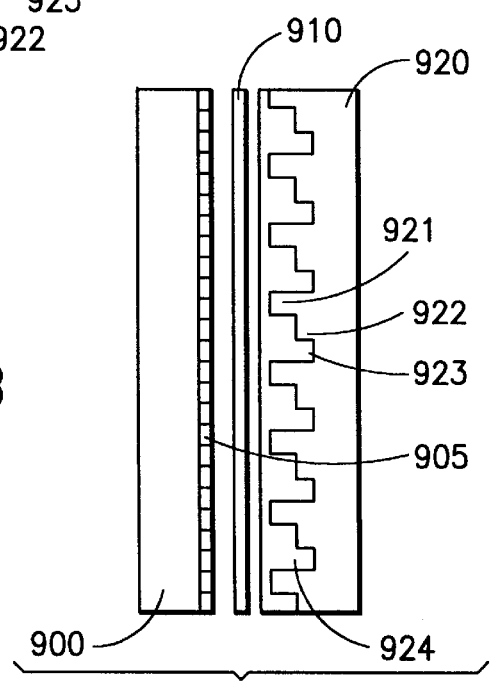
FIG. 9B is a section view of details of the polarization sensitive camera.

The arrangement shown in FIG. 9B requires two masking and etching steps to obtain the three thicknesses needed for manufacturing the three retardations needed for the three column types. An optional filling 924 adds non-birefringent material having an optical index approximately equal to that of the birefringent material to provide the overall structure of a thin glass plate with respect to a focused light beam. As shown in FIG. 9B, the columns are brought into alignment with the pixels 905 in a CCD column in exactly the same manner as is done for a color camera.

In operation, the polarization images produced by the patterned retarder plate are processed by the color camera's electronic circuits into either three separate images or a single composite image. In the case that a single composite image results, it can be decoded by any color receiver into corresponding R,G,B images which represent, not the three colors, but the three states of circular polarization received which correspond to left, right and non-polarized. These images may be processed according to all of the preceding methods regarding ice detection.

Although all cameras shown have been of rectangular format, in some circumstances it is preferable that a linear camera array (single row of pixels) be used and the field of view be transversely scanned via rotating polygon mirrors, galvanometers, rotating prisms, or other scanning means to synthesize a rectangular image of some desired format. At such times the illuminator may provide a "line of light" which would be likewise scanned in synchronism with the scanning of the linear array. This is suitable for fields of view which are long and narrow and require more resolution than is obtained from the standard camera format.

Figure 13:
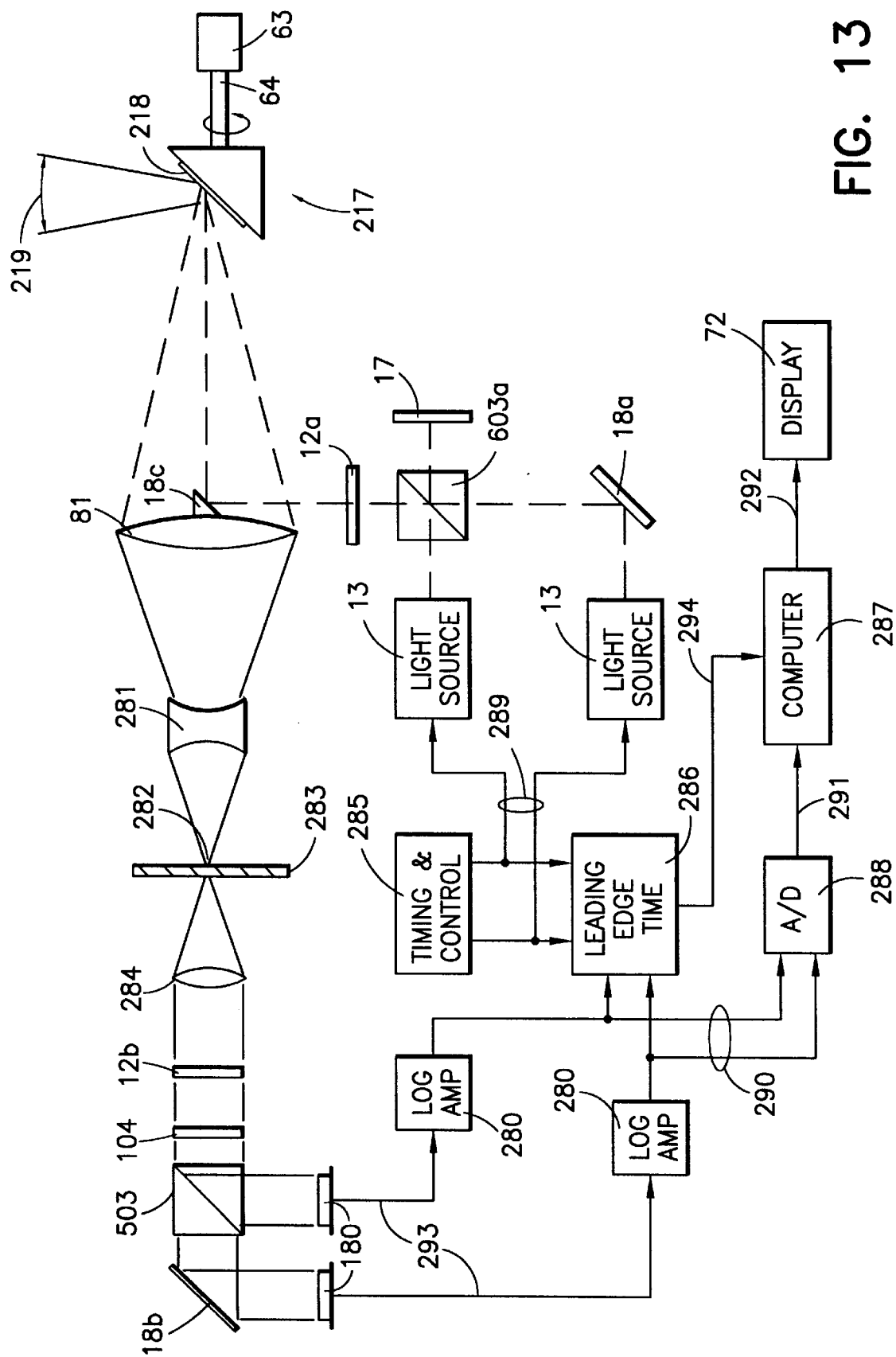
FIG. 13 is a schematic of a scanning narrow beam ice detection system.

FIG. 13 shows an embodiment of a scanning ice detection system. A laser diode light source 13, such as Spectra Diode Laboratories SDL 5422-H1 capable of producing short, bright pulses of light, is projected onto a path folding mirror 18a which reflects the light pulses through a polarizing prism 603a. A linear polarizing plate could be used when using just one light source 13. Prism 603a linearly polarizes the light, reflecting the unwanted orthogonal polarized light to be absorbed by an absorber 17. The linearly polarized light passes through a quarter wave retarder plate 12a, converting the light to circular polarization. A mirror 18c mounted on a lens 81 folds the light path to coincide with the receiver light path.

A galvanometric scanner 217, such as Laser Scanning Products GRS-PS, series scans the light over an angle 219 in the horizontal plane via an oscillating mirror 218. Scanner 217 is rotated in the vertical plane by a motor 63 driving a shaft 64, causing the horizontally scanned light to also scan vertically. Light reflected by a surface illuminated by the scanned light retraces the path to positive lens 81 which focuses the light in combination with a negative lens 281 onto a pinhole 282 in a barrier 283. Light passing through pinhole 282 is focused by a lens 284 upon two APD's 180, such as the 5 mm avalanche photodiodes found in the Advanced Photonix APM-10 detector modules, after passing through a quarter wave retarder plate 12b and a polarizing prism 503. Mirror 18b folds the light path. Retarder plate 12b converts the circularly polarized light to linearly polarized light, which if aligned with the polarization axis of prism 503 passes through to mirror 18b and one APD 180. If the polarized light is orthogonal to the polarization axis of prism 503, it is reflected to the other APD 180 by prism 503. Unpolarized light illuminates the APD's 180 equally whereas proper alignment of the circularly polarized light from light source 13, prism 503, and retarder plate 12b produces a maximum difference in light levels on one APD 180 relative to the other APD 180 when light projected by the system is specularly reflected. A narrow band interference filter 104, centered about the wavelength of light source 13, reduces the amount of ambient light which reaches photodiodes 180.

Quarter wave retarder plates 12a and 12b may be removed from the system and the system will then use linearly polarized light to produce a large ratio difference in light levels on photodiodes 180 for specular reflections and equal light levels on photodiodes 180 for unpolarized reflections.

An alternative system adds a second light source 13 which passes light aligned to the polarization axis of prism 603a onto an absorber 17 and projects light orthogonal to the polarization axis of prism 603a. The light is reflected by prism 603a through retarder plate 12a along the same path as the other light source 13 by careful alignment. The polarizations of the light from the two sources 13 are of opposite hands so that only one APD 180 is required to detect the large ratio of light reaching the APD 180 from the two sources when reflected by a specular surface. The unpolarized light reflected from either source 13 reaches each APD 180 with equal intensity if the source 13 levels are equal. The galvanometer's mirror typically scans 3 meters in 1/400 sec or equivalently travels 0.012 cm in the time between strobing two light sources 13 that are 100 ns apart. Thus the diode receives light reflected from essentially the same area from the two sources. As previously noted, retarder plates 12a and 12b may be removed.

When one light source 13 and two photodiodes 180 are used, the diode receiving the large specular reflected light may tend to heat up and alter any calibration of signal level. Using two diodes and two light sources 13 reduces this problem. By alternately strobing the light sources 13, the heating will be equal since the large specular energy alternates between photodiodes 180.

Although the equipment described separates clear wing from ice and snow, it does not separate (except visually to the operator's eye) runway and other background surfaces from wing surfaces, etc. This is done via image processing techniques or stereo ranging or lidar (optical radar) ranging. In addition, image processing techniques can segment surfaces of like texture and only color red those "non-blinking" areas that are substantially surrounded by "blinking" areas (green). That is, ice is highlighted only when substantially surrounded by clear metal. As an alternative, stereo ranging may be used to separate foreground from background and only the foreground (wing or other aircraft surface) has non-blinking areas tagged to highlight ice formation.

Figure 14:
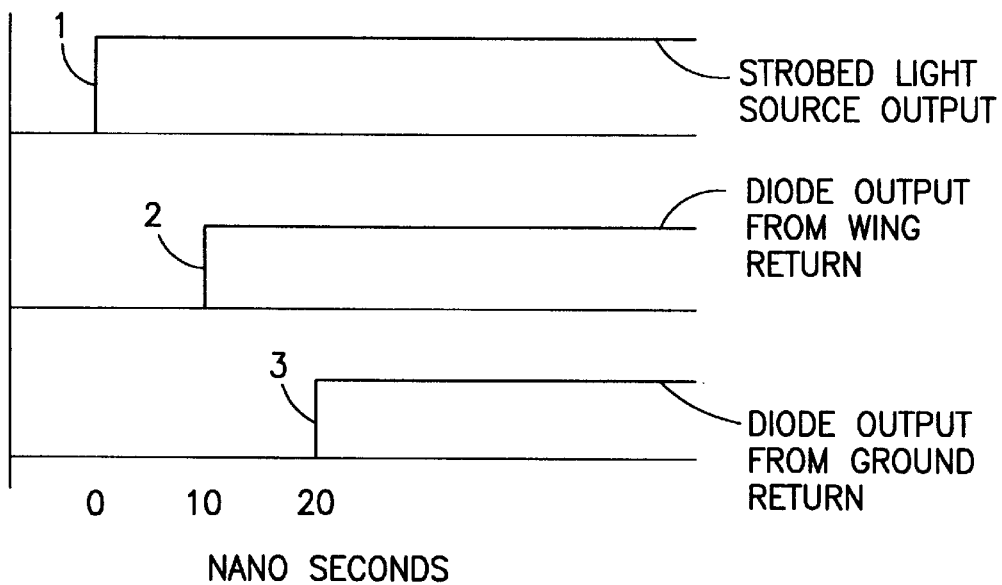
FIG. 14 depicts the time relationship of waveforms within the system as a function of surface distance.

When viewing downward on an aircraft wing, the ground appears in the field of view and returns unpolarized light similar to light reflected through ice. One method of rejecting this unwanted signal is to use the time of travel of the light pulses to determine which surface is reflecting the light. If the wing is at least 5 feet above the ground, the ground signal reaches the diode 180 at least 10 ns later (curve 3, FIG. 14) than a signal from the wing (curve 2) relative to the time of the strobe 289 (curve 1). Thus any signal exhibiting this additional delay is rejected as not belonging to the wing. Since the measurement is made on the leading edge by measurement unit 286, pulses wider than 10 ns can be used without effect on this rejection process.

The problem of large dynamic range of reflected light from specular surfaces is not as great for the scanning system since the dynamic range of avalanche photo diodes (such as used for the APM-10 detectors) is much larger than that which is available for most imaging cameras. To deal with the large dynamic range of the output of these diodes, it is preferable to use a logarithmic amplifier 280 such as model AD640 from Analog Devices. Since ratios of signal levels are being analyzed, the log amplifier has the additional benefit of producing the same voltage change for a fixed ratio throughout the dynamic range.

A further problem, common to both scanning and non-scanning systems, is that the ratio of measured values in the isolator and non-isolator states reduces towards that of ice as the viewing angle deviates significantly from normal incidence when viewing a specular surface. This increases the difficulty in processing signals over a wide dynamic range.

To further overcome the influence of wide dynamic range on the display produced by the system, the display of the images can be enhanced by processing the signal level produced by each pixel in the image of camera 80 or by photodiodes 180 via computer 287 and quantizing the display for that pixel (or scan point for the scanning system) into three levels: clear, ice and non-ice. A background reference level is obtained for the pixel (or scan point) when the light source 13 is not being strobed. This accounts for any ambient light. The short strobe time possible with the scanning system essentially eliminates interference by ambient light. The measurements are then made for the pixel (or scan point) by strobing twice; once with the optical means in the light path between light source 13 and camera 80 (or diode(s) 180) in an optical isolator state and once in an optical non-isolator state. A predetermined table of threshold values as a function of the measured background reference level and the value measured in the non-isolator state is stored in computer 287. A further problem addressed by the table is the reduced ratio of measured values obtained in the isolator and non-isolator states when viewing a specular surface significantly away from the surface normal. If the ratio of the non-isolator state value to the value measured in the isolator state exceeds the threshold value from the table, the pixel is declared to be in a clear area; otherwise it is declared to be in an ice area. If the isolator state measured value in the ice area is less than a given value, the pixel is declared to be in a non-ice area. By displaying on display 72 the three categories as black, white and grey, or various contrasting colors, the display readily conveys the desired information concerning the icing condition on wing surface 15.

Figure 16A:
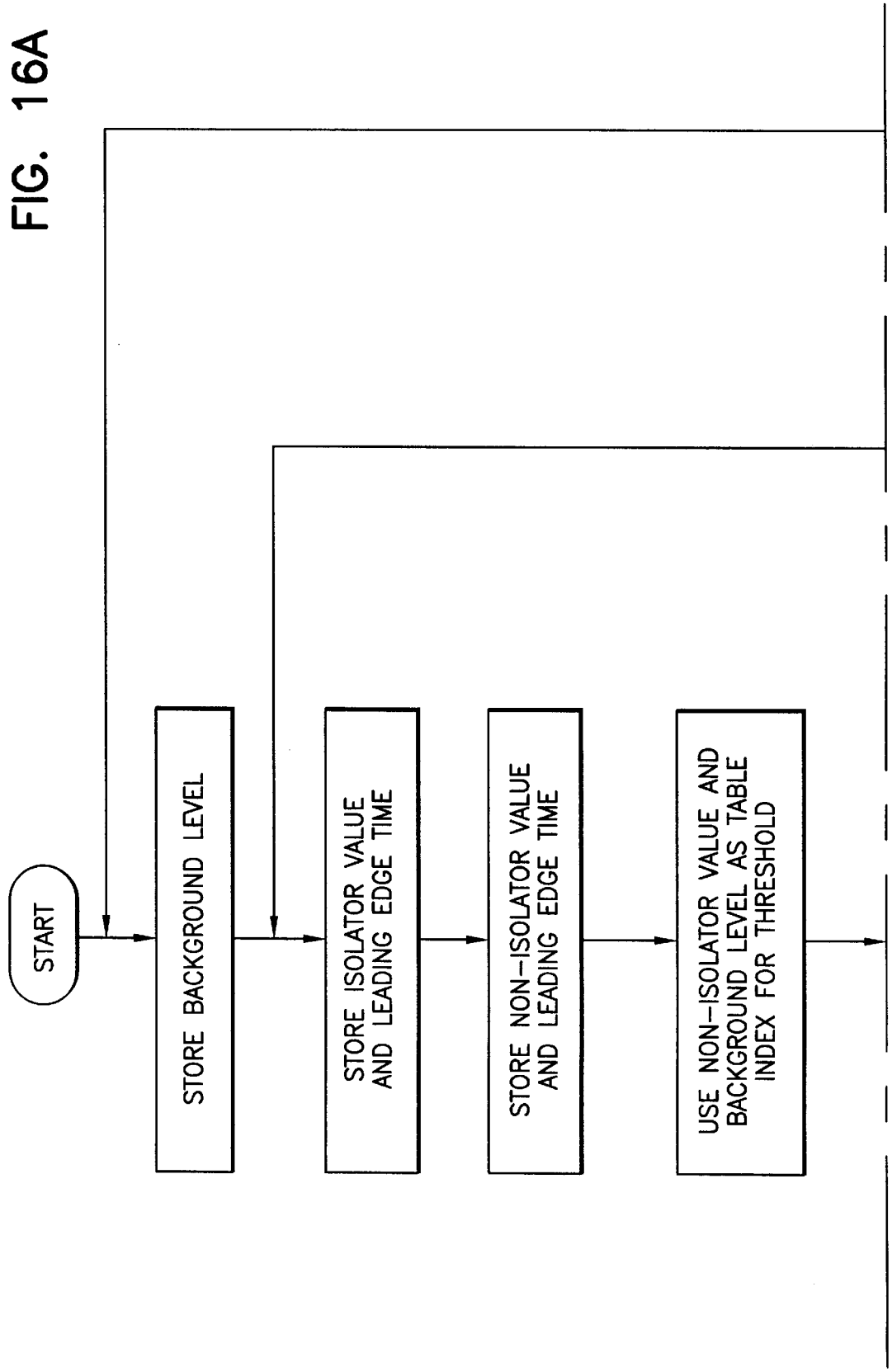
Figure 16C:
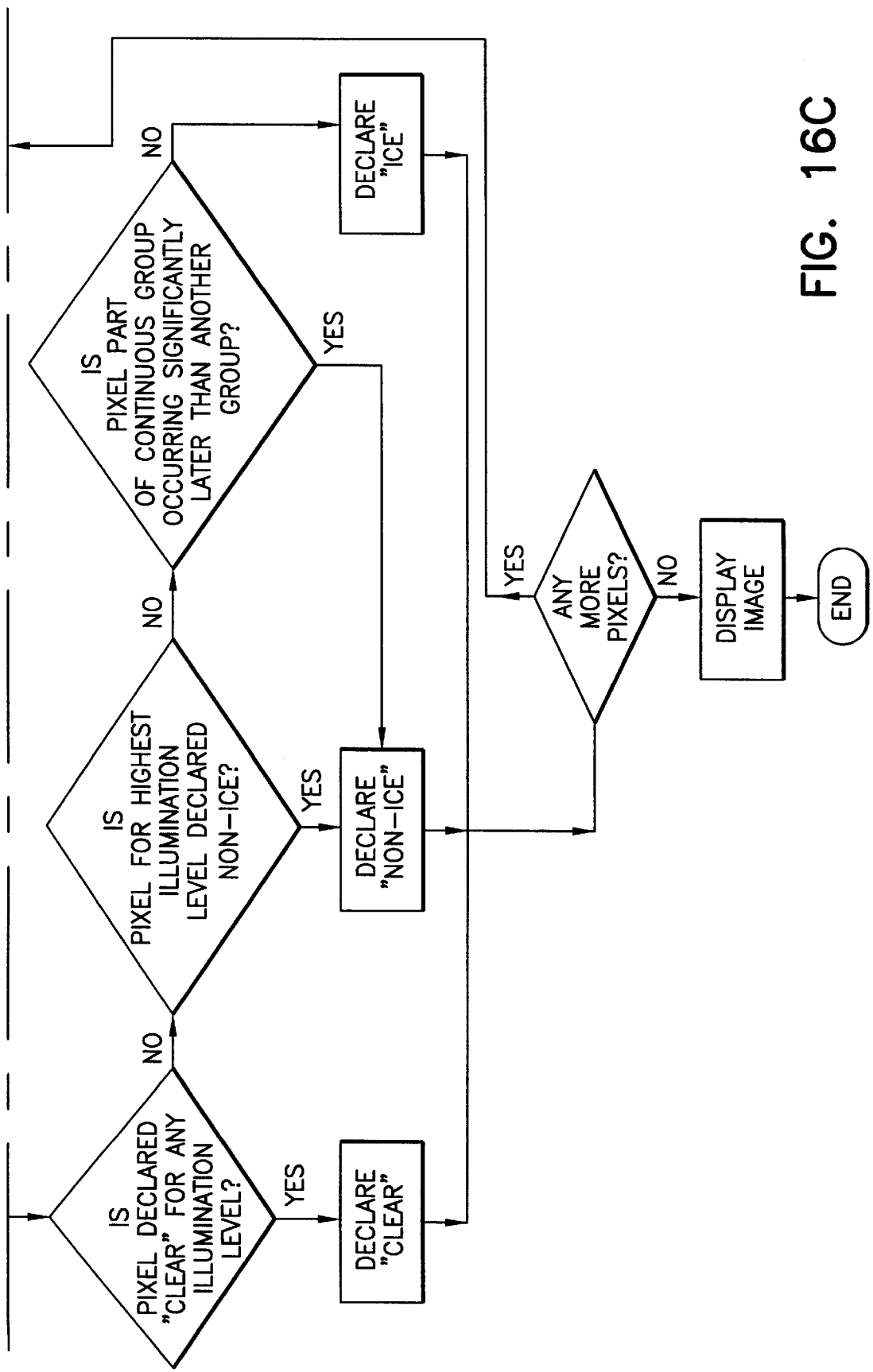

Referring to FIGS. 16A–16C, a process flow diagram is shown illustrating the following steps. When multiple levels of illumination are used to increase the dynamic range of the system, the above method for quantizing the measurements into three levels tends to declare "ice" for one or more of the levels when the declaration should be "clear". Thus if a declaration of "clear" is made at any level of illumination, the pixel is declared in a first decision to be in a clear area. The measured value in the isolator state with the highest illumination is used in a second decision to determine "non-ice" in areas not declared "clear" by the first decision. If time of arrival is used to eliminate ground returns, then those signals of a continuous group that are received significantly later than signals of another continuous group are declared "non-ice".

Referring again to FIG. 13, the details of the scanning system signal flows indicated above are shown. A timing and control unit 285 synchronizes strobes 289 to the oscillating mirror 218 (synchronizing signal not shown). Strobes 289 cause light sources 13 to emit light pulses. Logarithmic amplifiers 280 receive APD output signals 293 and send their compressed dynamic range outputs 290 to an analog to digital converter (ADC) 288 and a leading edge measurement unit 286. Leading edge measurement unit 286 starts measuring time at the time of strobe 289 and stops when input signal 290 exceeds a given value. The time interval thus measured is transmitted to computer 287 via a signal 294. ADC 288 reports the amplitude measured on input signal 290 to computer 287 via a signal 291. Computer 287 quantizes input signal values 291 into categories of clear, ice, and non-ice as described above, using the leading edge time on signal 294 to force background signals to be classified as non-ice. The categories are transmitted to display 72 via signal 292 from computer 287 to provide a visual image of wing 15 and ice patches 16. Leading edge measurement unit 286 uses any standard processing means that provides adequate time resolution.

Figure 17A:
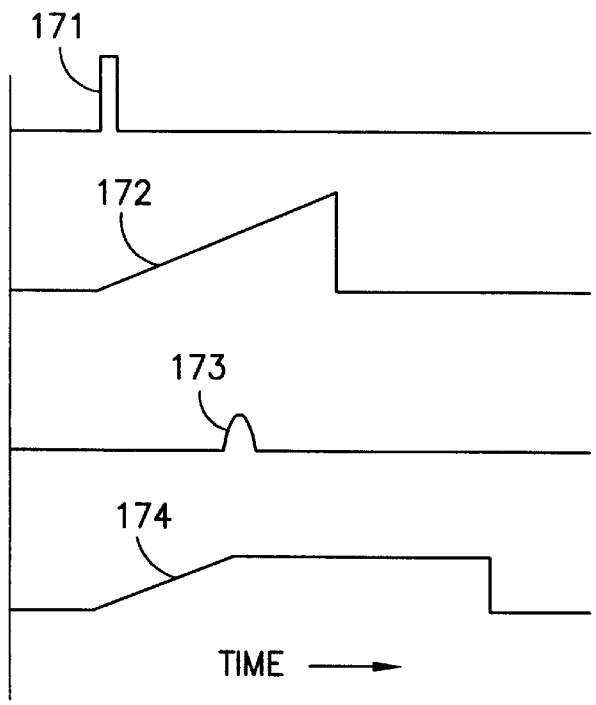
FIG. 17a shows the waveforms for an analog system for determining leading edge delay.

Referring to FIG. 17a, waveforms of an analog embodiment are illustrated. Strobe 289 from timing and control unit 285 is shown as pulse waveform 171 which establishes time=0 for measuring time of travel for light to reach surface 15 and return to photodiodes 180. A sweep voltage having waveform 172 is started at the leading edge of pulse 171. The waveform 173 of the output 290 of amplifier 280 is compared to a threshold and triggers a track and hold circuit to sample the sweep voltage (or alternatively just stops the sweep) providing waveform 174. Waveform 174 is then converted to a digital value at a given time by an A/D converter, where the given time exceeds the maximum expected signal delay time.

Figure 17B:
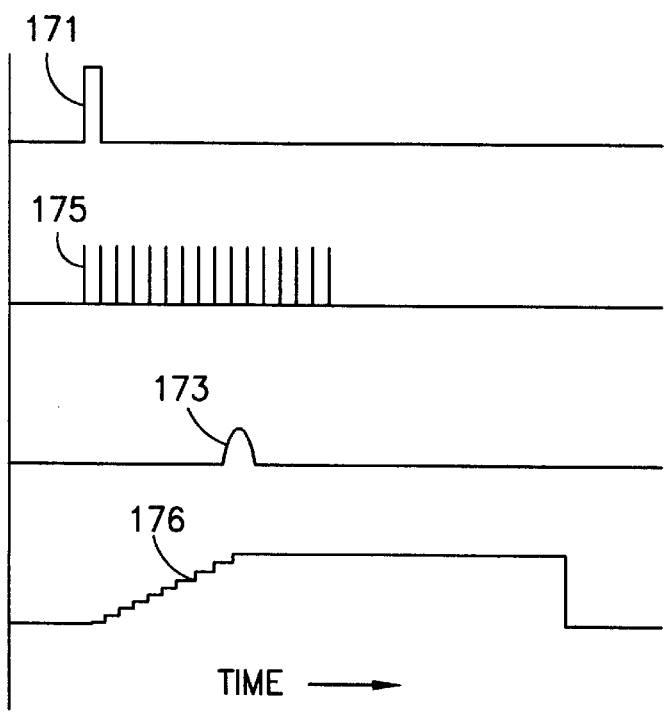
FIG. 17b shows the waveforms for a digital system for determining leading edge delay.

Referring to FIG. 17*b*, an embodiment using a digital counter is illustrated. Again, strobe 289 is shown as waveform 171 to establish time=0. Waveform 175 indicates the waveform of gated clock pulses that are turned on by the leading edge of pulse 171 and turned off after the maximum expected signal delay time. When amplifier output 290, shown as waveform 173, exceeds a threshold, a counter counting the clock pulses stops and holds its count as indicated by waveform 176. Alternatively, the clock pulses are stopped when waveform 173 exceeds a threshold. At a given time, the counter value is sampled for use by computer 287.

The computer 287 can further improve the display by comparing the declared category of a pixel over several scans. If an indication of "clear" and "ice" alternates, then it can be concluded that ice has not formed and the sporadic declarations of "ice" are caused by blowing snow which can be displayed as "clear" or a fourth category.

As indicated above, a problem exists when viewing a wing surface at an angle significantly away from the surface normal. The ratio of the values measured in the isolator and non-isolator states approach that of ice, thus preventing reliable discrimination. Certain paints, materials and surface treatments can be applied to remove this deficiency.

Currently some aircraft wings are painted with a gray paint that provides a low ratio of isolator to non-isolator response. Adding 10% by volume of metal chips to the paint significantly improves the response but not as much as is desired. However, it has been found that a significant response improvement can be obtained by using black paint to which 10% by volume of metallic chips have been added. Surprisingly, an observer sees the appearance as similar to the gray paint, probably because the specular reflection of the metallic chips produces a gray appearance.

Figure 15:
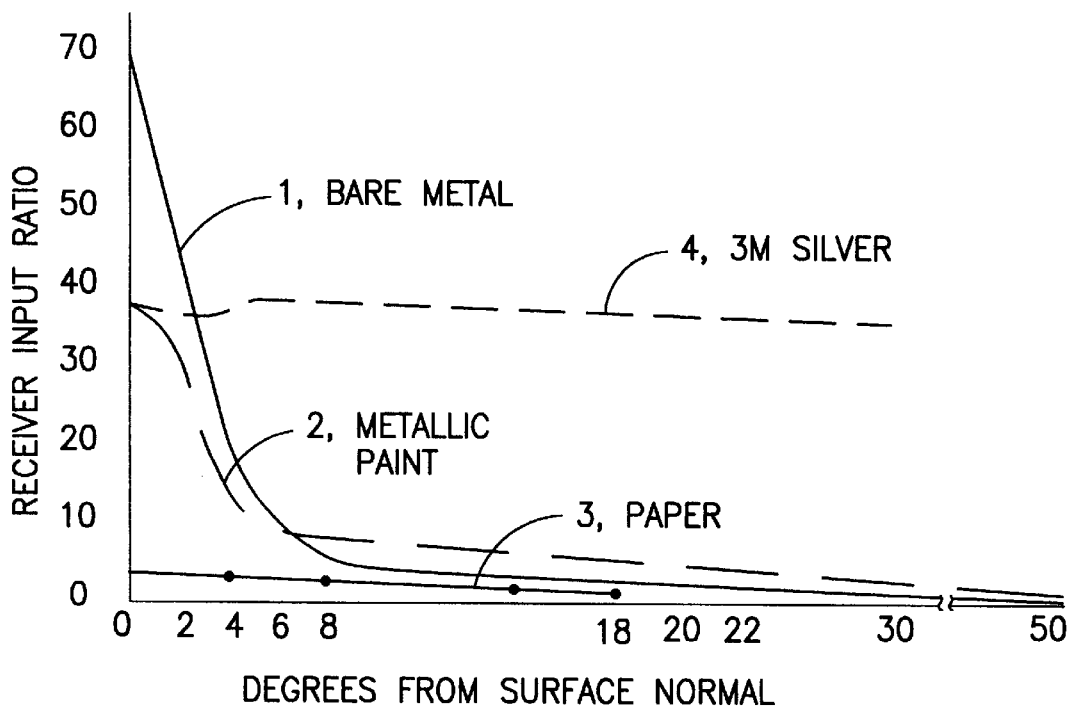
FIG. 15 is a graph depicting the receiver input ratio as a function of angle from surface normal for surfaces with different properties.

Referring to FIG. 15, the ratios of the non-isolating state to the isolating state response obtained by the ice detection system is shown when viewing various surfaces as a function of the angle the system makes to the surface normal. A bare metal curve 1 starts at a ratio of 66 on the surface normal and drops to 3 at 12 degrees from normal. Measurements of paper (curve 3), which are similar to that received from ice, start at 1.55 on the surface normal and drop to 1.47 at 12 degrees from normal. Thus at least a 2:1 difference in ratios exists out to 12 degrees from normal, and reliable discrimination is possible. Beyond that, performance becomes gradually less reliable.

Curve 2 is for a paint with approximately 10% metal chips added by volume which, when applied to the surface, provides a ratio of 3 out to 30 degrees from normal. Other currently existing aircraft paints provide a similar response.

Retroreflector tapes and paints that contain reflecting sites show very little sensitivity to the angle of view. Curve 4 shows that a surface covered by 3M silver provides a ratio greater than 27 out to 50 degrees from normal. 3M Reflective Highway Marking Tape series 380 (white) and series 381 (yellow) are used on roadways as reflectors and thereby provide the basis for detection of ice formation on roadways and bridges. Many of the suitable retroreflective tapes are manufactured by embedding tiny metallic coated dielectric beads in a clear plastic carrier. The tiny spherical beads reflect a portion of the impinging light back towards the light source, substantially independent of its direction. In fact, the reflected energy is generally much larger than required and often saturates the receiver. It is therefore preferable to add an attenuating layer of material to the surface of the retroreflective tape to reduce its response. An attenuation of approximately 3:1 each way is recommended as a best value (approximately 10:1 round-trip loss).

Another method of reducing the sensitivity of response at an angle away from the surface normal to a metallic surface is to cause the surface to present many small facets at all angles so that at any viewing angle a significant number of facets have their surface normal essentially aligned to the viewing angle. Sand blasting, roll dimpling, etching and other methods are in common use to produce surfaces with this characteristic.

The invention facilitates ease of use and promotes record keeping which is of vital importance to the aviation safety industry. Although not shown in the various drawings, it is anticipated that flight number, aircraft identification, time and date, and other pertinent information would be aurally, visually, or textually annotated to the display monitors and to the disk or tape recordings made with the ice detection equipment. The performance of this task would be implemented with commercially available components that are often part of the equipment specified (cameras and recorders) or via additional "plug compatible" annotation and editing devices.

It may be desirable to locate the recording and viewing or control equipments at remote locations such as the aircraft cabin, control tower, ground control area, or aircraft terminal. Cameras and illuminators may also be built into various remote portions of the aircraft from which the wing or other surface is monitored. Accordingly, the various wires shown in the drawings, whether for purposes of data or signal transfer or control, may be replaced with telemetry equipment operating via radio, infra-red, power lines, or fiberoptic links.

In all claims and in the foregoing disclosure the term "light" is to be interpreted as "electromagnetic energy" and not restricted to just the visible light portion of the electromagnetic spectrum inasmuch as the principles described are not so limited and in fact extend into the infrared and beyond.

The precise ice-present/ice-free decision threshold for the ratio formed by the non-isolating state received signal amplitude divided by the isolating state received signal amplitude is a function of the angle between the normal to the viewed surface and the FIG. 13 equipment line of sight. The ice-free non-isolating to isolating ratio is a function of both angle and material as seen in FIG. 15 since the signal ratio of an ice-free surface point or area correlates strongly with these two variables. When the FIG. 13 or other similar equipment is used in the field, frequently the angle between the equipment optical path or material being viewed is unknown. Accordingly, it is useful to obtain a single threshold function for ice-detection that applies across a wide range of materials and angles so that precise knowledge of the optical path angle or surface material is not required.

A one-time calibration can be made for a set of materials to obtain a function in which the threshold is primarily a function of the amplitude of the received light reflected from the surface or the material thereon with the optical element in the path in the non-isolator state. This is done by generating a curve for each material similar to that of FIG. 15, both for ice-free and ice-covered surfaces. Once such a curve is generated for a particular material, it need not be redone. Rather, the information so gathered can be combined with the information gathered for any other particular collection of materials that are encountered in order to create an optimized decision boundary (threshold) for the ice-present/ice-free decision. The generation of such a curve is explained below.

When a predetermined set of materials are encountered in the field, the information used to derive the curves of FIG. 15 are plotted in a more useful manner by having (1) the amplitude (brightness) of the received reflected non-isolator optical state signal replace the angle as the abscissa, and (2) the ratio, or other mapping function, of the relationship between the amplitudes of the non-isolator and isolator optical state received signals plotted as the ordinate. An angle is not necessarily the best auxiliary data to use with the non-isolating and isolating received reflected signal amplitudes to determine the threshold ratio at which the amplitudes of the received reflected signals are substantially equal (to indicate the presence of ice or snow). This is because it requires determining the local surface normal of the viewed region whose data is being evaluated with respect to the line of sight of the system receiver's sensor. Obtaining the local surface normal data requires obtaining accurate and relatively noise free range and position data for each small area in the subject surface that is to be evaluated. This is not always possible.

For metallic surfaces, the non-isolator received signal amplitude itself is indicative of the angle between the local surface normal and the receiver sensor line of sight. It is well known in the art that when a viewed specular reflecting surface is normal to the line of sight of a coaxial receiver/transmitter arrangement, such as shown in FIG. 13, the return reflected beam is extremely bright, i.e., a high amplitude received signal, and that when the specular surface deviates significantly from being normal to the line of sight the return beam is much dimmer, i.e., a lower amplitude received signal. This is because most of the energy reflected from the surface is directed away from the receiving lens of the receiver. In a similar manner, when surface 15 of FIG. 3B is in such a position and at such an angle that the rays emerging from the source illuminator are specularly reflected by the viewed surface directly into the receiving lens, the amplitude of the non-isolating state received signal will-be extremely strong. Conversely, when this optimally specular arrangement is farther from being satisfied, the received signal energy amplitude rapidly falls off in intensity. Thus, the deviation of the angle from the optimum normal specular arrangement between the illuminating source and the reflecting surface and the receiving lens and the surface may be roughly inferred from received signal amplitude information.

Figure 18:
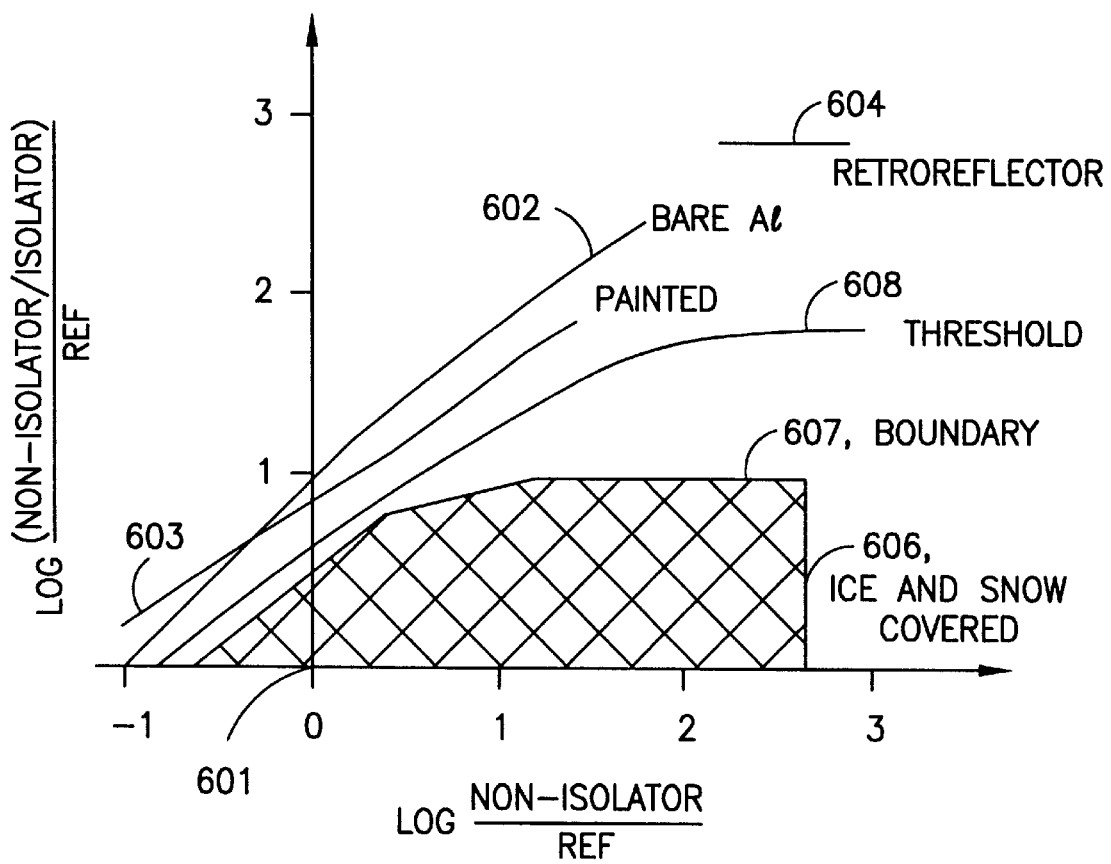
FIG. 18 is a graph plotting the non-isolator/isolator state received signal amplitude value ratio against the non-isolator state value.

FIG. 18 is a plot indicative of the ratio obtained by dividing the received signal amplitude observed in the optical non-isolator (non-blocked) mode by the received signal amplitude obtained in the isolator (blocked) mode versus the non-isolator mode received signal amplitude for the various materials indicated. Since a large dynamic range must be covered for both the non-isolator signal amplitude and the non-isolating/isolating signal ratio, the FIG. 18 plot is presented in a logarithmic scale for both axes. It is also normalized with respect to a reference diffusing white lambertian surface, e.g., a surface with near unity reflectance that returns nearly equal energy in both the optical isolating and non-isolating modes. An example of such a surface is white paper. This reference point is the origin 601 of the FIG. 18 graph.

The portion of the curves for each material that lie towards the most positive portion of the abscissa, i.e., to the right of the origin, are those points that most nearly correspond to receipt of specular reflection of light normal to the receiver sensor, such as shown in FIG. 13, since they correspond to the largest amplitudes of received reflected signals and are far larger in amplitude than the amplitudes of reflected signals that are obtained from a white diffuse surface. Points on the curves that lie to the left of the ordinate (left of the origin) correspond to specular surfaces that are far from being normal to the receiver (e.g., FIG. 13) sensor axis and therefore have signal amplitude returns weaker than are obtained from a white reference surface. The area 606 with boundary 607, which corresponds to the region where received signal amplitudes from ice covered metallic surfaces occur, is cross hatched.

A threshold curve 608 which may be used to separate ice and snow covered surfaces from clean metallic wing surfaces is drawn between the cross hatched area and the "clean wing curves" for bare aluminum 602, metallic paint 603, and retroreflective material 604.

The data for the curves shown in FIG. 18 are preferably obtained by recording the isolator and non-isolator state received signal amplitude responses obtained with the equipment of FIG. 13 or FIG. 3B (the eye being replaced with a photodetector) over a wide selection of angles between the ice detection sensor and the surface at a fixed working distance for each such material or surface condition investigated. This is preferably done by rotating the viewed surface about an axis that is normal to the sensor axis and passes through the sensor axis. After the mathematical computations are made the curves are plotted from these data. The data are taken at constant range to ensure that the signal amplitude obtained in the non-isolator mode is not altered by the change in the working distance. Otherwise, appropriate corrections must be made for such range variation which generally is in accordance with the inverse square of distance.

When the ice detection equipment is used at an approximately constant working distance from the surface being inspected, the curves of FIG. 18 may be used to determine the threshold between ice or snow present and ice-free conditions. During investigation of a surface, each pixel group or pixel, respectively, at the receiver sensor corresponds to a surface area or point, respectively, and is associated with an optical non-isolator and an isolator pair of received signal amplitude numbers as the system alternates between non-isolator and isolator states. In the case of a pixel group, each number of the pair of numbers normally is the average or otherwise filtered value representative of the non-isolator or isolator state received signal amplitude of the group of pixels. The value of the non-isolator number of the pair may be used for the entry point (corresponding to the abscissa of the FIG. 18 graph) into a table (or function) that represents the threshold curve 608 of FIG. 18. If, at the point of entry set by the non-isolator number, the ratio of the non-isolator amplitude number of the pair of numbers to the pair isolator number lies above the threshold 608, it is concluded that the surface is ice free. Conversely, if the computed ratio lies below the threshold value for that entry point, it is concluded that the surface is not ice free.

In actual construction of such a table or function, the origin may be set at any convenient point. Use of white paper (reflectance equal to unity) as an origin is convenient primarily for human interpretation. Such an origin puts strongly specularly reflected light to the right of the ordinate and weakly reflected light (specular or non-specular) to the left. Similarly, increasing specularity is defined by light at increasing distances above the abscissa. The computation and curve evaluations of received signals are easily carried out during actual system use by using a computer which includes a look up table.

When the detection equipment is not used at constant working distances from the surface being investigated, the table or function based on the FIG. 18 threshold curve 608 still may be used but it must be entered (abscissa) via an offset that takes into account the range to the surface being viewed versus the range at which the table is constructed. For instance, if the table or function is constructed from data collected at a range of 16 feet and the distance to the surface being interrogated is 32 feet (twice the distance), then the received signal amplitude (for the FIG. 13 sensor) is approximately ¼ of that at the 16 feet (reference) distance.

Unlike a similar calculation for radar or sonar, only the one-way distance need be taken into account since all of the area illuminated by the transmitter source is imaged by the receiver lens onto its detector surface. Thus, if the object surface is at twice the reference distance, the lens of the receiver detector subtends ¼ the solid angle as viewed from the illuminated surface point and will collect only approximately ¼ of the reference energy. Accordingly, to enter the table at the proper place, it is necessary to perform the look-up or function evaluation at four times the actual amplitude of the measured received signal. Therefore, if logarithms to the base 10 are used in the graph plot, the log of 4 would be added to the log of the non-isolator pixel group number received signal amplitude value to obtain the (abscissa) entry point because adding the log of 4 is equivalent to multiplying by 4. The same correction applies when either taking data with ¼ of the transmitted power or with ½ of the receiver aperture diameter. The ratio of the non-isolator pixel or pixel group amplitude number value to the isolator number value is found by subtraction when using the equipment of FIG. 13 since both values are obtained as logarithmic quantities via logarithmic amplifiers 280. Of course, this ratio is only a property of the surface material, condition, and angle and is therefore not changed with distance.

Figure 19:
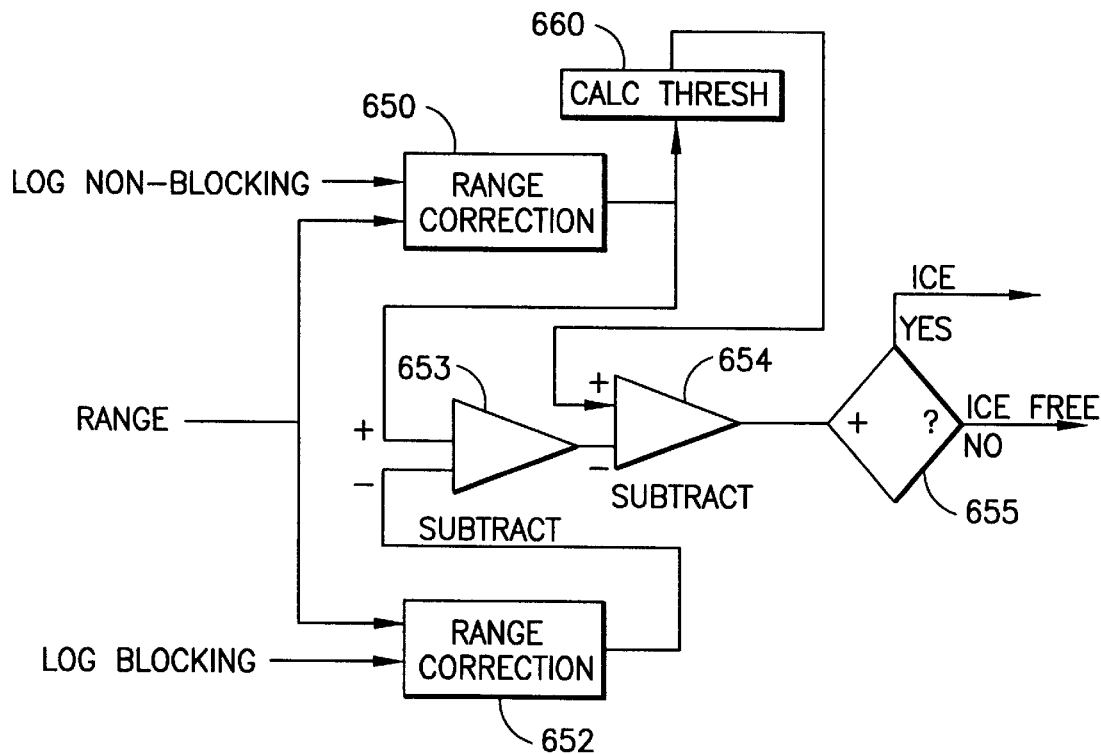
FIG. 19 is a schematic diagram of a circuit for implementing the surface condition determining condition in accordance with FIG. 18.

FIG. 19 shows a circuit by which the ice/no-ice decision is made for either a group of pixels or for a single pixel. Inputs to the circuit are the respective non-isolator and isolator mode received signal amplitude values, preferably in logarithmic terms, and the range (distance) from the ice detection apparatus receiver to the surface. The range signal amplitude value may be that which is available for the pixel or group of pixels under consideration or the average distance to the surface being scanned (examined) in those cases where localized range data are not available. Range data to the center of the field under observation also may be input via an external ultrasonic or laser range finder, both of which are commonly available, or via an operator estimated manual input.

The non-isolator and isolator log amplitude values for the region under consideration are first corrected for range by adding or subtracting an amount that corresponds to the deviation of the current range from the reference range. The reference range is that used when the threshold value function or table for the desired set of materials is computed. This correction is performed in the range correction circuits 650 and 652, such as, for example, operational amplifiers if the circuit is of the analog type. If the signal amplitude values are in digital form, digital computation components are used. The term K*LOG(RANGE/REF RANGE) is an offset in the operation of the calculation circuit 652. The value of K used in circuit 652 is normally equal to "2" but may vary to account for any non-linearities or other deviations in the system from the ideal model.

The computed corrected non-isolator received signal amplitude is used as the entry point to a pre-stored curve fit formula in threshold calculator 660 that approximates the threshold curve 608 of FIG. 18 or as a lookup into a table that has data corresponding to the same function. The output of a subtraction circuit 653, which receives the non-isolator received signal amplitude and the isolator signal amplitude in logarithmic form, is the log of the ratio of optical power detected in the non-blocking and blocking states, respectively. The threshold amount, the value of curve 608 at the entry point, is then compared with the nonisolating/isolating ratio signal (both corrected or both uncorrected) in the subtraction circuit 654.

The output of subtraction circuit 654, being positive, leads to a declaration of ice in a decision block circuit 655, since a positive result only occurs when the ratio of the non-isolator to isolator signal amplitude is smaller than the threshold value; i.e., the ratio lies below the threshold curve 608 of FIG. 18. A negative output from subtraction circuit 654 conversely leads to an ice-free decision by decision block 655, since it is indicative of a ratio greater than the threshold value.

Figure 20:
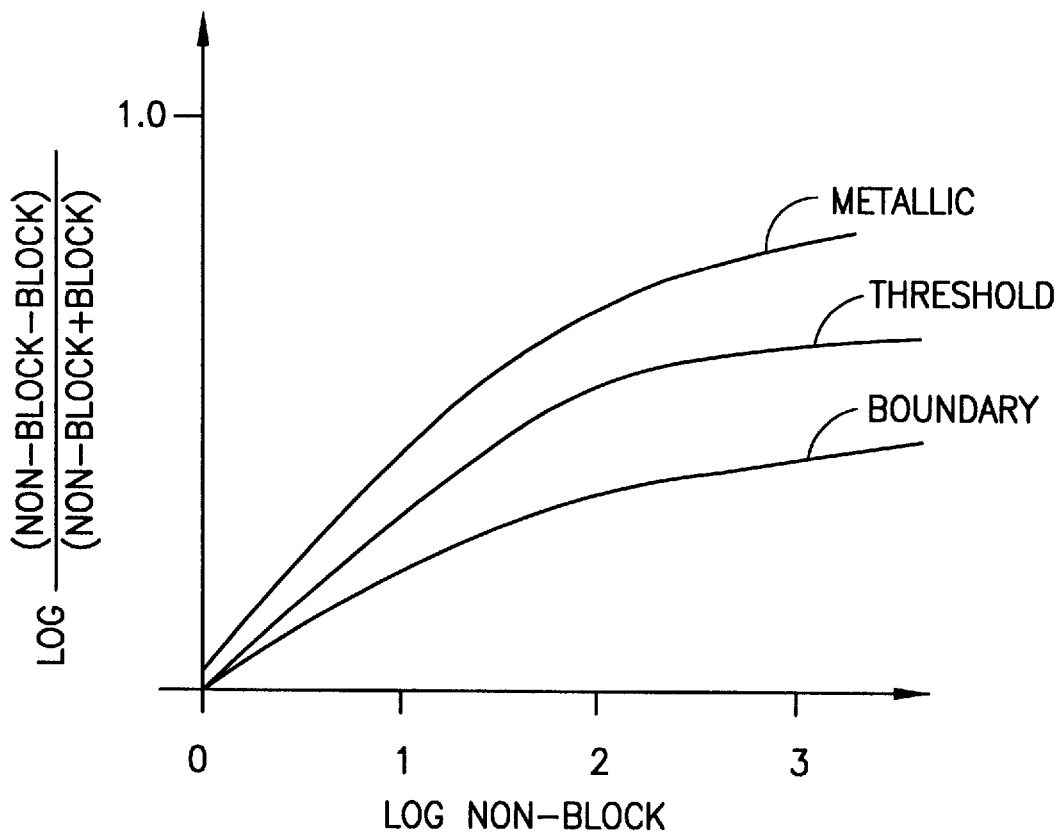
FIG. 20 is a graph plotting the ratio of the sum and differences of the non-isolator and isolator data received signal amplitude values against the non-isolator state value.

Although the ratio of non-isolator to isolator received signal amplitude is plotted in FIG. 18 as being indicative of an ice or no-ice decision, it is only one of a number of potential evaluation functions that can be used to make the ice or no-ice decision. For example, another useful evaluation function is formed by using as the ordinate of the curve the values of the difference of the two logarithmic values (non-isolator and isolator optical state values) divided by the sum of the two logarithmic values and plotting this function for a given set of materials. A simplified plot is shown in FIG. 20. The advantage to using an evaluation function of this type is that the range of results is restricted to values between "0" and "1", which are then scaled to any convenient range such as 0–255 for use in digital computation, i.e., $256=2^8$. Negative numbers are not needed because the log of the non-isolator amplitude is normally equal to or larger than the log of the isolator amplitude.

Figure 21:
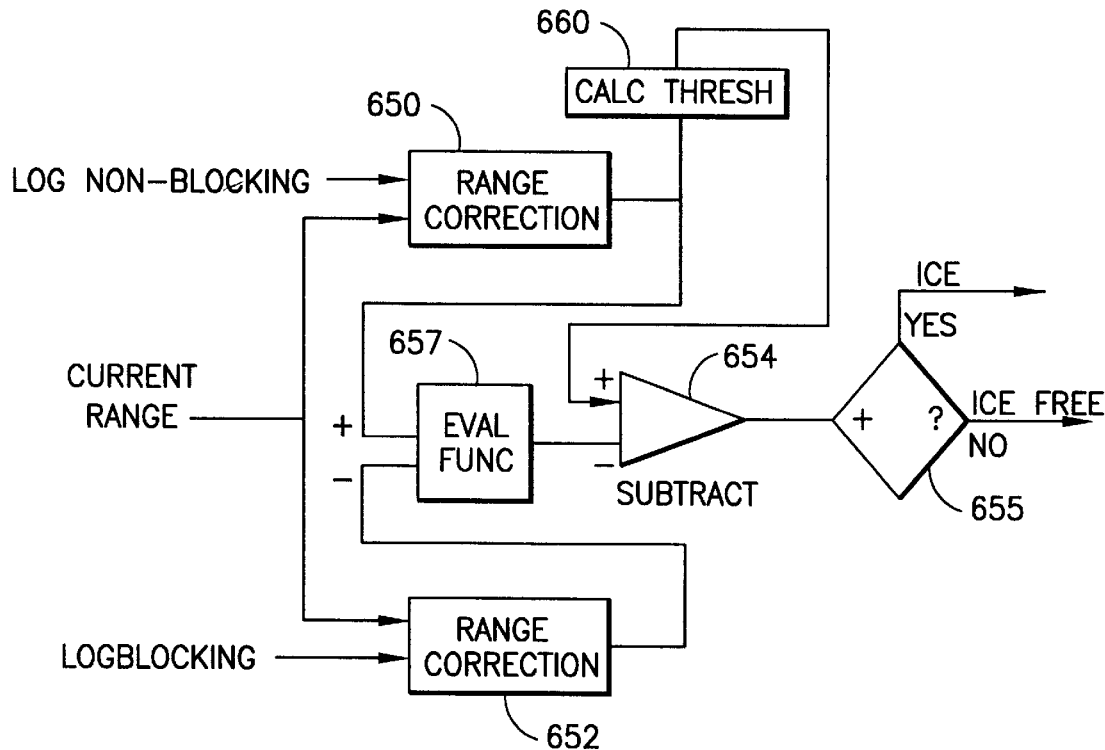
FIG. 21 is a schematic diagram of a circuit for implementing the surface determining conditions in accordance with FIG. 20.

Referring to FIG. 21, a block diagram of a circuit required to make the ice/no ice decision in accordance with the evaluation function of FIG. 20 is shown. This circuit is the same as that of FIG. 19, except that the subtraction circuit 653 is replaced with a function evaluation circuit 657 for the value difference divided by the value sum computation. The operation of the circuits of FIGS. 19 and 21 are preferably performed in specialized hardware when a very high speed of computation is required. Otherwise, they may be performed by a general purpose computer.

Referring momentarily to FIG. 13, using two laser diode light sources 13 and two APD's 180 causes some problems. When two coaxial laser beams are used, it is often difficult to maintain the two beams in exact coaxial alignment. If one light source fluctuates relative to the other light source, or if one APD is unbalanced relative to the other APD, the very high gain of the APD's greatly amplifies the error, thus causing problems. One channel, either the blocking (isolating) or non-blocking (non-isolating), would be affected. The use of two laser beams doubles the laser power output during a scan, thereby making it more difficult to operate safely with respect to the human eye. A system using a single laser diode and a single avalanche photo diode overcomes these problems.

Figure 22:
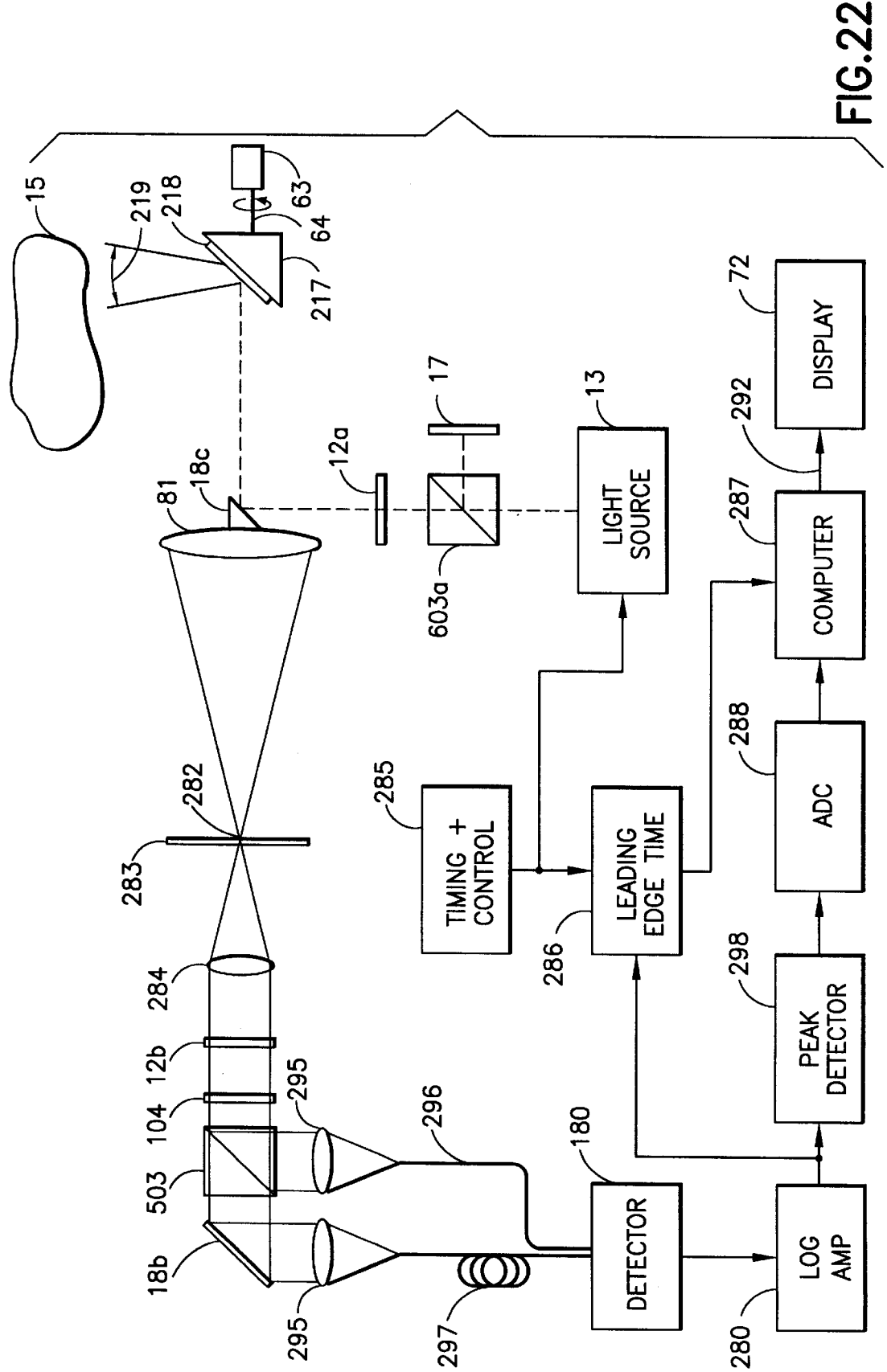
FIG. 22 is a schematic diagram of a video based ice detection system with an optical delay line.

Referring now to FIG. 22, a variation of the system of FIG. 13 is shown that uses an optical delay line 297 to delay the non-isolated return light signal from the isolated return light signal. Optical delay line 297 allows the use of a single avalanche photo diode (APD) 180 and a single laser diode as a light source 13. Transmitted light from light source 13 reflecting from a surface, such as wing 15, passes through a lens 81, a pinhole 282, a lens 284, a quarter wave retarder plate 12b, an interference filter 104, and a polarizing prism 503 before being focussed onto an optical fiber 296 and optical delay line 297 by lenses 295.

Optical fiber 296 carries the isolated component of the returning light directly to APD 180, thereby producing a first-to-arrive signal. Optical delay line 297 carries the non-isolated component of the returning light to the same APD 180, thereby producing a second-to-arrive signal. The non-isolated component of the returning light is delayed in time from the isolated component of returning light, preferably by about 180 ns. Any variations in the light source 13 or APD 180 thus affect the isolated and non-isolated components the same. The non-isolated component could be the first-to-arrive signal and the isolated component could be the second-to-arrive component.

This delay is achieved by making optical delay line 297 longer than optical fiber 296. For example, a glass optical fiber such as 3M FT-800-LMT has an index of refraction of 1.45. The required difference in length between optical fiber 296 and optical delay line 297 is then (180 ns. * c)/1.45 which equals approximately 37 meters, where c is the speed of light in a vacuum. 37 meters of optical fiber are easily coiled into a bundle requiring little space.

A width of the light pulse from light source 13 is less than the delay caused by optical delay line 297 so that the isolated pulses and non-isolated returning light pulses enter APD 180 at different, non-overlapping times. APD 180 converts the returning light into an electrical signal. The electrical signal passes through a logarithmic amplifier 280 before entering a peak detector 298. Peak detector 298 captures the pulse amplitudes of the electrical signal, which are then digitized by an ADC 288 and processed by a computer 287 as explained earlier with reference to FIG. 13. Peak detector 298 is cleared before each arrival of a pulse pair.

Although the equipment described separates clear wing from ice and snow, it does not separate (except visually to the operator's eye) runway and other background surfaces from wing surfaces, etc. This is done via image processing techniques or stereo ranging or lidar (optical radar) ranging. In addition, image processing techniques can segment surfaces of like texture and only color red those "non-blinking" areas that are substantially surrounded by "blinking" areas (green). That is, ice is highlighted only when substantially surrounded by clear metal. As an alternative, stereo ranging may be used to separate foreground from background and only the foreground (wing or other aircraft surface) has non-blinking areas tagged to highlight ice formation.

When viewing downward on an aircraft wing, the ground appears in the field of view and returns unpolarized light similar to light reflected through ice. One method of rejecting this unwanted signal is to use the time of travel of the light pulses to determine which surface is reflecting the light. If the wing is at least 5 feet above the ground, the ground signal reaches the diode 180 at least 10 ns later (curve 3, FIG. 14) than a signal from the wing (curve 2) relative to the time of the strobe 289 (curve 1). Thus any signal exhibiting this additional delay is rejected as not belonging to the wing. Since the measurement is made on the leading edge by leading edge time measurement unit 286, pulses wider than 10 ns can be used without effect on this rejection process.

Computer 287 thus receives the log non-blocking signal, the log blocking signal, and the range information from leading edge time measurement unit 286. Computer 287 compensates for the range, looks up the plotted values in the look-up table, and outputs the results to a display 72.

Figure 23:
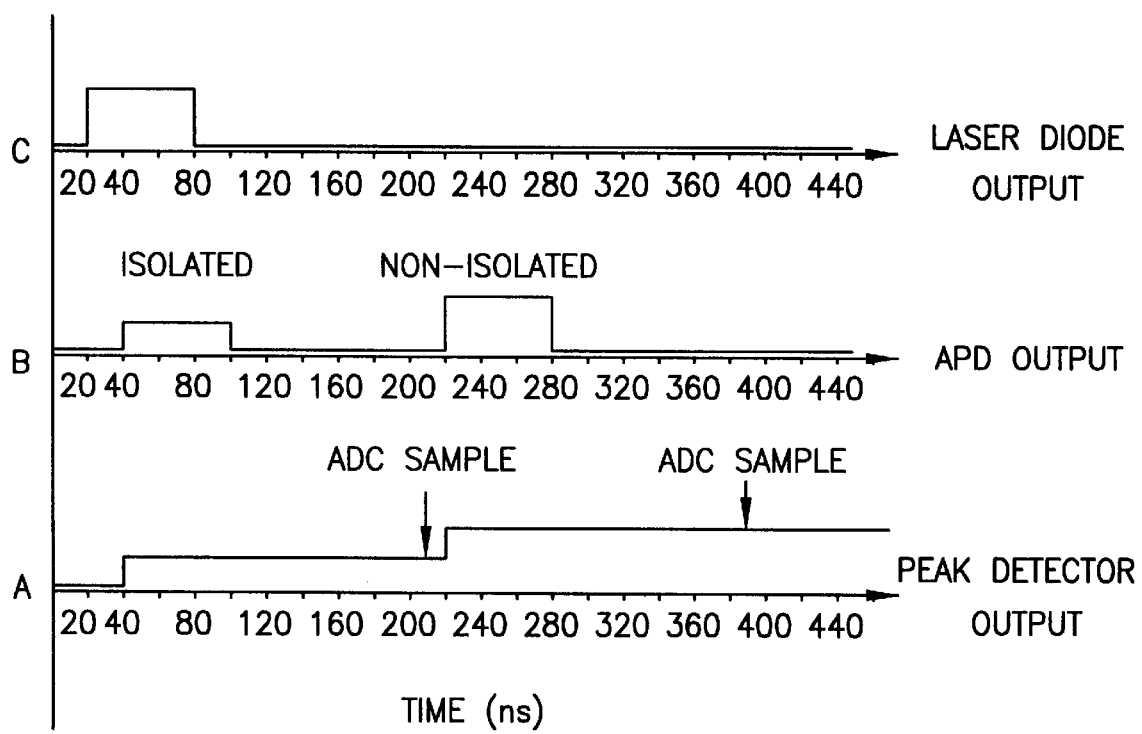
FIG. 23 shows the output of an avalanche photo diode and a peak detector compared with a laser diode light source output.

Referring also to FIG. 23, the output of peak detector 298 and APD 180 are shown as waveforms A and B, respectively, assuming a 60 ns light pulse from the laser diode of light source 13 illuminating the surface (not shown) 5 feet away with isolated and non-isolated fiber delays of 10 ns and 190 ns respectively. The light pulse from light source 13 is shown as waveform C in FIG. 23. ADC 288 samples the peak detector 298 output at two fixed points as shown in waveform A of FIG. 23. These points are well after the arrival of each pulse, isolated and non-isolated, from APD 180 as shown in waveform B of FIG. 23. As a distance from the surface (not shown) increases to 50 feet, the pulses shift to the right, approaching but not exceeding the sampling points of ADC 288. The fiber delay of optical delay line 297 and the pulse width of light source 13 are adjustable to meet various range and scan requirements.

Figure 24:
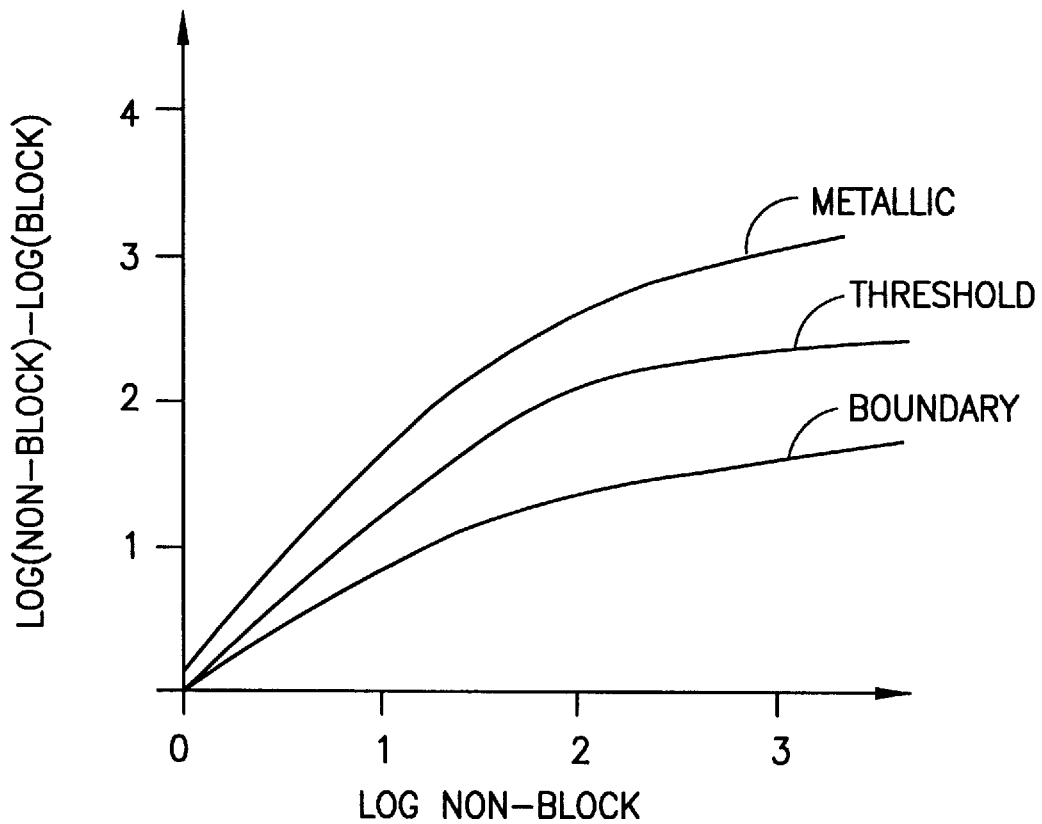
FIG. 24 is a graph plotting the ratio of the differences of the non-isolator and isolator data received signal amplitude values against the non-isolator state value.

Referring to FIG. 24, a simplified plot comparing ratios is shown. The ordinate is the log of the ratio of the non-blocked light (non-isolated) to the blocked light (isolated). Expressing the non-blocked light and blocked light as logarithms allows simple subtraction to be used by computer 287. The abscissa is the log of the non-blocked component. Threshold values are determined and preferably part of a look-up table. Computer 287 plots the values for the returning light and compares the result to the reference data in the look-up table to determine an "ice" or "no ice" condition. Negative numbers are not needed because the log of the non-isolator amplitude is normally equal to or larger than the log of the isolator amplitude.

Range correction can be done either by correcting the non-isolator amplitude value and the isolator amplitude value before subtracting, or by subtracting first and then carrying out the range correction. For the plot of FIG. 24, no correction is necessary for the vertical axis. That is, in the expression (non-block+range correction) minus (block+ range correction), the range correction terms cancel. For the horizontal axis, the expression used is (non-block+range correction).

With a single laser diode light source 13 and APD 180, the ratio used to determine ice or non-ice conditions is unaffected by fluctuations in laser power and APD gain since the pulse amplitudes of the isolating and non-isolating pulses are affected equally. Using optical fibers between lenses 295 and APD 180 permits remote operation of APD 180 and the downstream circuitry. In an aircraft mounted system, multiple optical heads could use the same APD and downstream electronics. In a hand held system, the optical portion of the system is separated from the electronics portion, conjoined by optical fiber 296 and optical delay line 297. Each portion is thus smaller, lighter, and more mobile.

When the embodiment shown in FIG. 13 is used in the presence of water fog, the results are degraded. The level of degradation is dependent on a number of factors, including the density of the fog, the distance between the light source used and the surface being examined, the surface reflectance of the surface being examined, and the laser pulse width of the light source. Since water fog is a mass of minute water droplets, the transmitted laser light intercepted by one of these minute water droplets is partially absorbed while the remainder is scattered (scattered light). The portion that is partially absorbed can usually be neglected since the amount absorbed is very small compared to the remainder. A fraction of the scattered light reflects back into the receiver (backscattered light), thus resulting in an undesired signal. Most of the remainder of scattered light is scattered out of the transmitting path.

The amount of backscattered light received from a single droplet is very small, but the amount of backscattered light received from a large number of droplets is significant. In addition, the received signal is attenuated due to the scattering of the intercepted light out of the transmitting path. Attenuation occurs in the receiving path as well as in the transmitting path. The level of attenuation is exponentially related to the lengths of the transmitting and receiving paths.

When the non-blocking received signal is used as an index into the ice threshold table, the table entry is compared with the ratio of the non-blocking received signal to the blocking received signal. Neglecting the effects of backscatter due to the water fog, both the non-blocking and blocking signals are attenuated by the same factor. Although the ratio is unaffected, the index to the table, i.e., the non-blocking signal, is attenuated, thereby causing the reference table to be accessed at the wrong point and an erroneous ice/non-ice/clear determination possibly made. The effect of the water fog is similar to the effect of using an incorrect range for range compensation.

In actuality, the backscattered light disproportionately affects the non-blocking signal. Since the backscattered light remains predominantly polarized, it appears only in the non-blocking signal. That is, the polarized backscattered light continues to be blocked by the optical isolator, so there is very little change in the blocking signal. The non-blocking signal, however, contains both the light reflected from the surface being examined and the backscattered light. This erroneous increase in the amplitude of the non-blocking signal erroneously increases the ratio, thereby causing the reference table to be accessed at the wrong point. An erroneous ice/non-ice/clear determination is thus possible.

As stated above, the level of degradation depends on the density of the fog, the distance between the light source used and the surface being examined, the surface reflectance of the surface being examined, and the laser pulse width of the light source. If the fog is only moderately dense and the surface reflectance is moderate at relatively close ranges, e.g., at 0 to 24 feet, the degradation in performance is small due to the low attenuation. With light fog or highly reflective surfaces, the signal reflected from the surface is well above the fog backscatter signal.

Figure 25:
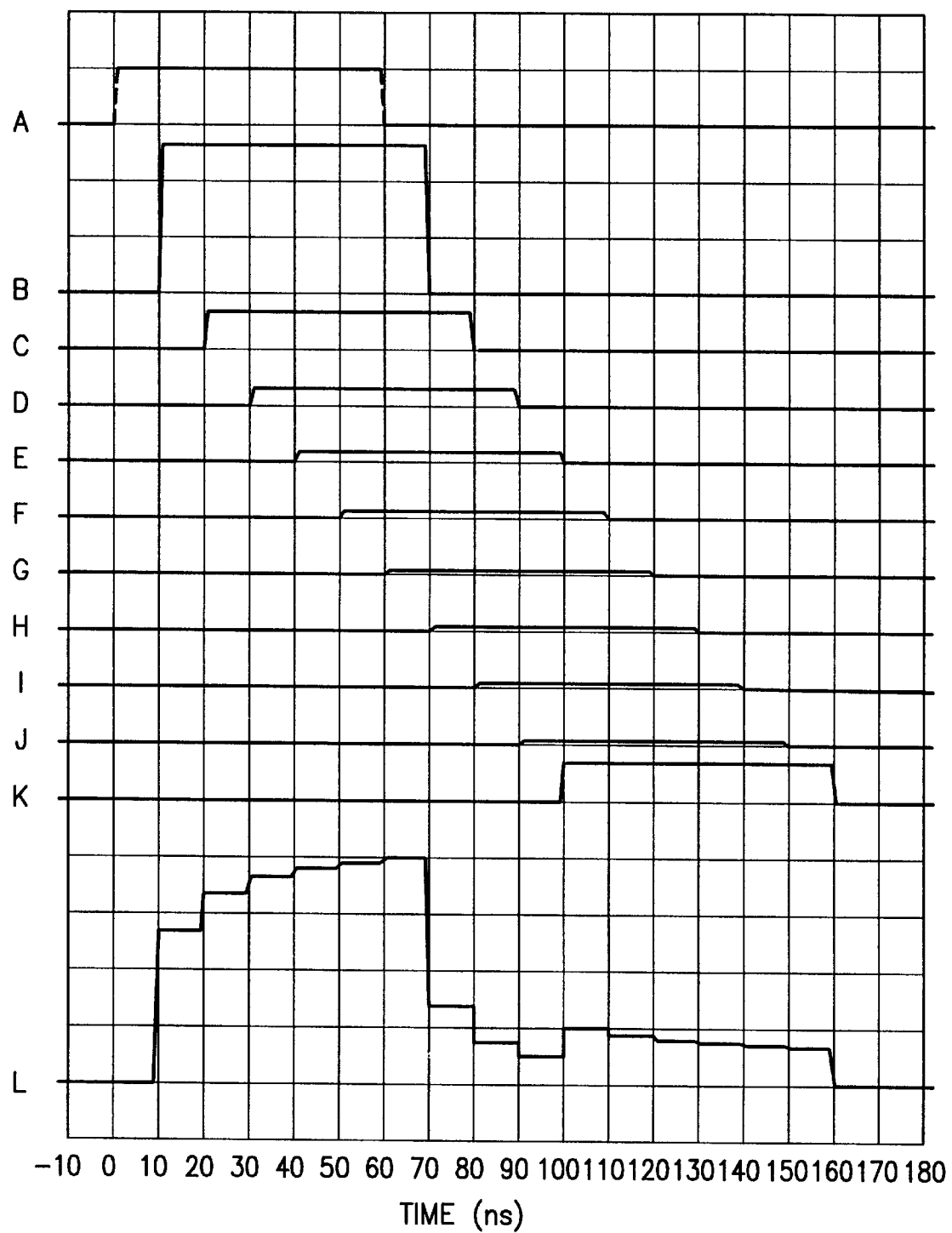
FIG. 25 shows waveforms modelling the effects of fog as a finite series of partially reflective layers.

Referring to FIG. 25, the effect of fog on the received signal due to backscattering is explained. The fog is assumed to be light so that attenuation is ignored for purposes of this illustration. The fog is modeled as a finite series of partially reflective layers. Waveform A shows the transmitted light pulse of a given amplitude. Waveform B shows a portion of the transmitted light pulse that is reflected from a fog reflective layer at 5 feet from the light source and received by the detector. The reflected light pulse reaches the receiver 10 ns after transmission of the transmitted light pulse. Waveforms C through J show the portions of the transmitted light pulse reflected and received from fog reflective layers at increasing intervals of 5 feet. Waveform K shows the portion of the transmitted light pulse reflected from the surface being examined at a distance of 50 feet.

As shown in waveform A, the transmitted light pulse is 60 ns wide. Since the transmitted light pulse is collimated, the reflective layers (fog and surface) are illuminated with the same light intensity (ignoring the attenuation effects of the fog). Since light reflects from the reflective layers in all directions, the power of the received signal depends on the receiver area and the distance between the receiver and the reflective layer. Neglecting attenuation due to fog, the received return signal from any one reflective layer is represented by the equation $$P(t) \approx P_0(t-2d/c) R_s A_r / (4\pi d^2), \quad \text{(Equation (1))}$$

where P(t) is the instantaneous received power, $P_0$(t) is the instantaneous transmitted power, $R_s$ is the reflectance of the layer, $A_r$ is the receiver area, and d is the distance between the reflective layer and the receiver. It is evident from this equation that the received power drops by a factor of four every time the distance doubles.

The speed of light is approximately $9.8 \times 10^8$ feet per second, which can be rounded off to $1.0 \times 10^9$ feet per second or 1 foot per nanosecond (ns). The transmitted light that reflects from the reflective layer centered at 5 feet thus takes (2)(5 ft)/(1 ft/ns)=10 ns for the round trip. The pulse in waveform B is seen to be shifted 10 ns to the right of the transmitted light pulse of waveform A. As shown in waveform C, since the reflective layer is centered at 10 feet, the pulse is shifted further in time and the power is reduced by a factor of four. The reflected pulse of waveform E is 1/16th of the reflected pulse of waveform B since the distance at the layer of waveform E is four times the distance at the layer of waveform B. The power of the reflected pulses decrease as shown in waveforms B through J as the distance of each layer increases.

Waveform K shows the signal reflected from the surface being examined. The amplitude of the received pulse is chosen for illustrative purposes only, although it is fairly close to the actual value. Fog beyond the surface does not reflect light since the transmitted light cannot pass through the surface. Waveform L shows the sum of waveforms B through K, thus representing the pulse of reflected light received as a result of the reflections by fog and surface of the transmitted pulse of waveform A.

Figure 26:
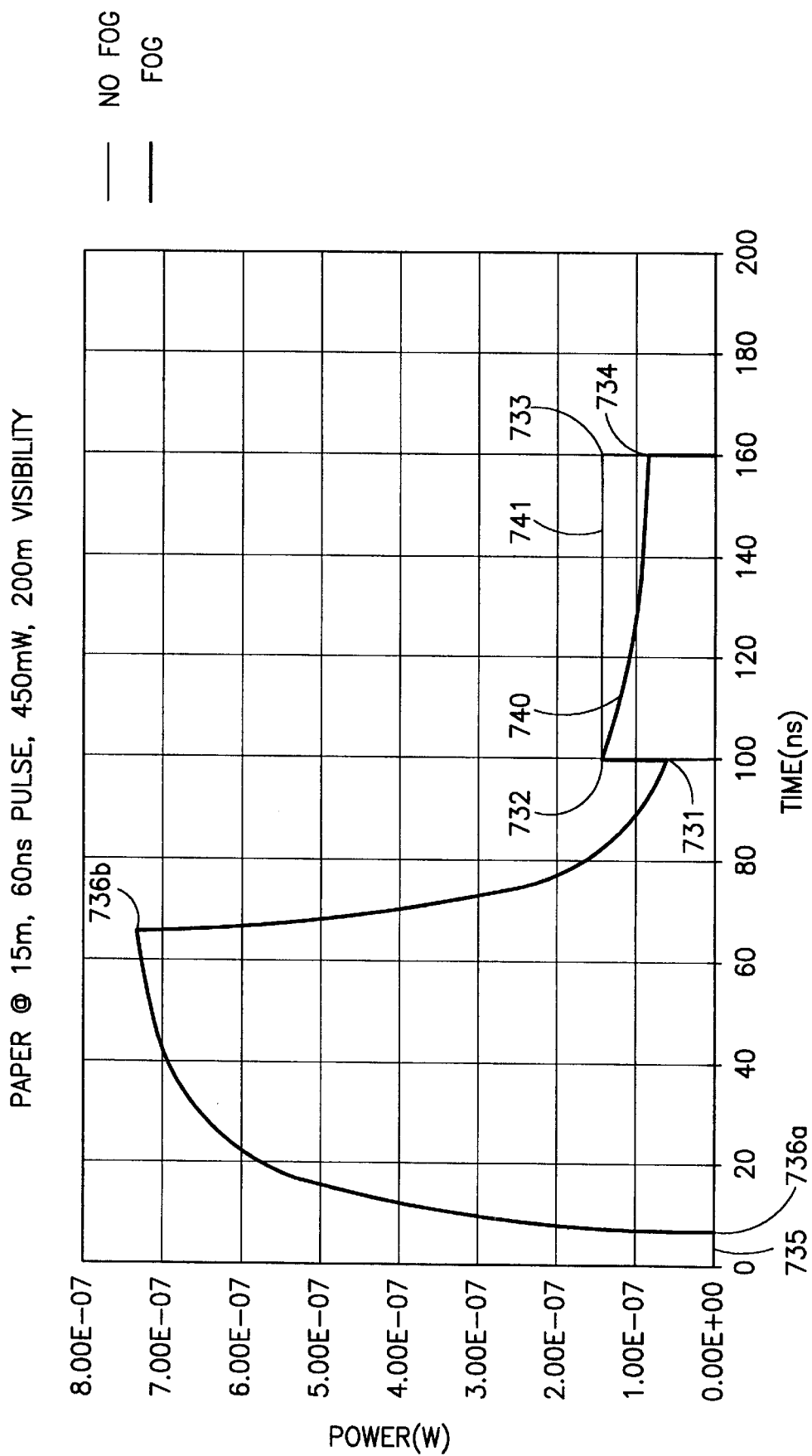
FIG. 26 is a graph showing the received reflected power of the light pulse, which includes the attenuation effects of the fog, as a function of time.

Referring to FIG. 26, a more accurate representation of the received reflected pulse is shown which includes the attenuation effects of the fog. The conventional equation (see, e.g., "Attenuation of Electromagnetic Radiation by Haze, Fog, Clouds, and Rain", by C. C. Chen, Report No. R-1694-PR prepared for the United States Air Force Project Rand, April 1975) relating an extinction (attenuation) coefficient $\alpha$ to a meteorological visibility $V_2$ is $\alpha=3.92/V_2$ for an optical wavelength such as $\lambda=500$ nm. "Fog" is defined such that the visibility $V_2$ is less than 1 km (0.62 mi.). The condition when $V_2$ is greater than 1 km is defined as "hazy." In this figure, a density of fog is assumed which equates to a visibility through fog of 200 m (660 feet). The transmitted light pulse is 60 ns in duration with a power of 450 mW. A curve 741 shows the received reflected pulse from the surface in a no-fog condition. A curve 740 shows the received reflected pulse from the fog and surface in a fog condition. The surface used is white paper at a distance of 15 m (50 feet).

Objects near the lens are not within the focus range of the lens. This defocusing effect is range dependent on the selection of optics, pinhole size, and lens focusing. Defocusing of objects at close range is approximated by forcing all signals reflected from objects closer than 1 m to zero as shown by a portion 735 of curve 740. An actual receiver begins to defocus more gradually, thus tending to make backscatter transitions 736a and 736b rounded instead of pointed.

A point 731 on curve 740 shows the received reflected pulse due to backscatter from fog received just before receiving the signal reflected from the surface. A point 732 on curve 740 shows the beginning of the received reflected pulse due to the backscatter from fog plus the attenuated reflected surface signal. A point 734 on curve 740 shows the received reflected pulse due only to the attenuated reflected surface signal, since there is no fog at the surface itself. A point 733 on curve 741 shows the received reflected pulse from the surface without any attenuation.

Although this discussion is couched in terms of fog, any scattering and/or absorbing atmospheric interference in the transmitted light path can be compensated in a similar manner. Such scattering and/or absorbing atmospheric interferences include fog, ice fog, dust, and smoke. The calculations may vary depending on basic parameters such as density, reflectivity, absorbance, wavelength, and the presence of other sources of optical energy.

Figure 27:
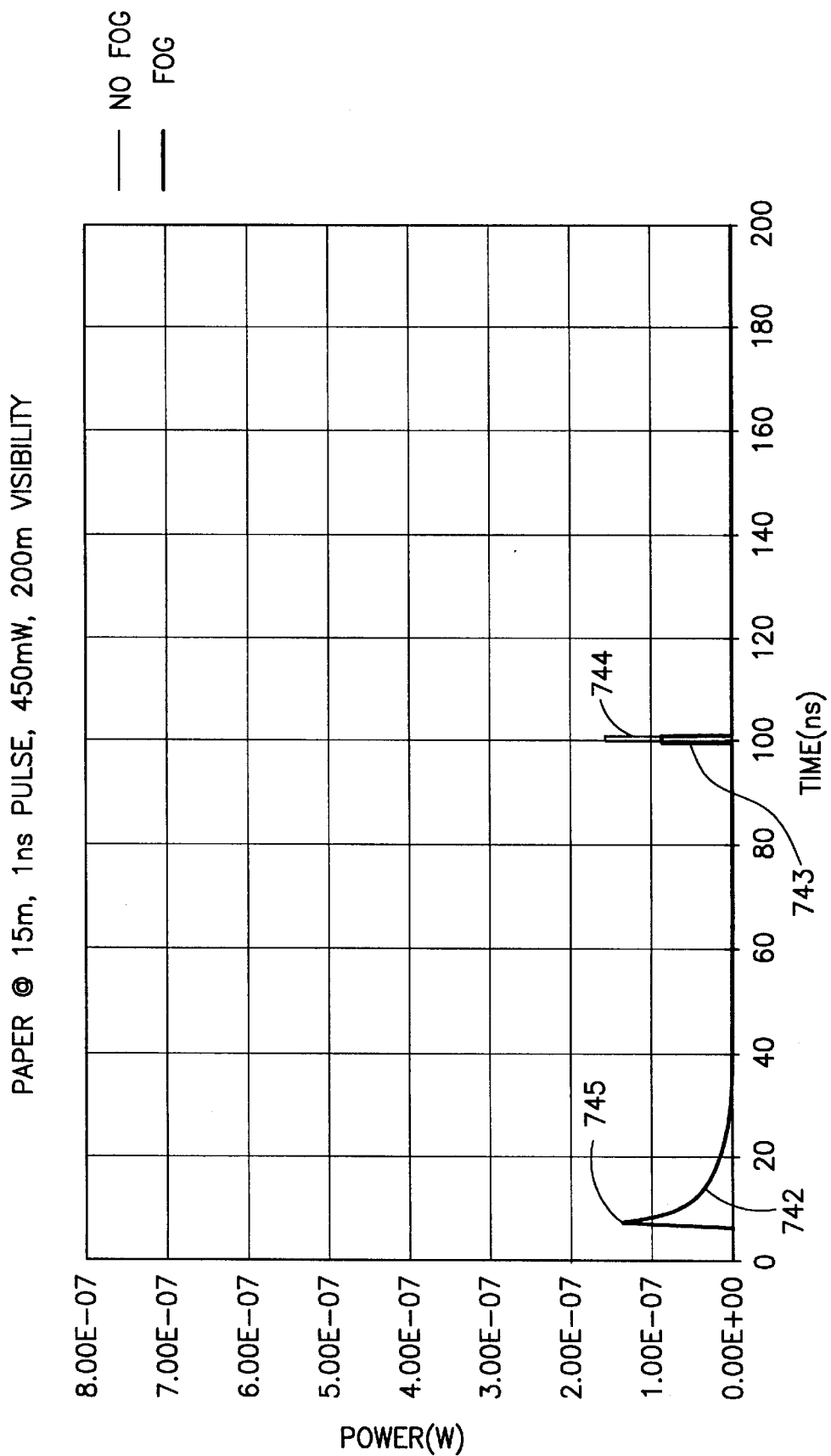
FIG. 27 is a graph showing the received reflected power of a narrow light pulse, which includes the attenuation effects of the fog, as a function of time to reduce the backscatter effects.

Referring to FIG. 27, one way of decreasing the effects due to backscatter while maintaining a constant received reflected pulse from the surface is illustrated. Using a narrower light pulse reduces the backscatter effects. Referring momentarily to FIG. 25, transmitting a light pulse 60 ns wide illuminates up to 60 linear feet of fog at any moment. Since the light must make a round trip back to the receiver, backscattered light from up to 30 feet of fog is received at the detector at any instant in time. This effect is illustrated by comparing waveform B to waveform H. As the 5 foot reflected pulse ends, the 35 foot reflected pulse is just beginning (time=70 ns).

Therefore, reducing the width of the transmitted light pulse to 1 ns as shown in FIG. 27 results in backscatter being received at the detector at any moment from only 0.5 feet of fog. The backscatter effect, shown by a curve 742, is well below the reflected surface signal shown by a curve 743. A curve 744 shows the non-attenuated reflected surface signal in the no-fog condition. The non-blocking received signal to blocking received signal is now correct. However, the attenuated reflected surface signal of curve 743 still accesses the reference table at the wrong point due to the attenuation of the non-blocking signal. Only the ratio is corrected by a narrow pulse width since the attenuation of the non-blocking signal is unaffected by changes in the transmitted light pulse width.

When shortening the transmitted light pulse width, it is preferable to increase its amplitude so that it carries the same transmitted energy as a longer pulse. This ensures that a high signal to noise ratio is maintained at the receiver. The high signal to noise ratio may be required since a receiver that detects a narrow pulse requires a higher bandwidth which is noisier in proportion to the increased bandwidth. In addition, it is preferable to have a minimum number of photons detected at the receiver to minimize quantum noise. Both of these preferences are satisfied by maintaining the total pulse energy at a constant level no matter what width pulse is used.

The effects of fog can be characterized as having an attenuation (extinction) coefficient $\alpha$ and a backscattering coefficient $\beta$. That is, the total instantaneous received power at time t can be represented as $P_s(t)+P_{bs}(t)$, where $P_s(t)$ is the instantaneous received power (attenuated) from the surface being examined and $P_{bs}(t)$ is the instantaneous received power from backscatter.

Homogeneous fog attenuates light according to the Beer-Lambert equation $P(x)=P(0)e^{-\alpha x}$ where x is the distance along the propagation path, $P(x)$ is the power at distance x from the source and $\alpha$ is the coeffiecient of extinction (attenuation).

The fog attenuated signal portion received from the surface can be expressed by the equation $$P_s(t,d)=P_0(t-2d/c)(R_s A_r/\Omega_s d^2)e^{-2d\alpha}, \quad \text{(Equation (2))}$$

where $P_s(t,d)$ is the instantaneous received power, $P_0(t)$ is the instantaneous transmitted power, $R_s$ is the surface reflectance, $A_r$ is the area of the receiver, d is the distance between the receiver and the surface being examined, $\Omega_s$ is the solid angle through which optical energy is reflected for the target surface and $\alpha$ is a attenuation coefficient (with units of 1/length). If the transmitter and receiver are not co-located or equidistant from the surface, a round-trip distance L is substituted for 2d.

Dividing equation 1 by equation 2 and rearranging, we obtain $$P(t,d)=P_s(t,d)/e^{-2d\alpha}. \quad \text{(Equation (3))}$$

From equation 3, we observe that if the distance d between the receiver and surface and the attenuation coefficient $\alpha$ are known, then the fog attenuated signal $P_s(t,d)$ can be restored to a no-fog condition $P(t,d)$ so that the reference table can be accessed correctly. The distance d is obtained by measuring the round trip travel time to the surface and back. The attenuation coefficient $\alpha$ is obtained from the backscatter signal as explained next.

The fog backscattered signal portion (with no intervening surface) can be approximately expressed by the equation $$P_{bs}(t)=P_0 \cdot f(\tau,\beta)(A_r/d^2)e^{-2d\alpha}, \quad t>\tau, \quad \text{(Equation (4))}$$

where $P_{bs}(t)$ is the instantaneous received power, $P_0$ is the amplitude of the rectangular transmitted power, c is the speed of light, $\tau$ is the transmitted light pulse width, $\beta$ is the backscattering coefficient (with units of 1/length*1/seradian), $A_r$ is the area of the receiver, and $d=c*t$. This approximation assumes that pulse width $\tau$ is narrow such that the attenuation over a distance $c\tau/2$ is negligible.

Experimentation shows that the backscattering coefficient $\beta$ is proportional to the attenuation coefficient $\alpha$, that is, $$\beta=k\alpha, \quad \text{(Equation (5))}$$

where k is a constant, so that measurement of either $\beta$ or $\alpha$ allows calculation of the other.

The backscatter equation for $P_{bs}$ can optionally be rewritten as $$P_{bs}(t)=P_0 \cdot F(\tau,\alpha)(A_r/\alpha)e^{-2ct\alpha}. \quad \text{(Equation (6))}$$

The relationship between $P_{bs}(t=T_{bs})$ and $\alpha$ is learned through measurement under various conditions of fog, including no fog. During run time (operation), the power of measured backscatter would then be used as an index into the lookup table which would return $\alpha$. This allows the system to be calibrated precisely without knowing the exact values of $P_0$, $\tau$, and $A_r$ which are sometimes difficult to determine. In addition, using a lookup table greatly reduces processing time.

Figure 28:
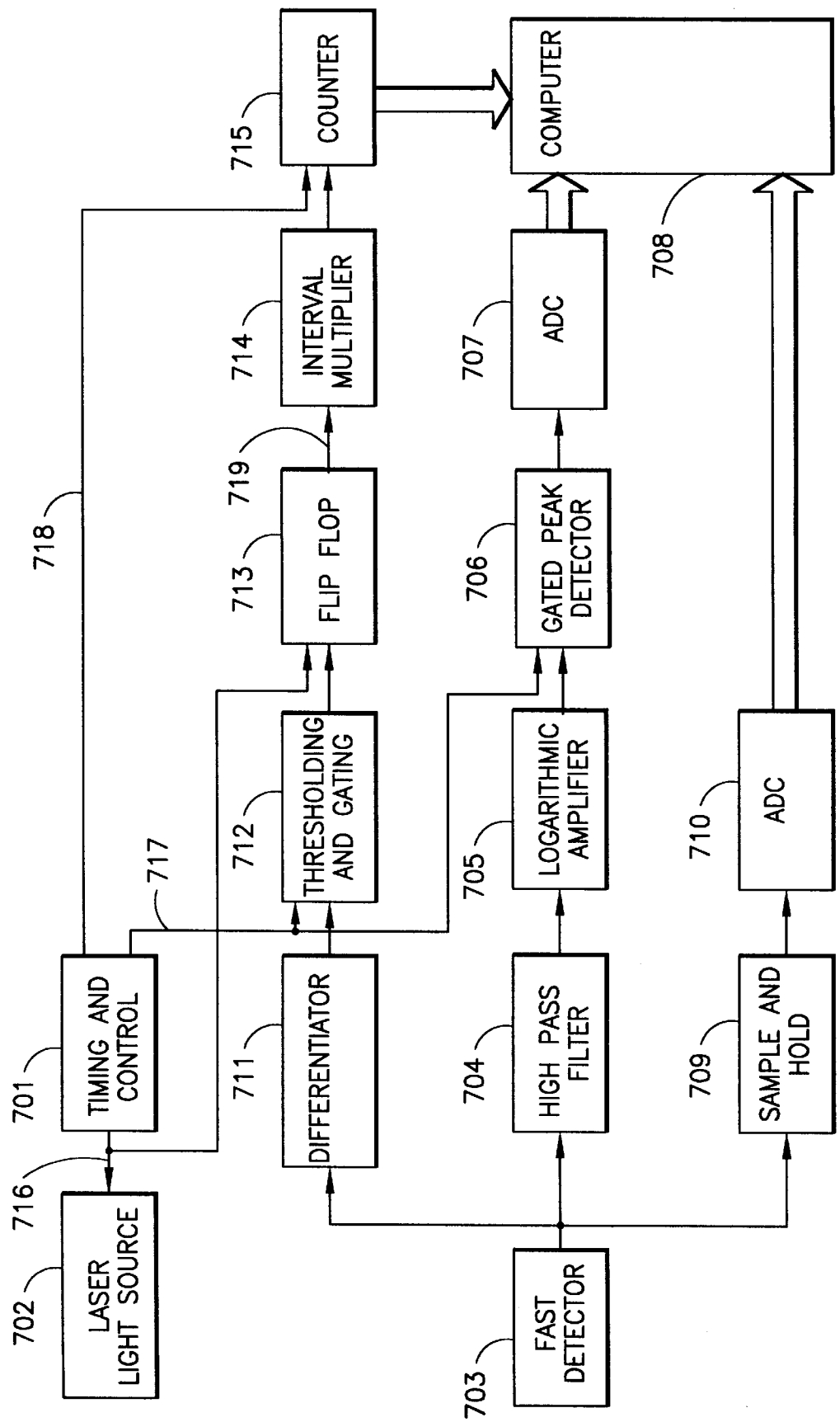
FIG. 28 shows the control circuitry for allowing operation of the ice detector while in the presence of fog.

Referring to FIG. 28, control circuitry is shown which, when replacing the control circuitry of FIG. 13 or the control circuitry of FIG. 22, allows operation of the ice detector while in the presence of fog. A timing and control unit 716 sends a strobe signal 716 to a light source 702, preferably a laser light source, which emits a narrow pulse of light. Light source 702 is preferably a laser such as a semiconductor laser or a crystal laser such as a Q-switched diode pumped YAG. Since some lasers, including crystal lasers, have more jitter than semiconductor lasers, a photo detector may be required to sample a small portion of the laser pulse to determine the actual time of emission. An output of the photo detector is then input into timing and control unit 701 for use in generating the gating, ranging, and sampling signals.

A photodetector such as fast detector 703 receives the isolated component from optical fiber 296 (shown in FIG. 22) and the non-isolated component from optical delay line 297 (shown in FIG. 22) and converts them to electrical signals. A sample and hold unit 709 samples the signal from fast detector 703 at a time when the fog backscatter is at or near its maximum, holding the value and sending it to ADC 710 for conversion to digital form. The digital signal is sent to a computer 708 for use in processing. Since the backscatter remains predominantly polarized, the backscatter measurement must come from the non-blocking (non-isolated) signal. Backscatter from the blocking signal is potentially useful when operating in other types of fog, such as ice fog, or for disabling operation of the detection system when a correction cannot be made.

The signal from fast detector 703 passes through a high pass filter 704 to remove most of the backscatter component from the signal before it reaches a logarithmic amplifier 705. A gated peak detector 706 captures the blocked and non-blocked pulse amplitudes reflected from the surface being examined. The pulse amplitudes are digitized by an ADC 707 and sent to computer 708 for use in processing. Any backscatter component not removed by high pass filter 704 is blocked from entering gated peak detector 706 by a gating signal 717 from timing and control unit 701.

The signal from fast detector 703 is also sent to a differentiator 711 which isolates the leading edges of the backscatter and surface reflected pulses. These leading edges are gated by gating signal 717 and threshold detected to remove all but the leading edge of the non-blocked surface reflected pulse by a threshold and gating unit 712. A flip flop 713 is set by strobe signal 716 and cleared by the non-blocked surface reflected leading edge so that a width of an output pulse 719 represents the round trip travel time from light source 702 to the surface being examined and back with some fixed delays added. The width of pulse 719 is expanded, preferably 20 times, by an interval multiplier 714 before being used to start and stop a counter 715. Expanding the width of pulse 719 allows a slower counter 715 than would otherwise be required to maintain the same precision. Counter 715 is driven by a clock signal 718 from timing and control unit 701. An output of counter 715 is processed by computer 708 to remove the fixed delays and convert the round trip travel time to a range.

Figure 29A:
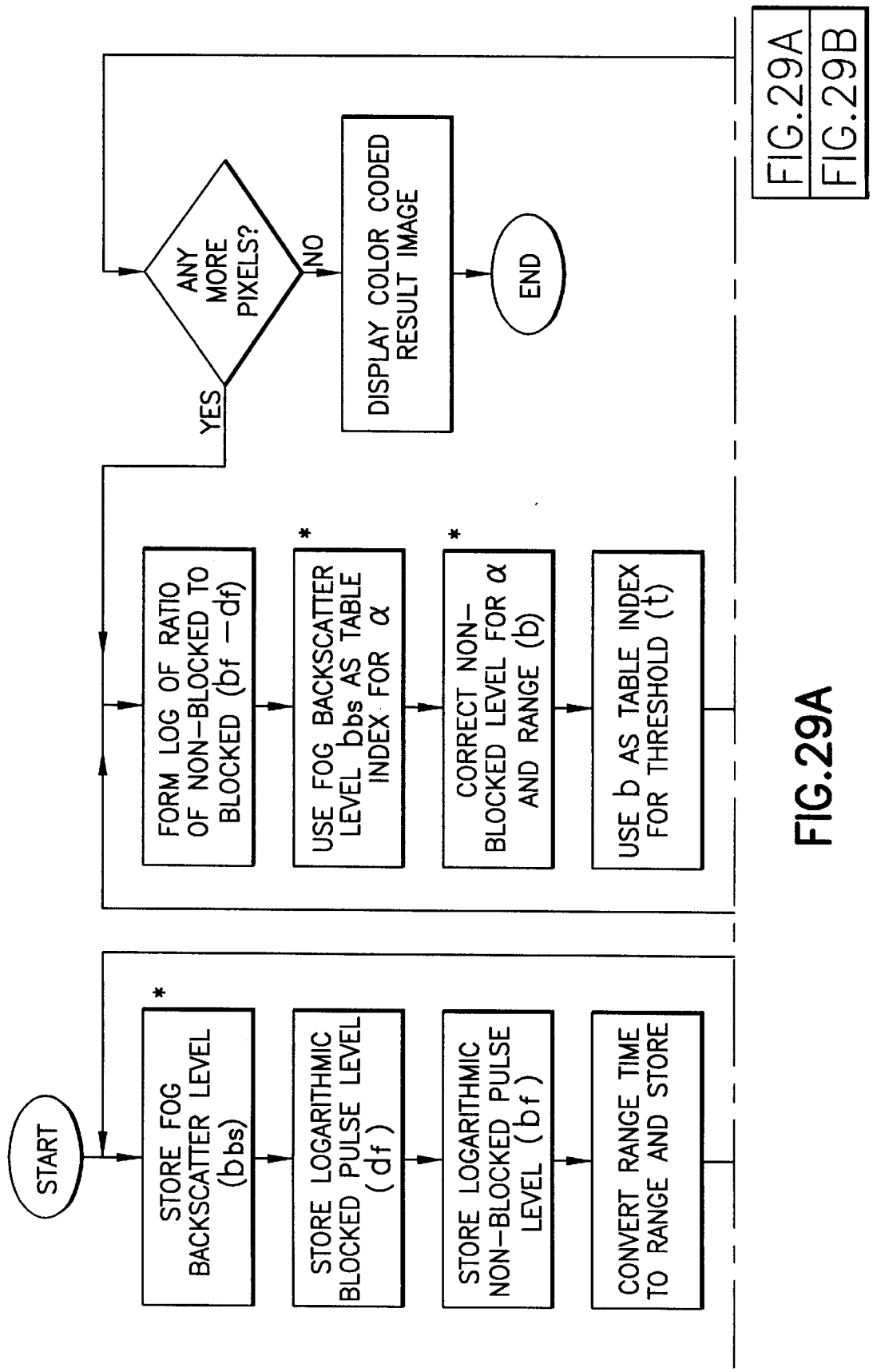
FIG. 29 shows a flow diagram of the process for compensating for the effects of fog and categorizing the measured values as clear, ice, and non-ice.
Figure 29B:
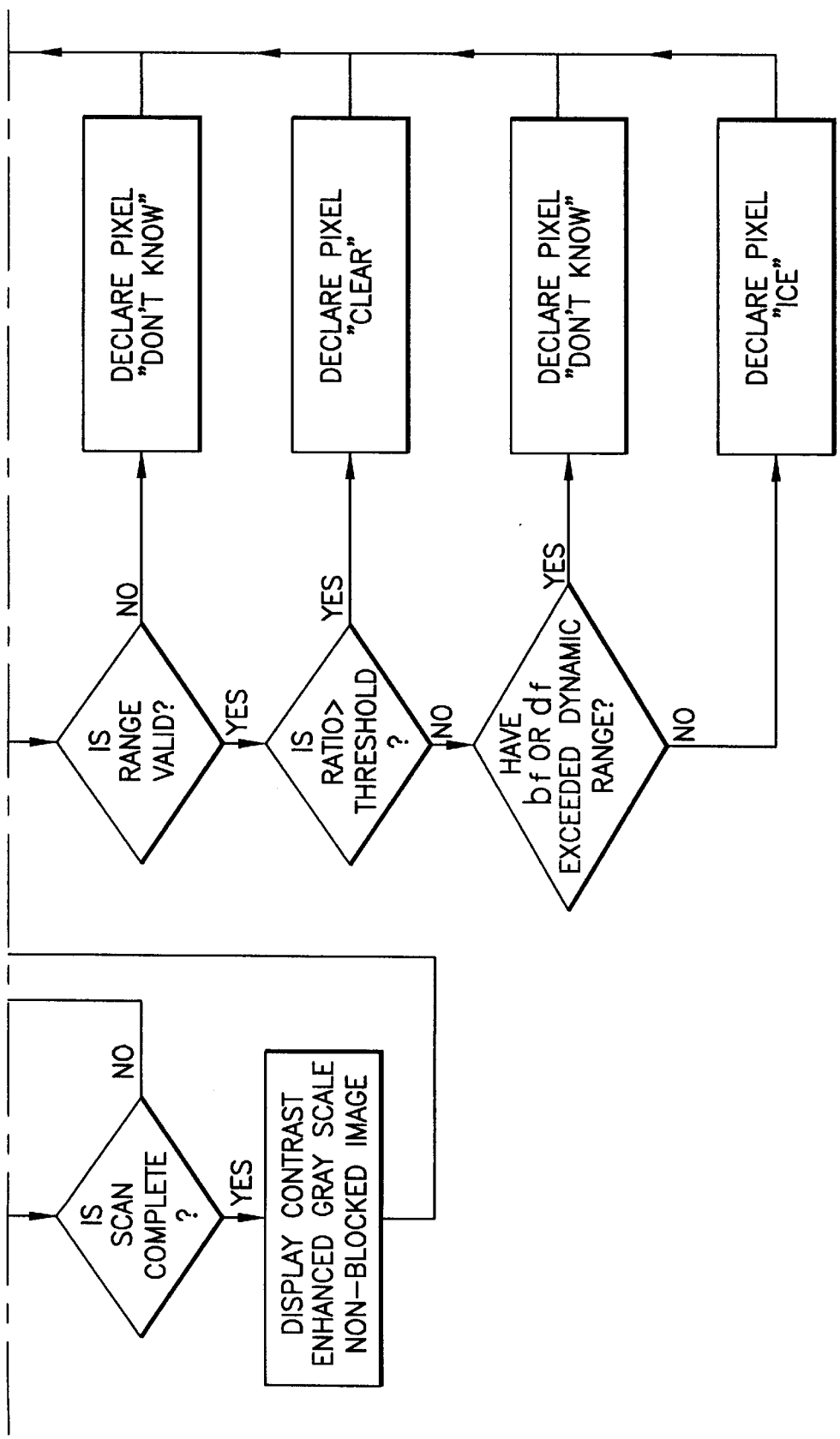

Referring to FIG. 29, information is processed by the computer as shown in the flow diagram so that a color coded, shaded result is displayed on an LCD or CRT. The process, based on the above apparatus, for overcoming the effects of fog includes (1) transmitting a narrow light pulse, (2) determining the fog backscatter level from the received reflected light pulse, (3) determining the log of the amplitudes of the fog attenuated blocked and non-blocked components of the reflected light pulse, (4) determining the distance between the light source and the surface being examined, and (5) processing these variables to compensate for the effects of fog before entering a lookup table to determine the ice/non-ice/clear condition previously described. The process is repeated many times while scanning the beam of light pulses to cover a large area.

A potential problem exists with the configuration of FIG. 28. The dynamic range of the system is determined by fast detector 703. The dynamic range of fast detector 703 is limited by quantum noise, electrical noise, and breakdown conditions. This dynamic range is sometimes insufficient for operating at near and far distances and on highly reflective specular surfaces. Highly reflective specular surfaces reflect most of the received light back along the transmitted light path when the transmitting/viewing angle is near normal to the surface, while most of the reflected light is reflected away from the receiver when the transmitted light path is angled away from the surface.

Figure 30:
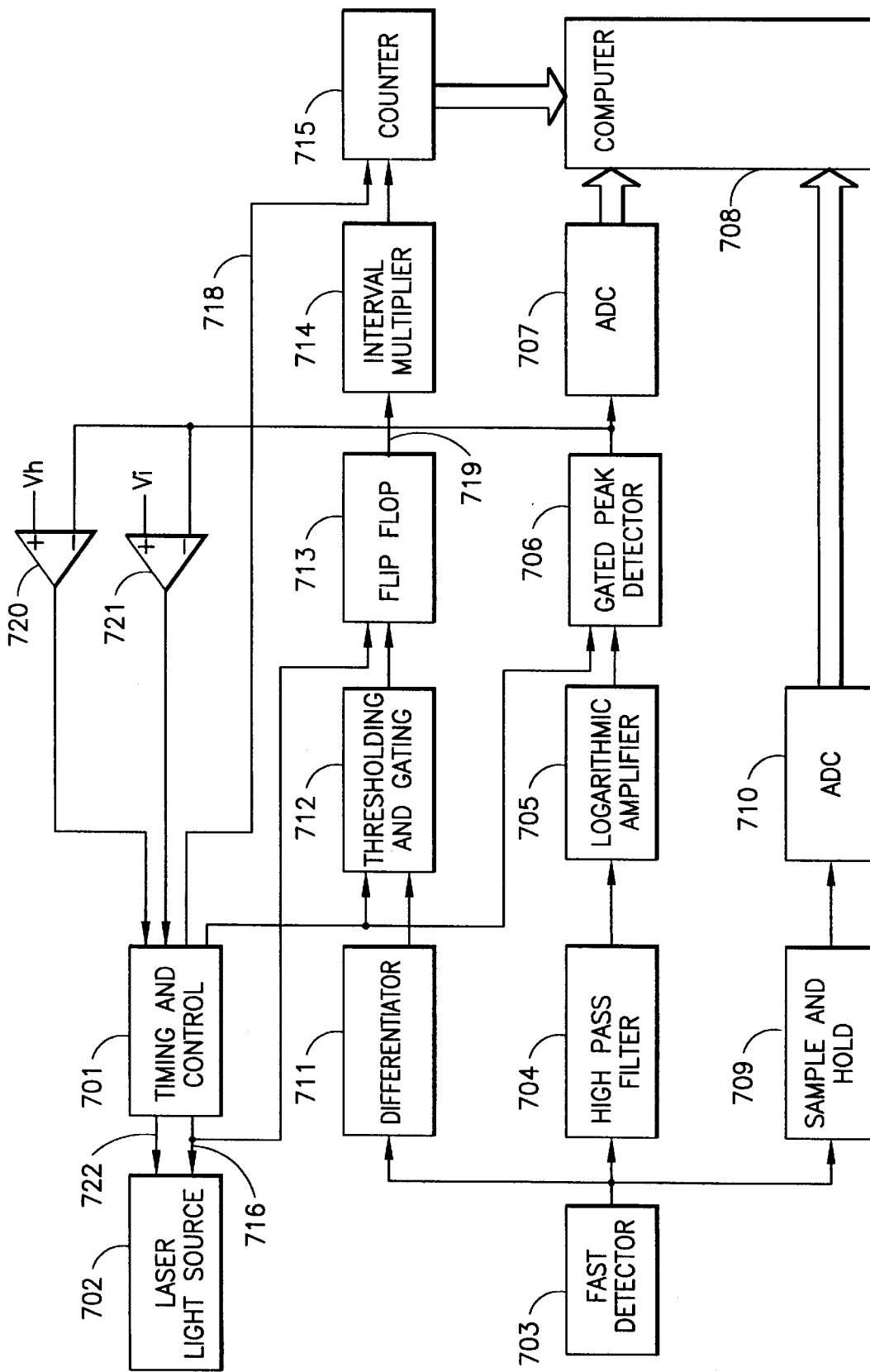
FIG. 30 shows control circuitry for increasing the dynamic range of the system with the addition of a second laser power level.

Referring to FIG. 30, the dynamic range of the system is increased with the addition of an optional second laser power level. This optional second laser power level is produced during operation of the system as follows. Timing and control unit 701 triggers laser light source 702 with strobe signal 716, causing it to transmit a low power pulse of light. The received light signal is processed as described with respect to the FIG. 28 embodiment above and the output sent to computer 708. The pulse amplitudes from gated peak detector 706 are sent to two comparators 720, 721 which send their output to timing and control unit 701. Timing and control unit 701 monitors the outputs of comparators 720, 721, and when necessary, sends a strobe signal 722 to laser light source 702 triggering a high power pulse of light. The return from the high power pulse is processed the same way as the low power pulse return and the output sent to computer 708.

Comparator 720 establishes a threshold for the non-blocking signal. The non-blocking threshold is selected such that the high power pulse is not transmitted if the receiver would saturate. Comparator 721 establishes a threshold for the blocking signal. The blocking threshold is selected such that the high power pulse is transmitted only if the blocking signal is not strong enough to be processed. The high power pulse is transmitted only when both the non-blocking and blocking signals are below their respective thresholds.

If necessary, additional pulse power levels are used to further increase the dynamic range or to compensate for a fast detector 703 which has a low dynamic range.

Computer 708 handles multiple laser pulse power levels by modifying the blocking and non-blocking values based on the power level of the transmitted pulse. When the values are in their preferable logarithmic form, an offset is used to modify the values since the values are in logarithmic form. When the values are in non-logarithmic form, scaling is used to modify the values. The modifying is similar to the compensation used for range or distance. The non-blocking and blocking values used to make the ice/non-ice/clear determination can result from the low power pulse, the high power pulse, or both low and high power pulses as long as each value is modified based on its corresponding power level.

When the system of FIG. 30 is used in a fixed installation, i.e., the system is at a fixed position relative to the surface being investigated, such as with an aircraft wing, a different method for compensating for the effects of fog is optionally used. During image processing, the location of each pixel making up the image is the same from one scan to the next, thus allowing the distance from the receiver to each point on the surface to be pre-calculated and stored in memory. Pre-calculation and storage eliminates the need for separate range measurement. In addition, exact reflection characteristics of each point on the surface, whether paint, reflective paint, or bare metal, are pre-determined using a known clean (substance free) surface under no-fog conditions and stored in memory for later use during icing conditions. This pre-determination is also useful when different surface finishes are present on the same wing or as a painted surface changes due to weathering, since periodic calibrations can be done.

A reference surface, optionally heated to avoid contamination from ice or snow, can be placed within the scan area and used to measure the attenuation coefficient $\alpha$ directly. The blocking and non-blocking values obtained from the reference surface during clear weather conditions are stored for comparison with the blocking and non-blocking values obtained from the reference surface during fog conditions, thus allowing direct determination of the attenuation coefficient α for those particular fog conditions. Measuring the backscatter thus is not necessary to obtain the attenuation coefficient α.

Under light fog conditions, it is possible to use a wide laser pulse, where the pulse width times c (speed of light) is preferably at least several times the distance between the receiver and the surface, so that the backscatter signal is added to the signal reflected from the surface. That is, the transmission pulse width τ meets the condition cτ>>d, where c is the speed of light and d is the target range. Light fog conditions are defined as fog conditions light enough to determine a signal to backscatter ratio sufficient to permit useful measurement.

A measure of pure backscatter is obtained after the laser scanning beam crosses an edge of the surface, thereby directly measuring a backscatter amplitude without any reflection from the target surface. The backscatter component is then used along with the directly measured attenuation coefficient α to compensate the blocking and non-blocking signals for proper entry into the reference table. This compensation includes taking the inverse log of the blocking and non-blocking values for both the point on the surface being inspected and the pure backscatter point. The blocking backscatter value is then subtracted from the blocking surface value, the result divided by the overall attenuation for that distance, and converted back to log form. The same operation is performed on the non-blocking value.

Figure 31:
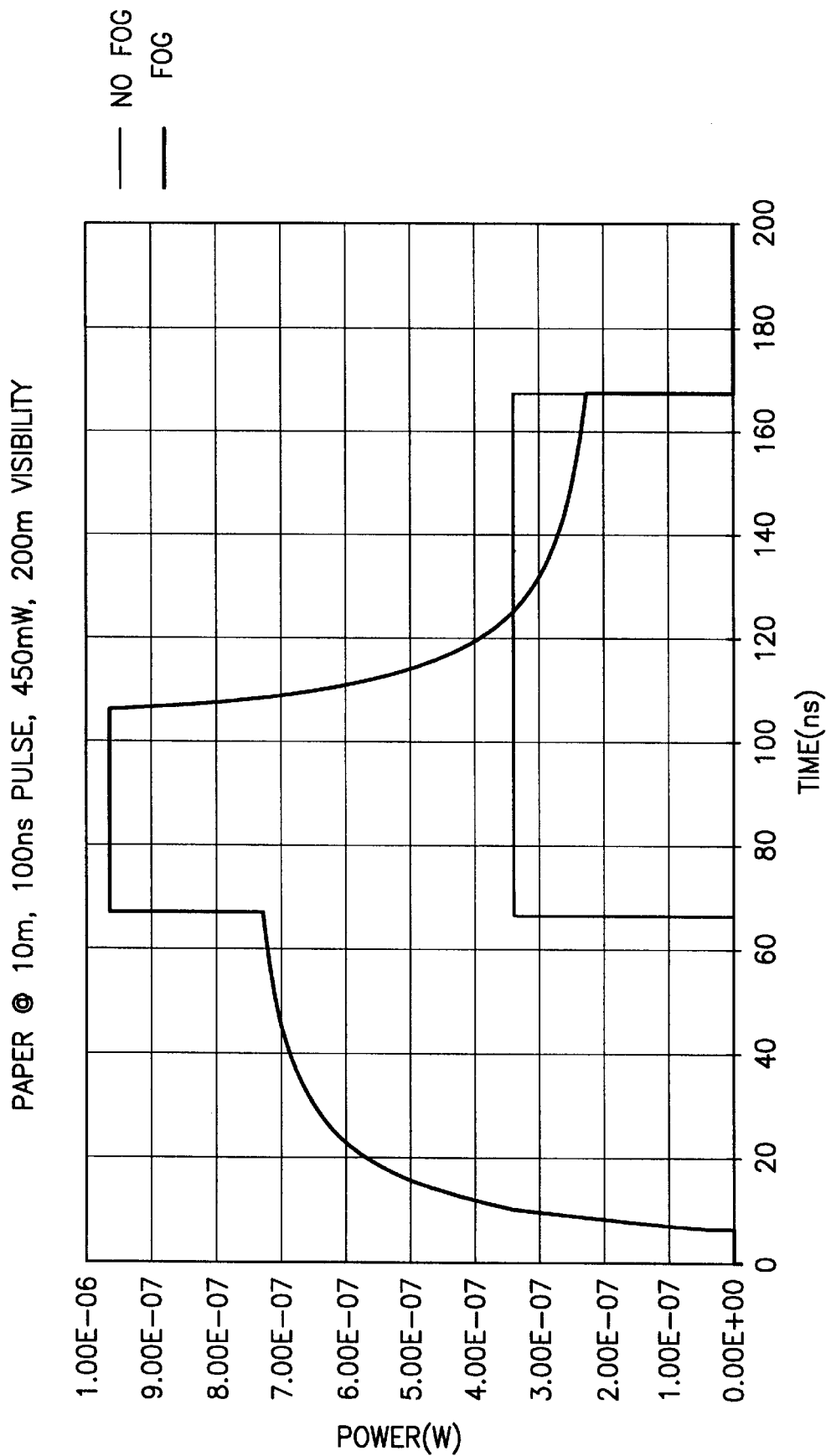
FIG. 31 is a graph comparing the received reflected power of a wide light pulse in both fog and no-fog conditions as a function of time.

Referring to FIG. 31, the received reflected power of a wide light pulse in fog conditions is compared to the received reflected power of the wide light pulse in no-fog conditions as a function of time. As is evident from this figure, the backscatter instantaneous signal reaches a maximal plateau at and around the target (surface) echo. The combined backscatter and target echo amplitude is determined preferably using a peak detector. The equation $$B_{(target)} = B'_{(target)} - B_{(air)} \qquad \text{(Equation (7))}$$

where B and B' only refer to the non-blocking component of the signal, B is the fast detector 703 equivalent output of the peak detected signal due to the target echo, reference surface, or air; B' is the fast detector 703 equivalent output of the peak detected signal due to the target echo, reference surface, or air combined with the backscatter; and $$B_{(air)} = \text{backscatter.} \qquad \text{(Equation (8))}$$

Note that when measuring $B_{(air)}$, $B_{(target)}=0$ and $B'_{(target)} = B_{(air)}$. Further note that $B_{(target)}$, being the observed signal, is liable to be degraded. The above procedure is not possible if the fog is too heavy since the signal to backscatter ratio is too small to permit useful measurement.

The attenuation (extinction) coefficient is computed using the conventional Lambert-Beer Law of Absorption for homogeneous fog according to $$\alpha = (1/L)\ln(B_{clr}(ref)/B_{obs}(ref)) \qquad \text{(Equation (9))}$$

where $B_{clr}(ref)$ is the fast detector 703 equivalent output of the peak detected signal due to the reference signal in clear weather, $B_{obs}(ref)$ is the fast detector 703 equivalent output of the peak detected signal due to the reference signal during all-weather operation, and L is the total path length of the transmitted and reflected pulse. When the transmitter and receiver are both a distance d from the surface being investigated, L=2d.

The earlier derived $B_{(target)}$ from equation (7) is compensated for attenuation (restored) using equation (3) according to $$B_{restored}(\text{target}) = B_{obs}(\text{target})e^{\alpha L}. \qquad \text{(Equation (10))}$$

The blocking received signal is handled in the same way as the non-blocking signal to extract the target and backscatter components according to $$D_{(target)} = D'_{(target)} - D_{(air)} \qquad \text{(Equation (11))}$$

where D and D' only refer to the blocking component of the signal, D is the fast detector 703 equivalent output of the peak detected signal due to the target echo, reference surface, or air; D' is the fast detector 703 equivalent output of the peak detected signal due to the target echo, reference surface, or air combined with the backscatter; and $$D_{(air)} = \text{backscatter.} \qquad \text{(Equation (12))}$$

The derived $D_{(target)}$ from equation (11) is compensated for attenuation (restored) using the attenuation coefficient α from equation (9) through $$D_{restored}(\text{target}) = D_{obs}(\text{target})e^{\alpha L}. \qquad \text{(Equation (13))}$$

$B_{restored}(\text{target})$ and $D_{restored}(\text{target})$ are then used as previously described to enter the reference table at the correct point and return an ice/no-ice/clear determination.

In an alternative embodiment, the coefficient of attenuation (extinction) α is derived from the blocking components of the signal according to $$\alpha = (1/L)\ln(D_{clr}(ref)/D_{obs}(ref)) \qquad \text{(Equation (14))}$$

where $D_{clr}(ref)$ is the fast detector 703 equivalent output of the peak detected signal from the reference surface in clear weather and $D_{obs}(ref)$ is the fast detector 703 equivalent output of the peak detected signal due from the reference surface during all-weather operation. L is the total path length of the transmitted and reflected pulse. When the transmitter and receiver are both a distance d from the surface being investigated, L is equal to 2d.

In another embodiment, the mean of the attenuation coefficients derived through equations (9) through (14) is used for restoring the degraded signals.

In another embodiment, the attenuation coefficient α is derived through the steps of computing either the B(air) or D(air) components referred to in equations (7), (8), (11), and (12) to index a predetermined table derived from equation (6).

In yet another embodiment, the attenuation coefficient α derived according to the steps described above is used to determine horizontal visibility according to the conventional relationship $$V_2 = 3.92/\alpha \qquad \text{(Equation (15))}$$

That is, once the embodiments of FIGS. 28 and 30 are used to determine the attenuation coefficient α, the meteorological visibility $V_2$ is determined. For example, if the total path length L is known and $B_{clr}(ref)$ for a known surface at a known distance under known clear conditions, $B_{obs}(ref)$ is measured and equation (9) is used to solve for the attenuation coefficient α. Equation (15) is then solved for $V_2$.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for detecting, on a surface which specularly reflects light, the presence of a polarization altering substance on said surface comprising:

means for transmitting a pulse of light over a transmitting path to said surface;

means for receiving transmitted light;

a receiving path for said transmitted light from said surface and from said substance to said means for receiving;

means for splitting said transmitted light into a non-isolated portion and an isolated portion;

means for delaying one of said non-isolated portion and said isolated portion relative to another thereof to produce a first-to-arrive signal and a second-to-arrive signal;

said first-to-arrive signal being completed at an output of said means for delaying before said second-to-arrive signal arrives at said output;

means for measuring a first intensity of said first-to-arrive signal and outputting a first signal;

means for measuring a second intensity of light of said second-to-arrive signal and outputting a second signal; and means for comparing said first and second intensities of light to reference data to detect the presence of said substance on said surface.

2. Apparatus as in claim 1, further comprising:

means for outputting a first logarithmic signal from said first signal;

means for outputting a second logarithmic signal from said second signal;

means, responsive to a length of said receiving path, for range-correcting said first and second logarithmic signals to produce a range-corrected first logarithmic signal and a range-corrected second logarithmic signal;

means for comparing said range-corrected second logarithmic signal to said range-corrected first logarithmic signal and outputting a ratio signal;

means for calculating a threshold signal; and means for comparing said ratio signal to said threshold signal.

3. Apparatus as in claim 2, wherein said ratio signal represents said second range-corrected logarithmic signal subtracted from said first range-corrected logarithmic signal.

4. Apparatus as in claim 1, wherein said reference data are in logarithmic form.

5. Apparatus as in claim 1, further comprising means for establishing said reference data by measuring said first and second intensities at a reference distance from said surface when said surface is a known surface with said polarization altering substance absent from said known surface.

6. Apparatus as in claim 5, wherein said means for establishing said reference data further comprises:

means for calculating a first ratio of said second intensity to said first intensity and making a first comparison of said first ratio to said second intensity when said polarization altering substance is absent from said known surface;

means for calculating a second ratio of said second intensity to said first intensity and making a second comparison of said second ratio to said second intensity when said polarization altering substance is present on said surface; and means for determining a threshold to establish a difference between said first and second comparisons, said threshold representing different conditions of the surface being investigated.

7. Apparatus as in claim 6, wherein one of said conditions of said surface is the presence of one of ice and snow and another condition an absence thereof.

8. Apparatus as in claim 5, wherein said transmitting path and said receiving path are substantially a same length as said reference distance used by said means for establishing reference data.

9. Apparatus as in claim 5, wherein said transmitting path and said receiving path are substantially a different length from said reference distance and said means for comparing includes means for correcting for said different length.

10. Apparatus as in claim 5, wherein said means for establishing said reference data includes means for measuring said first and second intensities when said surface is a known surface with said polarization altering substance absent from said known surface at a plurality of angles with respect to a normal of said surface.

11. Apparatus as in claim 5, wherein said means for establishing said reference data includes means for measuring said first and second intensities at a plurality of angles with respect to a normal of said surface when said surface is a known surface with said polarization altering substance present.

12. Apparatus as in claim 1, wherein:

said means for transmitting light includes only one transmitter; and said means for receiving transmitted light includes only one receiver.

13. Apparatus as in claim 1, wherein said means for delaying one of said non-isolated portion and said isolated portion includes optical fiber.

14. Apparatus as in claim 1, wherein said means for measuring a first intensity, said means for measuring a second intensity, and said means for comparing said first and second intensities are separated from said means for splitting by said means for delaying one of said non-isolated portion and said isolated portion.

15. Apparatus for detecting, on a surface which specularly reflects light, the presence of a polarization altering substance on said surface comprising:

means for transmitting a pulse of polarized light onto said surface;

means for receiving said pulse reflected from said surface;

means for directing said reflected pulse onto a non-blocking optical path to a detector;

means for directing said reflected pulse onto a blocking optical path to said detector; and one of said blocking and non-blocking optical paths having a delay exceeding a pulse length of said pulse, whereby responses of said detector to said reflected pulse directed onto said blocking and non-blocking optical paths are separated.

16. Apparatus as in claim 15, further comprising optical fiber effective for producing said delay.

17. Apparatus as in claim 15, wherein said detector comprises:

means for measuring a first intensity of said reflected pulse directed onto one of said blocking and non-blocking optical paths not having said delay and outputting a first signal; and means for measuring a second intensity of said reflected pulse directed onto another one of said blocking and non-blocking optical paths having said delay and outputting a second signal.

18. Apparatus as in claim 17, further comprising means for comparing said first and second intensities to reference data to detect the presence of said substance on said surface.

19. Apparatus as in claim 17, further comprising:
means for outputting a first logarithmic signal from said first signal;
means for outputting a second logarithmic signal from said second signal;
means, responsive to a length of one of said non-blocking and blocking optical paths, for range-correcting said first and second logarithmic signals to produce a range-corrected first logarithmic signal and a range-corrected second logarithmic signal;
means for comparing said range-corrected second logarithmic signal to said range-corrected first logarithmic signal and outputting a ratio signal;
means for calculating a threshold signal; and
means for comparing said ratio signal to said threshold signal.

20. Apparatus as in claim 19, wherein said ratio signal represents said second range-corrected logarithmic signal subtracted from said first range-corrected logarithmic signal.

21. Apparatus as in claim 18, wherein said reference data are in logarithmic form.

22. Apparatus as in claim 18, further comprising means for establishing said reference data by measuring said first and second intensities at a reference distance from said surface when said surface is a known surface with said polarization altering substance absent from said known surface.

23. Apparatus as in claim 22 wherein said means for establishing said reference data further comprises:
means for calculating a first ratio of said second intensity to said first intensity and making a first comparison of said first ratio to said second intensity when said polarization altering substance is absent from said known surface;
means for calculating a second ratio of said second intensity to said first intensity and making a second comparison of said second ratio to said second intensity when said polarization altering substance is present on said surface; and
means for determining a threshold to establish a difference between said first and second comparisons representing different conditions of the surface being investigated.

24. Apparatus as in claim 23 wherein one of said conditions of said surface is the presence of one of ice and snow and another condition an absence thereof.

25. Apparatus as in claim 18 wherein said means for establishing said reference data includes means for measuring said first and second intensities when said surface is a known surface with said polarization altering substance absent from said known surface at a plurality of angles with respect to a normal of said surface.

26. Apparatus as in claim 18 wherein said means for establishing said reference data includes means for measuring said first and second intensities at a plurality of angles with respect to a normal of said surface when said surface is a known surface with said polarization altering substance present.

27. Apparatus as in claim 18 wherein said means for measuring a first intensity, said means for measuring a second intensity, and said means for comparing said first and second intensities are separated from said means for receiving by one of said means for directing said reflected pulse onto said non-blocking optical path and said means for directing said reflected pulse onto said blocking optical path.

28. Apparatus for detecting on a surface which specularly reflects light, the presence of a polarization altering substance on said surface comprising:
means for transmitting light over a transmitting path to said surface;
means for receiving transmitted light;
a receiving path for said transmitted light from said surface and from said substance to said means for receiving;
optical means in at least one of said transmitting path and said receiving path;
means for alternating said optical means between an optical non-isolator state and an optical isolator state;
said means for receiving including means for measuring a first intensity of light received at said means for receiving when said optical means is in said optical non-isolator state, and means for measuring a second intensity of light received at said means for receiving when said optical means is in said optical isolator state;
means for compensating said measured first intensity of light for effects of scattering and/or absorbing interference of said transmitted light; and
means for comparing said compensated first intensity and said second intensity of light to a plurality of reference data to detect the presence of said substance on said surface.

29. Apparatus as in claim 28, wherein said reference data are in logarithmic form.

30. Apparatus as in claim 28, further comprising means for establishing said reference data by measuring said first and second intensities at a reference distance from said surface when said surface is a known surface with said polarization altering substance absent from said known surface.

31. Apparatus as in claim 30 wherein said means for establishing said reference data further comprises:
means for calculating a first ratio of said first intensity to said second intensity and making a first comparison of said first ratio to said first intensity when said polarization altering substance is absent from said known surface;
means for calculating a second ratio of said first intensity to said second intensity and making a second comparison of said second ratio to said first intensity when said polarization altering substance is present on said surface; and
means for determining a threshold to establish a difference between said first and second comparisons representing different conditions of the surface being investigated.

32. Apparatus as in claim 31 wherein one of said conditions of said surface is the presence of one of ice and snow and another condition an absence thereof.

33. Apparatus as in claim 30 wherein:
said transmitting path and said receiving path are substantially a same length as said reference distance used by said means for establishing reference data.

34. Apparatus as in claim 30 wherein said transmitting path and said receiving path are substantially a different length from said reference distance and said means for comparing includes means for correcting for said different length.

35. Apparatus as in claim 30 wherein said means for establishing said reference data includes means for measuring said first and second intensities when said surface is a known surface with said polarization altering substance absent from said known surface at a plurality of angles with respect to a normal of said surface.

36. Apparatus as in claim 30 wherein said means for establishing said reference data includes means for measuring said first and second intensities at a plurality of angles with respect to a normal of said surface when said surface is a known surface with said polarization altering substance present.

37. Apparatus as in claim 28 wherein:
said means for transmitting light includes only one transmitter; and
said means for receiving transmitted light includes at least one receiver.

38. Apparatus as in claim 28 wherein:
said means for transmitting light includes at least one transmitter; and
said means for receiving transmitted light includes only one receiver.

39. Apparatus as in claim 28 wherein:
said means for transmitting light includes at least one transmitter; and
said means for receiving transmitted light includes at least one receiver.

40. Apparatus for detecting on a surface which specularly reflects light, the presence of a polarization altering substance on said surface comprising:
means for transmitting light over a transmitting path to said surface;
means for receiving transmitted light;
a receiving path for said transmitted light from said surface and from said substance to said means for receiving;
optical means in at least one of said transmitting path and said receiving path;
means for alternating said optical means between an optical non-isolator state and an optical isolator state;
means for measuring a first intensity of light received at said means for receiving when said optical means is in said optical non-isolator state and outputting a first signal;
means for compensating said first signal for effects of scattering and/or absorbing interference of said transmitted light and outputting a compensated first signal;
means for measuring a second intensity of light received at said means for receiving when said optical means is in said optical isolator state and outputting a second signal;
means, responsive to a length of said receiving path, for range-correcting said first compensated signal and said second signal;
means for comparing said range-corrected second signal to said range-corrected compensated first signal and outputting a ratio signal;
means for calculating a threshold signal; and
means for comparing said ratio signal to said threshold signal.

41. Apparatus according to claim 40, wherein:
said means for comparing said range-corrected second signal to said range-corrected compensated first signal includes a computer; and
said means for comparing said ratio signal to said threshold signal includes said computer.

42. Apparatus for detecting, on a surface which specularly reflects light, the presence of a polarization altering substance on said surface comprising:
means for transmitting a pulse of light over a transmitting path to said surface;
means for receiving transmitted light;
a receiving path for said transmitted light from said surface and from said substance to said means for receiving;
means for splitting said transmitted light into a non-isolated portion and an isolated portion;
means for delaying one of said non-isolated portion and said isolated portion relative to another thereof to produce a first-to-arrive signal and a second-to-arrive signal;
said first-to-arrive signal being completed at an output of said means for delaying before said second-to-arrive signal arrives at said output;
means for measuring a first intensity of said first-to-arrive signal and outputting a first signal;
means for measuring a second intensity of light of said second-to-arrive signal and outputting a second signal;
means for compensating said first signal for effects of scattering and/or absorbing interference of said transmitted light and outputting a compensated first signal; and
means for comparing said compensated first signal and said second signal to reference data to detect the presence of said substance on said surface.

43. Apparatus as in claim 42, further comprising:
means for compensating said second signal for effects of scattering and/or absorbing interference of said transmitted light and outputting a compensated second signal;
means for comparing said compensated second signal to said compensated first signal and outputting a ratio signal;
means for calculating a threshold signal; and
means for comparing said ratio signal to said threshold signal.

44. Apparatus as in claim 42, wherein said reference data are in logarithmic form.

45. Apparatus as in claim 42, further comprising means for establishing said reference data by measuring said first and second intensities at a reference distance from said surface when said surface is a known surface with said polarization altering substance absent from said known surface.

46. Apparatus as in claim 45, wherein said means for establishing said reference data further comprises:
means for calculating a first ratio of said second intensity to said first intensity and making a first comparison of said first ratio to said second intensity when said polarization altering substance is absent from said known surface;
means for calculating a second ratio of said second intensity to said first intensity and making a second comparison of said second ratio to said second intensity when said polarization altering substance is present on said surface; and
means for determining a threshold to establish a difference between said first and second comparisons, said threshold representing different conditions of the surface being investigated.

47. Apparatus as in claim 46, wherein one of said conditions of said surface is the presence of one of ice and snow and another condition an absence thereof.

48. Apparatus as in claim 45, wherein said transmitting path and said receiving path are substantially a same length as said reference distance used by said means for establishing reference data.

49. Apparatus as in claim 45, wherein said transmitting path and said receiving path are substantially a different length from said reference distance and said means for comparing includes means for correcting for said different length.

50. Apparatus as in claim 45, wherein said means for establishing said reference data includes means for measuring said first and second intensities when said surface is a known surface with said polarization altering substance absent from said known surface at a plurality of angles with respect to a normal of said surface.

51. Apparatus as in claim 45, wherein said means for establishing said reference data includes means for measuring said first and second intensities at a plurality of angles with respect to a normal of said surface when said surface is a known surface with said polarization altering substance present.

52. Apparatus as in claim 42, wherein:
said means for transmitting light includes only one transmitter; and
said means for receiving transmitted light includes only one receiver.

53. Apparatus as in claim 42, wherein said means for delaying one of said non-isolated portion and said isolated portion includes optical fiber.

54. Apparatus as in claim 42, wherein said means for measuring a first intensity, said means for measuring a second intensity, and said means for comparing said first and second intensities are separated from said means for splitting by said means for delaying one of said non-isolated portion and said isolated portion.

55. Apparatus for detecting, on a surface which specularly reflects light, the presence of a polarization altering substance on said surface comprising:
means for transmitting a pulse of polarized light onto a surface;
means for receiving said pulse reflected from said surface;
means for directing said reflected pulse onto a non-blocking optical path to a detector;
means for directing said reflected pulse onto a blocking optical path to said detector;
one of said blocking and non-blocking optical paths having a delay exceeding a pulse length of said pulse, whereby responses of said detector to said reflected pulse directed onto said blocking and non-blocking optical paths are separated; and
means for compensating said reflected pulse for effects of scattering and/or absorbing interference of said transmitted light.

56. Apparatus as in claim 55, further comprising optical fiber effective for producing said delay.

57. Apparatus as in claim 55, wherein said detector comprises:
means for measuring a first intensity of said reflected pulse directed onto one of said blocking and non-blocking optical paths not having said delay and outputting a first signal; and
means for measuring a second intensity of said reflected pulse directed onto another one of said blocking and non-blocking optical paths having said delay and outputting a second signal.

58. Apparatus as in claim 57, wherein said means for compensating includes:
means for measuring said first signal at a time when a backscattering effect of said scattering and/or absorbing interference of said transmitted light is near a maximum;
means for filtering said first signal to remove said backscattering effect from said first signal; and
means for determining a distance from said means for transmitting to said surface.

59. Apparatus as in claim 58, further comprising means for comparing said first and second signals to reference data to detect the presence of said substance on said surface.

60. Apparatus as in claim 59, further comprising:
means for outputting a ratio signal from said first and second signals;
means for calculating a threshold signal; and
means for comparing said ratio signal to said threshold signal.

61. Apparatus as in claim 59, wherein said reference data are in logarithmic form.

62. Apparatus as in claim 59, further comprising means for establishing said reference data by measuring said first and second intensities at a reference distance from said surface when said surface is a known surface with said polarization altering substance absent from said known surface.

63. Apparatus as in claim 62 wherein said means for establishing said reference data further comprises:
means for calculating a first ratio of said second intensity to said first intensity and making a first comparison of said first ratio to said second intensity when said polarization altering substance is absent from said known surface;
means for calculating a second ratio of said second intensity to said first intensity and making a second comparison of said second ratio to said second intensity when said polarization altering substance is present on said surface; and
means for determining a threshold to establish a difference between said first and second comparisons representing different conditions of the surface being investigated.

64. Apparatus as in claim 63 wherein one of said conditions of said surface is the presence of one of ice and snow and another condition an absence thereof.

65. Apparatus as in claim 59 wherein said means for establishing said reference data includes means for measuring said first and second intensities when said surface is a known surface with said polarization altering substance absent from said known surface at a plurality of angles with respect to a normal of said surface.

66. Apparatus as in claim 59 wherein said means for establishing said reference data includes means for measuring said first and second intensities at a plurality of angles with respect to a normal of said surface when said surface is a known surface with said polarization altering substance present.

67. Apparatus for detecting, on a surface which specularly reflects light, the presence of a polarization altering substance on said surface comprising:
means for transmitting a pulse of polarized light onto a surface;

means for receiving said pulse reflected from said surface;

means for directing said reflected pulse onto a non-blocking optical path to a detector;

means for directing said reflected pulse onto a blocking optical path to said detector;

one of said blocking and non-blocking optical paths having a delay exceeding a pulse length of said pulse, whereby responses of said detector to said reflected pulse directed onto said blocking and non-blocking optical paths are separated, said detector including means for measuring a first intensity of said reflected pulse directed onto one of said blocking and non-blocking optical paths not having said delay and outputting a first signal, and means for measuring a second intensity of said reflected pulse directed onto another one of said blocking and non-blocking optical paths having said delay and outputting a second signal;

means for establishing thresholds for said first and second signals; and means, responsive to said means for establishing thresholds, for controlling an intensity of said transmitted pulse.

68. Apparatus as in claim 67, further comprising:

means for compensating said first and second signals for said intensity of said transmitted pulse to produce first and second compensated signals; and means for comparing said first and second compensated signals to reference data to detect the presence of said substance on said surface.

69. Apparatus as in claim 68, further comprising:

means for outputting a ratio signal from said first and second compensated signals;

means for calculating a threshold signal; and means for comparing said ratio signal to said threshold signal.

70. Apparatus as in claim 67 further comprising means for compensating said reflected pulse for effects of scattering and/or absorbing interference of said transmitted light.

71. Apparatus as in claim 70, wherein said means for compensating said reflected pulse for effects of scattering and/or absorbing interference of said transmitted light includes:

means for measuring said first signal at a time when a backscattering effect of said scattering and/or absorbing interference of said transmitted light is near a maximum;

means for filtering said first signal to remove said backscattering effect from said first signal; and means for determining a distance from said means for transmitting to said surface.

72. Apparatus for measuring horizontal visibility, comprising:

means for transmitting a pulse of polarized light onto a reference surface;

means for receiving said pulse reflected from said reference surface;

means for directing said reflected pulse on a non-blocking optical path to a detector to isolate a non-blocking component of said reflected pulse;

means for directing said reflected pulse on a blocking optical path to said detector to isolate a blocking component of said reflected pulse;

means for measuring an amplitude of said non-blocking component and/or said blocking component;

means for determining an attenuation coefficient by comparing said measured amplitude to a reference amplitude; and means for calculating the horizontal visibility based on the attenuation coefficient.

73. Apparatus as in claim 72, wherein one of said blocking and non-blocking optical paths has a delay exceeding a pulse length of said pulse, whereby responses of said detector to said reflected pulse directed onto said blocking and non-blocking optical paths are separated in time.

74. Apparatus as in claim 72, wherein said means for transmitting said pulse includes means for controlling an intensity of said pulse.

\* \* \* \* \*